US010990330B2

(12) United States Patent
Matsuzaka

(10) Patent No.: US 10,990,330 B2
(45) Date of Patent: Apr. 27, 2021

(54) PRINTING SYSTEM INCLUDING FIRST AND SECOND INFORMATION TERMINALS, CLIENT INFORMATION TERMINAL, AND MANAGEMENT SECTION COUPLED TO EACH OTHER VIA NETWORK

(71) Applicant: SEIKO EPSON CORPORATION, Tokyo (JP)

(72) Inventor: Kenji Matsuzaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 16/807,265

(22) Filed: Mar. 3, 2020

(65) Prior Publication Data
US 2020/0285424 A1 Sep. 10, 2020

(30) Foreign Application Priority Data

Mar. 5, 2019 (JP) .............................. JP2019-039261
Apr. 2, 2019 (JP) .............................. JP2019-070285

(Continued)

(51) Int. Cl.
*G06F 3/12* (2006.01)
*G03G 15/00* (2006.01)
(Continued)

(52) U.S. Cl.
CPC .......... *G06F 3/1204* (2013.01); *G06F 3/1226* (2013.01); *G06F 3/1257* (2013.01);
(Continued)

(58) Field of Classification Search
None
See application file for complete search history.

(56) References Cited

U.S. PATENT DOCUMENTS 6,804,025 B1* 10/2004 Ueda .................... H04N 1/6033
358/1.9
2002/0049839 A1* 4/2002 Miida ................... G06F 3/1204
709/224

(Continued)

FOREIGN PATENT DOCUMENTS

JP 2003-108323 A 4/2003
JP 2003-345576 A 12/2003
(Continued)

*Primary Examiner* — Haris Sabah
(74) *Attorney, Agent, or Firm* — Global IP Counselors, LLP

(57) ABSTRACT

A first provider for providing a printer, a second provider for providing a print medium, a client which performs printing on the print medium using the printer, and a management section for processing and storing information are coupled to each other via a network. The first provider provides the second provider with a provider printer and a profile preparation tool. The second provider executes a process of preparing a profile corresponding to a combination of the provider printer and the print medium using the same, and transmitting printing setup information including the profile to the management section with respect to one or more print media. The client receives the printing setup information corresponding to the combination of the client printer used in printing and the print medium used in printing from the management section, performs setup based on the printing setup information on software for controlling the client printer and performs printing.

14 Claims, 17 Drawing Sheets

(30)    Foreign Application Priority Data

Apr. 2, 2019   (JP) .............................. JP2019-070287
May 20, 2019   (JP) .............................. JP2019-094404
Dec. 26, 2019  (JP) .............................. JP2019-235868

(51) Int. Cl.
   *B41J 29/393*    (2006.01)
   *H04N 1/00*      (2006.01)
   *H04N 1/60*      (2006.01)

(52) U.S. Cl.
   CPC ......... *B41J 29/393* (2013.01); *G03G 15/5058* (2013.01); *H04N 1/00045* (2013.01); *H04N 1/6055* (2013.01)

(56)    References Cited

U.S. PATENT DOCUMENTS

| | | |
|---|---|---|
| 2010/0017306 A1 | 1/2010 | Hoshii |
| 2015/0178021 A1 | 6/2015 | Shimizu |
| 2017/0197449 A1 | 7/2017 | Singamsetty et al. |

FOREIGN PATENT DOCUMENTS

| | | |
|---|---|---|
| JP | 2009-300694 A | 12/2009 |
| JP | 2010-044746 A | 2/2010 |
| JP | 2011-004010 A | 1/2011 |

\* cited by examiner

PRINTING SYSTEM INCLUDING FIRST AND SECOND INFORMATION TERMINALS, CLIENT INFORMATION TERMINAL, AND MANAGEMENT SECTION COUPLED TO EACH OTHER VIA NETWORK

The present application is based on, and claims priority from JP Application Serial Number 2019-039261, filed Mar. 5, 2019, JP Application Serial Number 2019-070285, filed Apr. 2, 2019, JP Application Serial Number 2019-070287, filed Apr. 2, 2019, JP Application Serial Number 2019-094404, filed May 20, 2019, and JP Application Serial Number 2019-235868, filed Dec. 26, 2019, the disclosure of which is hereby incorporated by reference herein in its entirety.

BACKGROUND

1. Technical Field

The present disclosure relates to a printing system for a printing company to perform printing on a print medium based on a request of a customer.

2. Related Art

In the past, there has existed a technology for perform mass-production printing with mass-production printers in a printing factory using a color image which is printed by a printer in a business office, and which is an agreed resultant with the client of the printing as an original image in a printing company having the printing factory and the business office different in location from the printing factory (JP-A-2003-345576 (Document 1)).

In the technology of Document 1, the printing factory of the printing company requests a profile preparation company to prepare a profile for printing an image color-matched with respect to the original image printed by the printer in the business office with the mass-production printer in the printing factory. The profile preparation company transmits chart data by e-mail to the business office of the printing company. The business office of the printing company performs printing of a color chart sample based on the chart data using the printer in the business office.

The business office in the printing company sends the color chart sample by mail to the profile preparation company. The profile preparation company prepares the profile based on the color chart sample received. The profile preparation company transmits the profile by e-mail to the printing factory of the printing company. The printing factory of the printing company uses the profile received to prepare a composite profile for simulating the printer in the business office, and then installs the composite profile in a printer driver of the mass-production printer in the printing factory. It is possible for the printing factory of the printing company to use the composite profile to print the image color-matched with respect to the original image with the mass-production printer.

However, in the technology of Document 1, it is necessary for the color chart sample printed in the business office of the printing company to be sent by mail to the profile preparation company. Therefore, it takes several days from the request of the preparation of the profile by the printing factory to the receipt of the profile by the printing factory.

SUMMARY (1) According to an aspect of the present disclosure, there is provided a printing system including a first information terminal provided to a first provider configured to provide a printer, a second information terminal provided to a second provider configured to provide a print medium, a client information terminal which is provided to each of at least one client configured to perform printing on the print medium using the printer, and to which the printer is coupled, and a management section configured to process and store information, wherein the first information terminal, the second information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the second information terminal when an acquisition request of the profile preparation tool is received from the second information terminal, a setup reception section configured to receive printing setup information including a profile prepared in accordance with a combination of a model of a printer and a type of a print medium using the profile preparation tool received by the second information terminal from the second information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal.

(2) According to another aspect of the present disclosure, there is provided a printing system including a client information terminal which is provided to a client configured to perform printing on a print medium using a printer, and to which the printer is coupled, and a management section configured to process and store information, wherein the client information terminal and the management section are coupled to each other via a network. The management section includes a setup storage section configured to store one or more pieces of printing setup information each including a profile corresponding to a combination of a model of a printer and a type of a print medium. The client information terminal transmits an acquisition request of the printing setup information specified by a combination of a model of a printer and a type of a print medium to the management section, and receives the printing setup information specified out of the one or more pieces of the printing setup information stored in the setup storage section from the management section. A client printer which is the printer coupled to the client information terminal, and is a printer same in model as the printer used to specify the printing setup information performs the printing on a print medium same in type as the print medium used to specify the printing setup information using the printing setup information received by the client information terminal, and prints a warranty label set in advance in an area which is located on the print medium, and is different from an area of an image as a printing target in the printing when a warranty condition including that the printing setup information fulfills a condition set in advance is fulfilled.

(3) According to still another aspect of the present disclosure, there is provided a printing system including a first information terminal provided to a first provider configured to provide a printer, a second information terminal provided to a second provider configured to provide a print medium, a client information terminal which is provided to each of at least one client configured to perform printing on the print medium using the printer, and to which the printer is coupled, and a management section configured to process and store information, wherein the first information terminal, the second information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the second information terminal when an acquisition request of the profile preparation tool is received from the second information terminal, and a setup reception section configured to receive printing setup information including a profile prepared in accordance with a combination of a model of a printer and a type of a print medium using the profile preparation tool received by the second information terminal from the second information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal. The client information terminal transmits information representing a result of the printing by the client printer performed using the printing setup information to the management section. The first information terminal receives information representing the result of the printing from the management section, and transmits information representing a reward to be decided based on the result of the printing to the second information terminal which transmitted the printing setup information to the management section.

(4) According to still another aspect of the present disclosure, there is provided a printing system including a first information terminal provided to a first provider configured to provide a printer, a second information terminal provided to a second provider configured to provide a print medium, a third information terminal provided to a third provider configured to provide a profile corresponding to a combination of a model of a printer and a type of a print medium, a client information terminal which is provided to each of at least one client configured to perform printing on the print medium using the printer and the profile, and to which the printer is coupled, and a management section configured to process and store information, wherein the first information terminal, the second information terminal, the third information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the third information terminal when an acquisition request of the profile preparation tool is received from the third information terminal, a setup reception section configured to receive printing setup information including a profile prepared in accordance with a combination of a model of a printer and a type of a print medium using the profile preparation tool received by the third information terminal from the third information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal. The client information terminal transmits information representing a result of the printing by the client printer performed using the printing setup information to the management section. Either one or both of the first information terminal and the second information terminal receives information representing the result of the printing from the management section, and transmits information representing a reward decided based on the result of the printing performed by the client printer using the printing setup information to the third information terminal which transmitted the printing setup information to the management section.

Figure 1:
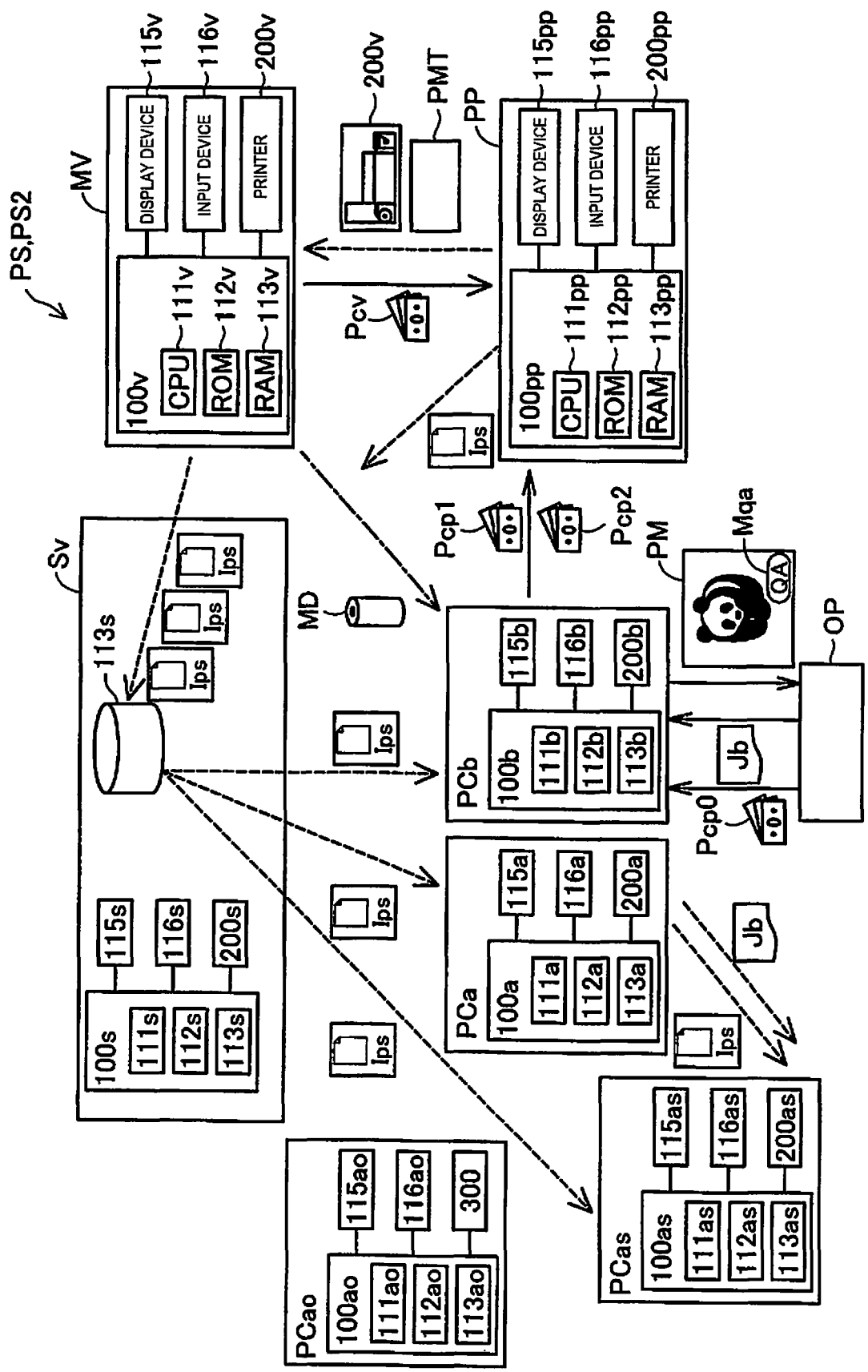
FIG. 1 is an explanatory diagram showing a printing system PS according to the present embodiment.

DESCRIPTION OF EXEMPLARY EMBODIMENTS (1) In the past, there has existed a technology for perform mass-production printing with mass-production printers in a printing factory using a color image which is printed by a printer in a business office, and which is an agreed resultant with the client of the printing as a source image in a printing company having the printing factory and the business office different in location from the printing factory (JP-A-2003-345576).

In the technology of JP-A-2003-345576, the printing factory of the printing company requests a profile preparation company to prepare a profile for printing an image color-matched with respect to the original image printed by the printer in the business office with the mass-production printer in the printing factory. The profile preparation company transmits chart data by e-mail to the business office of the printing company. The business office of the printing company performs printing of a color chart sample based on the chart data using the printer in the business office.

The business office in the printing company sends the color chart sample by mail to the profile preparation company. The profile preparation company prepares the profile based on the color chart sample received. The profile preparation company transmits the profile by e-mail to the printing factory of the printing company. The printing factory of the printing company uses the profile received to prepare a composite profile for simulating the printer in the business office, and then installs the composite profile in a printer driver of the mass-production printer in the printing factory.

It is possible for the printing factory of the printing company to use the composite profile to print the image color-matched with respect to the original image with the mass-production printer.

However, in the technology of JP-A-2003-345576, it is necessary for the color chart sample printed in the business office of the printing company to be sent by mail to the profile preparation company. Therefore, it takes several days from the request of the preparation of the profile by the printing factory to the receipt of the profile by the printing factory.

(2) In the past, there has existed a multifunction printer which prohibits printing when a specific condition is fulfilled such as when determining whether each of the consumables mounted is a genuine product or a non-genuine product, and then it has been found that the operation mode is a "genuine product mode" and all of the consumables are non-genuine products (JP-A-2009-300694). In the technology of JP-A-2009-300694, when the operation mode is a "non-genuine product allowable mode" and some of the consumables are non-genuine products, printing is performed after storing the history log of using the non-genuine products.

However, in the technology of JP-A-2009-300694, even when receiving a printed material on which the printing has been performed using the non-genuine product from the printing company, it is not possible for the person who has requested the printing to be aware of the fact that the quality of the printed material degrades compared to when using the genuine product. Further, a system ensuring the quality of color reproducibility of the printed material has not ever existed.

(3) In the past, there has existed a system which provides a printing profile to charge the user (JP-A-2003-108323). In the technology of JP-A-2003-108323, a copy of the printing profile is transferred to a personal computer in a design creation company. In the design creation company, the printing profile is set in the personal computer, and is used for color conversion. In the profile management server, when transferring the printing profile, a usage log of the profile information is updated, and the predetermined fee is charged based on the usage log. In other words, payment is made by the design creation company to the profile management center in accordance with the degree of the usage of the printing profile by the design creation company.

However, in the technology of JP-A-2003-1083223, there has not been concerned a measure for improving the quality of the printing profile to be prepared.

A. First Embodiment

A1. Configuration of Printing System:

FIG. 1 is an explanatory diagram showing a printing system PS according to the present embodiment. As the constituent elements, the printing system PS includes a printer provider PP, a medium vendor MV, printing companies PCa, PCb, a business office PCao of the printing company PCa, a subsidiary PCas of the printing company PCa, a management server Sv, and an ordering party OP. The subsidiary PCas of the printing company PCa is also described as a printing company PCas.

The printer provider PP is a company which manufactures printers, and then supplies the printers to the outside (see a lower right part of FIG. 1). Specifically, the printer provider PP provides the printers 200, 300 used in the medium vender MV, the printing companies PCa, PCb, the business office PCao of the printing company PCa, and the subsidiary PCas of the printing company PCa. The printers 200, 300 are each an inkjet printer.

The printers 200 manufactured by the printer provider PP are used in the printing companies PCa, PCb, and PCas in order to mass-produce the printed materials. The printers 200 used in the printing companies PCa, PCb, and PCas are respectively described as printers 200*a*, 200*b*, and 200*as* (see a lower left part of FIG. 1).

The printers 200 manufactured by the printer provider PP are used in the medium vendor MV, the printer provider PP, and the management server Sv in order to prepare the printing setup information Ips. The printer 200 used in the medium vendor MV is described as a "printer 200*v*." The printer 200 used in the printer provider PP is described as a "printer 200*pp*." The printer 200 used in the management server Sv is described as a "printer 200*s*" (see an upper right part, an upper middle part, and a lower right part of FIG. 1).

The printers 200*a*, 200*b*, 200*as*, 200*v*, 200*pp*, and 200*s* are the printers the same in model. In the present specification, when describing the printers 200*a*, 200*b*, 200*as*, 200*v*, 200*pp*, and 200*s* without distinction, the description of printer 200 is used. The printers 200 are each provided with a sensor for measuring the state of printing in the printed material made by the printer 200. The printers 200 are each specifically provided with a spectrophotometer for measuring the colors applied to the printed material, and a digital still camera for taking an image formed on the printed material.

The printers 300 manufactured by the printer provider PP are used in the business office PCao of the printing company PCa in order to make a print sample (see a middle left part of FIG. 1).

The printer provider PP has the computer 100*pp*, a display device 115*pp*, an input device 116*pp*, and the printer 200*pp* (see a lower right part of FIG. 1). The printer 200*pp* is coupled to the computer 100*pp*. The computer 100*pp* controls the printer 200*pp*. The computer 100*pp* is provided with a CPU 111*pp* as a processor, a ROM 112*pp*, and a RAM 113*pp*. In the present specification, the "RAM" includes a semiconductor memory and a rigid disk.

A program for controlling the printer 200*pp* is installed in the computer 100*pp*. In the computer 100*pp*, the CPU 111*pp*, the RAM 113*pp*, and the ROM 112*pp* as hardware resources and the control program cooperate with each other. Specifically, the CPU 111*pp* loads the computer program stored in the ROM 112*pp* or the RAM 113*pp* as the rigid disk to the RAM 113*pp* as a semiconductor memory, and then executes the computer program to thereby realize a variety of functions. The information obtained or prepared by the CPU 111*pp* is stored in the RAM 113*pp*.

The medium vendor MV is a company which manufactures a variety of types of print media MD and supplying the media MD to the outside (see an upper right part of FIG. 1). In FIG. 1, the medium vendor MV is drawn as a single constituent element. However, in reality, the medium vendor MV is one of a plurality of enterprises having substantially the same functions, and having a competitive relationship with each other.

The print media MD include a rolled elongated medium and a sheet-like medium. The medium vendor MV provides the print media MD to be used in the printing companies PCa, PCb, and PCas, and the business office PCao of the printing company PCa. The print media MD manufactured by the medium vendor MV are used in the printing companies PCa, PCb, and PCas in order to mass-produce the printed materials (see a central part of FIG. 1). The print media MD manufactured by the medium vendor MV are used in the business office PCao of the printing company PCa in order to make the print sample (see a middle left part of FIG. 1).

Even when the printing has been performed based on the same image data, the appearance of the printing result expressed on the print medium is different by a combination of a model of the printer used, the print medium MD used, a printing mode used in the printer, and so on. It should be noted that the "print medium MD" is a collective term including print media different in type from each other.

The medium vendor MV has the computer 100*v*, a display device 115*v*, an input device 116*v*, and the printer 200*v* (see an upper right part of FIG. 1). The printer 200*v* is coupled to the computer 100*v*. The computer 100*v* controls the printer 200*v*. The computer 100*v* is provided with a CPU 111*v* as a processor, a ROM 112*v*, and a RAM 113*v*.

A program for controlling the printer 200*v* is installed in the computer 100*v*. In the computer 100*v*, the CPU 111*y*, the RAM 113*v*, and the ROM 112*v* as hardware resources and the control program cooperate with each other. Specifically, the CPU 111*pp* loads the computer program stored in the ROM 112*pp* or the RAM 113*pp* as the rigid disk to the RAM 113*pp* as a semiconductor memory, and then executes the computer program to thereby realize a variety of functions. The information obtained or prepared by the CPU 111*v* is stored in the RAM 113*v*.

The printing companies PCa, PCb are each a company which products the printed materials (see a central part of FIG. 1). In response to the request for a job Jb of manufacturing the printed materials PM from the ordering party OP (see a lower middle part of FIG. 1), the printing companies PCa, PCb use the printers 200*a*, 200*b* to perform printing on the print media MD. It is possible for the printing company PCa to produce the printed materials PM requested by the ordering party OP by the printing with the printer 200*as* held by the printing company PCas as the subsidiary of the printing company PCa in addition to the printing with the printer 200*a* held by the printing company PCa itself.

The printing company PCa has the computer 100*a*, a display device 115*a*, an input device 116*a*, and the printer 200*a*. The printer 200*a* is coupled to the computer 100*a*. The computer 100*a* controls the printer 200*a*. The computer 100*a* is provided with a CPU 111*a* as a processor, a ROM 112*a*, and a RAM 113*a*.

A program for controlling the printer 200*a* is installed in the computer 100*a*. In the computer 100*a*, the CPU 111*a*, the RAM 113*a*, and the ROM 112*a* as hardware resources and the control program cooperate with each other. Specifically, the CPU 111*a* loads the computer program stored in the ROM 112*a* or the RAM 113*a* as the rigid disk to the RAM 113*a* as a semiconductor memory, and then executes the computer program to thereby realize a variety of functions. The information obtained or prepared by the CPU 111*a* is stored in the RAM 113*a*.

The printing company PCb has the computer 100*b*, a display device 115*b*, an input device 116*b*, and the printer 200*b*. The printer 200*b* is coupled to the computer 100*b*. The functions realized by the computer 100*b*, the display device 115*b*, the input device 116*b*, and the printer 200*b* in the printing company PCb are the same as the functions realized by the computer 100*a*, the display device 115*a*, the input device 116*a*, and the printer 200*a* in the printing company PCa. In the configurations provided to the printing companies PCb, PCas and the business office PCao, the configuration corresponding to the configuration provided to the printing company PCa is denoted by adding "b," "as," and "ao," respectively, instead of the suffix "a."

The printing company PCas is a company which produces the printed materials. In response to the request for the job Jb of manufacturing the printed materials from the printing company PCa as the parent company, the printing company PCas uses the printer 200as to perform printing on the print media MD (see a lower left part of FIG. 1). The printing company PCas has the computer 100as, a display device 115as, an input device 116as, and the printer 200as. The printer 200as is coupled to the computer 100as. The functions realized by the computer 100as, the display device 115as, the input device 116as, and the printer 200as in the printing company PCas are the same as the functions realized by the computer 100a, the display device 115a, the input device 116a, and the printer 200a in the printing company PCa.

The business office PCao is a business office of the printing company PCa (see a middle left part of FIG. 1). In the business office PCao, an arrangement is made between a person in charge in the printing company PCa and the ordering party OP, and thus, the content of the job Jb requested to the printing company PCa is specified. Specifically, in the arrangement between the person in charge in the printing company PCa and the ordering party OP, the content of the job Jb requested to the printing company PCa is specified using the print sample made by the printer 300.

The business office PCao has the computer 100ao, a display device 115ao, an input device 116ao, and the printer 300. The printer 300 is coupled to the computer 100ao. The functions realized by the computer 100ao, the display device 115ao, the input device 116ao, and the printer 300 in the business office PCao are the same as the functions realized by the computer 100a, the display device 115a, the input device 116a, and the printer 200a in the printing company PCa.

The model of the printer 300 used in the business office PCao and the model of the printers 200a, 200as used in the printing companies PCa, PCas for the mass-production of the printed materials are different from each other. The print media MD used in the business office PCao and the print media MD used in the printing companies PCa, PCas are the same in the present embodiment. The business office PCao is supplied with the printer 300 and the print media MD from the printing company PCa.

The management server Sv is a computer system capable of transmitting/receiving information between the printer provider PP, the medium vendor MV, the printing companies PCa, PCb, the business office PCao of the printing company PCa, and the subsidiary PCas of the printing company PCa (see an upper middle part of FIG. 1). The management server Sv is connected to the printer provider PP, the medium vender MV, the printing companies PCa, PCb, the business office PCao of the printing company PCa, and the subsidiary PCas of the printing company PCa via a network. The management server Sv processes and then stores information obtained from the printer provider PP, the medium vender MV, the printing companies PCa, PCb, the business office PCao of the printing company PCa, and the subsidiary PCas of the printing company PCa.

The management server Sv has the computer 100s, a display device 115s, an input device 116s, and the printer 200s. The functions realized by the display device 115s, the input device 116s, and the printer 200s in the management server Sv are the same as the functions realized by the display device 115a, the input device 116a, and the printer 200a in the printing company PCa. The management server Sv is provided with a variety of models of printers provided by the printer provider PP besides the printer 200s.

The computer 100s realizes a function of transmitting/receiving the information with the computer 100v of the medium vendor MV, the computers 100a, 100b, and 100as of the printing companies PCa, PCb, and PCas, and the computer 100ao of the business office 100ao in addition to the functions exerted by the computer 100a in the printing company PCa.

The computer 100s is provided with a CPU 111s as a processor, a ROM 112s, and a RAM 113s. In the computer 100s, there are installed a program for performing transmitting/receiving the information described above and a program for controlling the printer 200s. In the computer 100s, the CPU 111s, the RAM 113s, and the ROM 112s as hardware resources and the control program cooperate with each other. Specifically, the CPU ills loads the computer program stored in the ROM 112s or the RAM 113s as the rigid disk to the RAM 113s as a semiconductor memory, and then executes the computer program to thereby realize a variety of functions. The information obtained or prepared by the CPU 111s is stored in the RAM 113s.

Figure 2:
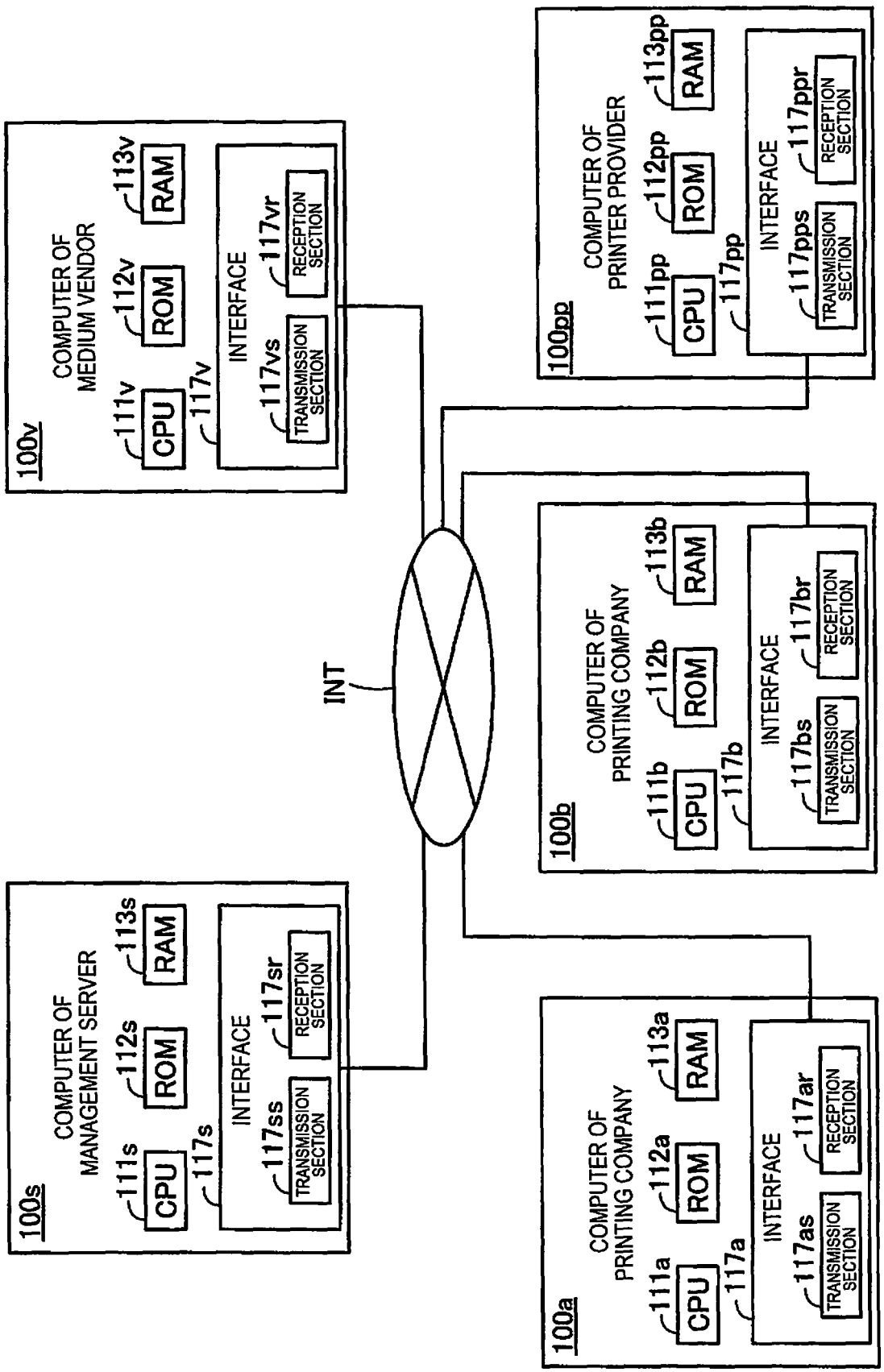
FIG. 2 is a block diagram showing a relationship between a computer 100*pp* of a printer provider PP, a computer 100*v* of a medium vendor MV, a computer 100*a* of a printing company PCa, a computer 100*b* of a printing company PCb, and a computer 100*s* of a management server Sv.

FIG. 2 is a block diagram showing a relationship between the computer 100pp of the printer provider PP, the computer 100v of the medium vendor MV, the computer 100a of the printing company PCa, the computer 100b of the printing company PCb, and the computer 100s of the management server Sv. It should be noted that the computer 100as of the printing company PCas and the computer 100ao of the business office PCao have substantially the same configuration and function as those of the computer 100a of the printing company PCa or the computer 100b of the printing company PCb, and are therefore omitted from the illustration in FIG. 2.

The computer 100pp of the printer provider PP is provided with an interface 117pp for performing communication with the outside (see an upper right part of FIG. 2). The interface 117pp functions as a transmission section 117pps for transmitting information to the outside, and a reception section 117ppr for receiving information from the outside.

The computer 100v of the medium vendor MV, the computer 100a of the printing company PCa, the computer 100b of the printing company PCb, and the computer 100s of the management server Sv are similarly provided with interfaces 117v, 117a, 117b, and 117s, respectively. When describing the interfaces 117pp, 117v, 117a, 117b, and 117s without distinction, the description of interface 117 is used. In each of the computers, a constituent provided with "s" attached as a suffix of the symbol denoting the interface is described as a transmission section. In each of the computers, a constituent provided with "r" attached as a suffix of the symbol denoting the interface is described as a reception section.

In the printing system PS, the computer 100pp provided to the printer provider PP, the computer 100v provided to the medium vendor MV, the computers 100a, 100b which are provided respectively to the printing companies PCa, PCb and to which the printers 200 are respectively coupled, and the management server Sv are connected to each other via the respective interfaces 117 and the Internet INT.

Figure 3:
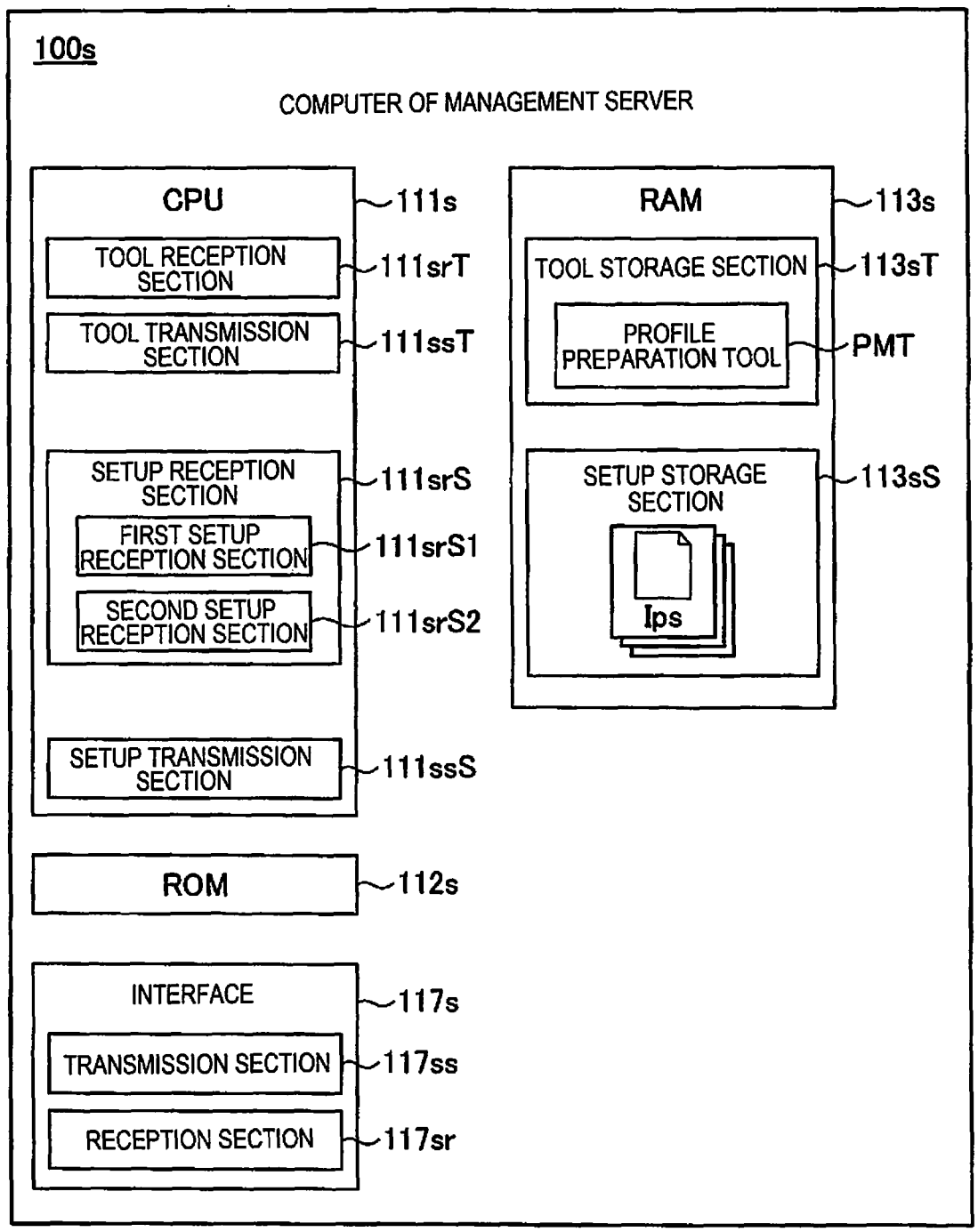
FIG. 3 is a block diagram showing functional blocks of the computer 100*s* of the management server Sv.

FIG. 3 is a block diagram showing functional blocks of the computer 100s of the management server Sv. As functional sections, the management server Sv has a tool reception section 111srT, a tool storage section 113sT, a tool transmission section 111ssT, a setup reception section 111srS, a setup storage section 113sS, and a setup transmission section 111ssS. The tool reception section 111srT, the tool transmission section 111ssT, the setup reception section 111srS, and the setup transmission section 111ssS as functional sections are specifically realized by the CPU 111s (see a left part of FIG. 3). The tool storage section 113sT and the setup storage section 113sS as the functional sections are specifically realized by the RAM 113s (see an upper right part of FIG. 3).

The tool reception section 111srT receives a profile preparation tool PMT as the software from the computer 100pp of the printer provider PP. The tool storage section 113sT stores the profile preparation tool PMT. The profile preparation tool PMT will be described later.

When the tool transmission section 111ssT receives an acquisition request of the profile preparation tool PMT from the computer 100v of the medium vendor MV, the tool transmission section 111ssT transmits the profile preparation tool PMT stored in the tool storage section 113sT to the computer 100v of the medium vendor MV.

The setup reception section 111srS receives the printing setup information Ips including a profile 1060 from the computer 100v of the medium vendor MV (see an upper middle part of FIG. 1). The profile 1060 in the printing setup information Ips received from the medium vendor MV has been prepared in accordance with a combination of the model of the printer 200 and the type of the print medium MD using the profile preparation tool PMT received by the computer 100v of the medium vendor MV. The details of the printing setup information Ips and the profile 1060 will be described later. Out of the setup reception section 111srS, a functional section of receiving the printing setup information Ips from the computer 100v of the medium vendor MV is shown in FIG. 3 as a "second setup reception section 111srS2."

The setup reception section 111srS receives the printing setup information Ips including the profile 1060 from the computer 100pp of the printer provider PP (see a middle right part of FIG. 1). The profile 1060 in the printing setup information Ips received from the printer provider PP has been prepared by the computer 100pp of the printer provider PP in accordance with a combination of the model of the printer 200 and the type of the print medium MD using the profile preparation tool PMT. Out of the setup reception section 111srS, a functional section of receiving the printing setup information Ips from the computer 100pp of the printer provider PP is shown in FIG. 3 as a "first setup reception section 111srS1."

The setup storage section 113sS stores one or more pieces of printing setup information Ips (see an upper middle part of FIG. 1).

When the setup transmission section 111ssS has received an acquisition request of the printing setup information Ips from the computers 100a, 100b, the setup transmission section 111ssS selects the printing setup information Ips specified in the acquisition request from the one or more pieces of printing setup information Ips stored in the setup storage section 113sS to transmit the result to the computers 100a, 100b (see a central part of FIG. 1). The printing setup information Ips is specified by a combination of the model of the printer 200 and the type 1020 of the print medium MD in the acquisition request.

A2. Process in Printing System:

(1) Preparation and Upload of Printing Setup Information:

The printer provider PP prepares the printer 200v and the profile preparation tool PMT to provide the medium vendor MV with the printer 200v and the profile preparation tool PMT (see a middle right part of FIG. 1). The profile preparation tool PMT is the software for preparing the profile to be used when performing the printing by the printers 200, 300. The profile preparation tool PMT is specifically executed in the CPU lily of the computer 100v. The profile will be described later.

In the middle right part of FIG. 1, the constituents are described as if the profile preparation tool PMT is transmitted from the printer provider PP to the medium vendor MV in order to make it easy to understand the technology. However, in reality, the provision of the profile preparation tool PMT to the medium vendor MV is performed via the management server Sv as described above.

The medium vendor MV prepares the profile corresponding to the combination of the model of the printer 200v and the type of the print medium MD out of a variety of types of print media manufactured by the medium vendor MV using the printer 200v and the profile preparation tool PMT. The profile includes the information of the color conversion for the printer 200 of that model to achieve the most desirable color reproduction when performing the printing on the print medium MD based on the print data. The medium vendor MV transmits the printing setup information Ips to the management server Sv in order to make the management server Sv store the printing setup information Ips including the profile (see an upper middle part of FIG. 1).

Such a process is performed for each of the types of the print media MD provided by the medium vendor MV. As a result, in the management server Sv, there are stored one or more pieces of printing setup information Ips each including the profile corresponding to the combination of the printer and the print medium MD. The medium vendor MV pays a compensation Pcv corresponding to the number of pieces of printing setup information Ips to be stored in the management server Sv to the printer provider PP (see a middle right part of FIG. 1).

The specific payment process of the compensation Pcv is performed via the management server Sv. As the process due to the hardware, the following process is performed. Specifically, the computer 100v of the medium vendor MV transmits the information Pcv representing the compensation to be paid in accordance with the number of pieces of printing setup information Ips to be stored in the management server Sv by the computer 100v to the computer 100pp of the printer provider PP via the computer 100s of the management server Sv.

By performing such a process, it is possible for the printer provider PP to obtain the compensation Pcv corresponding to the extent to which the medium vendor MV makes use of the printing system PS. It is possible for the medium vendor MV to further achieve the promotion of the use of the print medium MD by the printing companies PCa, PCb, and PCas by making use of the printing system PS in accordance with an increase in the compensation Pcv to be paid to the printer provider PP. Therefore, the increase in the compensation Pcv corresponding to the increase in the number of pieces of printing setup information Ips is difficult to be felt as a major burden for the medium vendor MV.

It is possible for the computer 100v of the medium vendor MV to perform the process of transmitting the printing setup information Ips designating one or more printing companies which are allowed to download the printing setup information Ips from the management server Sv out of the printing companies PCa, PCb, and PCas in the process of transmitting the printing setup information Ips to the management server Sv. The management server Sv allows only the designated printing company to download the printing setup information Ips which is the printing setup information Ips stored, and is transmitted from the medium vendor MV designating the printing company allowed to download (see a middle left part of FIG. 1).

For example, the medium vendor MV requested by the printing company to prepare the printing setup information Ips for using special ink prepares the printing setup information Ips corresponding to the special ink, and then transmits the printing setup information Ips to the management server Sv designating only the printing company PCa and the subsidiary PCas of the printing company PCa as the printing companies allowed to download the printing setup information Ips. Then, the management server Sv allows only the printing company PCa and the subsidiary PCas of the printing company PCa to download the printing setup information Ips. When the medium vendor MV is requested to manufacture a special print medium by the printing company PCa, it is also possible for the medium vendor MV and the management server Sv to perform substantially the same process.

By performing such a process, it is possible for the medium vendor MV to provide the printing setup information Ips only to the one or more printing companies having a specific relationship with the medium vendor MV. It is possible for the one or more printing companies designated to use the printing setup information Ips which other printing companies are not allowed to use.

It should be noted that the process to be executed by the medium vendor MV described hereinabove can be performed by the medium vendor MV itself as the company which manufactures the print media MD, or can also be performed by a business agent of the medium vendor MV. In other words, it is also possible for the business agent of the medium vendor MV to be provided with the printer 200v and the profile preparation tool PMT by the printer provider PP to prepare the printing setup information Ips (see a middle right part of FIG. 1). In the description in the present embodiment, the description of the "medium vendor MV" includes also the business agent of the medium vendor MV in addition to the medium vendor MV itself.

Further, the process performed by the medium vendor MV described hereinabove is also performed by the printer provider PP. The printer provider PP prepares the profile corresponding to the combination of the printer 200pp and a variety of types of print media MD provided by the medium vendor MV or the printer provider PP using the printer 200pp and the profile preparation tool PMT. The computer 100pp of the printer provider PP prepares the printing setup information Ips including the profile and then transmits the printing setup information Ips to the management server Sv in order to make the management server Sv store the printing setup information Ips (see a middle right part of FIG. 1). Such a process is performed for each of the types of the print media MD provided by the medium vendor MV or the printer provider PP.

Figure 4:
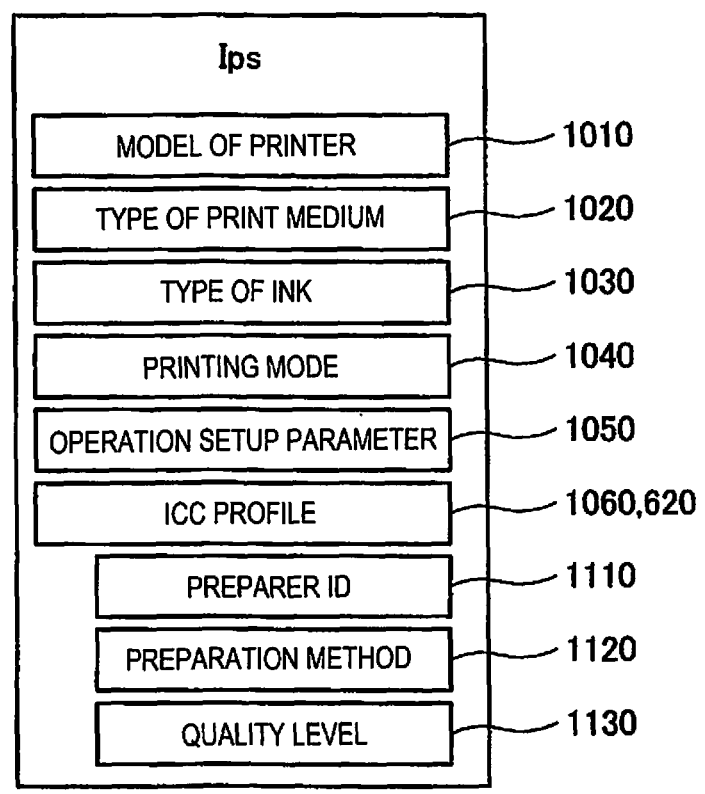
FIG. 4 is an explanatory diagram showing a configuration of printing setup information Ips to be stored in the management server Sv.

FIG. 4 is an explanatory diagram showing a configuration of printing setup information Ips to be stored in the management server Sv. The printing setup information Ips includes information 1010 of the model of the intended printer, information 1020 of the type of the intended print medium, information 1030 of the type of the ink to be used in the intended printer, information 1040 of the printing mode to be used in the intended printer, information 1050 of operation setup parameters of the printer including the feed speed of the medium in the intended printer, and information 1060 of the profile of the intended printer.

The printing setup information Ips further includes a preparer ID 1110 representing the preparer who prepared the printing setup information Ips, the information 1120 of a preparation method when preparing the printing setup information Ips, and the quality level information 1130 representing the quality of the printing result when performing printing using the printing setup information Ips. The preparer ID 1110, the information 1120 of the preparation method, the quality level information 1130 are specifically included in the printing setup information Ips as tags included in the profile 1060.

The printing mode specified by the information 1040 of the printing mode is the operation mode of the printer. For each of the printing modes, there have been set (i) a nozzle to be used in printing out of all of the nozzles of the printer, (ii) an amount of feed in sub-scan, (iii) the number of printing passes in printing, (iv) the resolution of ink dots to be formed on a print medium, and so on. The "number of printing passes" is the number of times of main scan performed when forming one raster line on the print medium. The "resolution" of ink dots is the number of ink dots which can be formed per unit length such as one inch.

The "main scan" is a relative feed between the print medium and the print head repeated in printing, and is a relative feed performed along a direction perpendicular to a feed direction when the print medium is conveyed to a position opposed to the print head. In some printers, the main scan is not performed when performing printing. The "sub-scan" is a relative feed between the print medium and the print head repeated in printing, and is a relative feed performed along a direction parallel to the feed direction when the print medium is conveyed to the position opposed to the print head. In some printing modes, the feed amount of the sub-scan is a constant value, and in other printing modes, the feed amount of the sub-scan is a combination of a plurality of amounts the execution sequence of which is determined. Using the main scan and the sub-scan, the nozzle of the print head is disposed at a variety of positions relative to the print medium, and ink droplets are ejected at a variety of positions in the print medium.

In the information 1050 of the operation setup parameters of the printer, there are included an upper limit value of the temperature in the use environment assumed in the printer, slipperiness of the print medium supplied to the printer, the strength of a force of pressing the print medium when performing printing in the printer, and the strength of a tensile force to be applied to the print medium when performing printing in the printer in addition to the conveying speed of the medium in the printer.

The preparer ID 1110 represents the preparer of the printing setup information Ips. The preparer of the printing setup information Ips is a licensee of the profile preparation tool PMT used when preparing the printing setup information Ips (see a middle right part of FIG. 1). The preparer ID 1110 is automatically stored in the printing setup information Ips by the profile preparation tool PMT when the profile preparation tool PMT prepares the printing setup information Ips. The preparer ID has previously been stored in the profile preparation tool PMT when the profile preparation tool PMT is provided to the medium vendor MV.

The preparer ID is different by the medium vendor MV provided with the profile preparation tool PMT. In other words, the preparer ID can be made to correspond one-to-one to the medium vendor MV allowed to use the profile preparation tool PMT and the business agent of the medium vendor MV. It is also possible to assign the preparer ID to an individual worker as an employee of the medium vendor MV. It is possible for the printing companies PCa, PCb, and PCas which have downloaded the printing setup information Ips from the management server Sv to know the preparer of the printing setup information Ips based on the preparer ID 1110 in the printing setup information Ips (see a lower left part of FIG. 1).

The quality level information 1130 includes evaluation values of a color reproduction accuracy, a color reproduction range, a gradation characteristic, the granularity, and ink bleeding with respect to the printing result. In order to prepare the quality level information 1130, the medium vendor MV performs the following process.

The medium vender MV performs printing of a color chart on the print medium MD using the printer 200*v*. The print data of the color chart has previously been stored in the application software for controlling the printer 200.

The medium vendor MV measures the printing result of the color chart with a sensor of the printer 200*v* to determine the evaluation values with respect to the printing result based on the output of the sensor. Specifically, the color reproduction accuracy, the color reproduction range, and the gradation characteristic are evaluated based on the output of the spectrophotometer. The granularity and the ink bleeding are evaluated based on the output of the digital still camera. The evaluation values of the respective items determined based on the output of the sensors are stored in the printing setup information Ips as the quality level information 1130.

The "color reproduction accuracy" is evaluated based on a difference in color between a colorimetric value of a color actually reproduced on the printed material and a chromatic value when printing is instructed with data of a targeted chromatic value.

The "gradation characteristic" corresponds to the reproducibility of the gradation. For example, when the printing is performed in accordance with the data of the color chart including a series of patches in which the color data is formed so that the depth decreases by a constant amount, the "gradation characteristic" of the profile used for the printing is evaluated as described below. In the series of patches as the printing result, when there is at least one combination of the patches in which the luminance does not decrease in the printing result despite it is the combination of the patches in which the luminance should decrease, the rating of the "gradation characteristic" in the profile degrades in accordance with the number of such combinations in the color data.

In other words, when the luminance does not monotonically decrease in the printing result with respect to the plurality of colors in which the luminance decreases in the color data, the rating of the "gradation characteristic" of the profile degrades. When the luminance does not monotonically increase in the printing result with respect to the plurality of colors in which the luminance increases in the color data, the rating of the "gradation characteristic" of the profile degrades. In this evaluation, a curve of the monotonic decrease or the monotonic increase in the luminance in the printing result can be a curve convex upward, a curve convex downward, or can also have a linear shape. It should be noted that the "gradation characteristic" can similarly be evaluated with respect to the gradation of a transition from a certain color to an other color such as a transition from yellow to red.

The "gradation characteristic" includes linearity. The "linearity" is an index of the fact that a change in color expressed on the print medium approximates to a linear shape with respect to the change in the data of the ink amount to be the input.

The printing setup information Ips is configured so as not to be changed unless application software for managing the printing setup information Ips installed in the management server Sv is used. For example, at least a part of the information stored in the printing setup information Ips including the information 1110, 1120, and 1130 is stored in the printing setup information Ips in the state in which the at least a part of the information can only be distinguished from other information by dedicated application software. As a result, the information in the printing setup information Ips is prevented from being tampered by a third party.

The printing setup information Ips is encrypted. Therefore, the printing setup information Ips can only be used by the application software for managing the printing setup information Ips installed in the management server Sv, or the application software for perform printing with the printer 200 using the printing setup information Ips provided to the printing companies PCa, PCb, and PCas.

The medium vendor MV transmits the sample of the print medium MD used in the printer 200*v* when preparing the printing setup information Ips to the management server Sv when the medium vendor MV uploads the printing setup information Ips to the management server SV, or before uploading the printing setup information Ips.

It should be noted that the process performed by the medium vendor MV described hereinabove is also performed by the printer provider PP.

Figure 5:
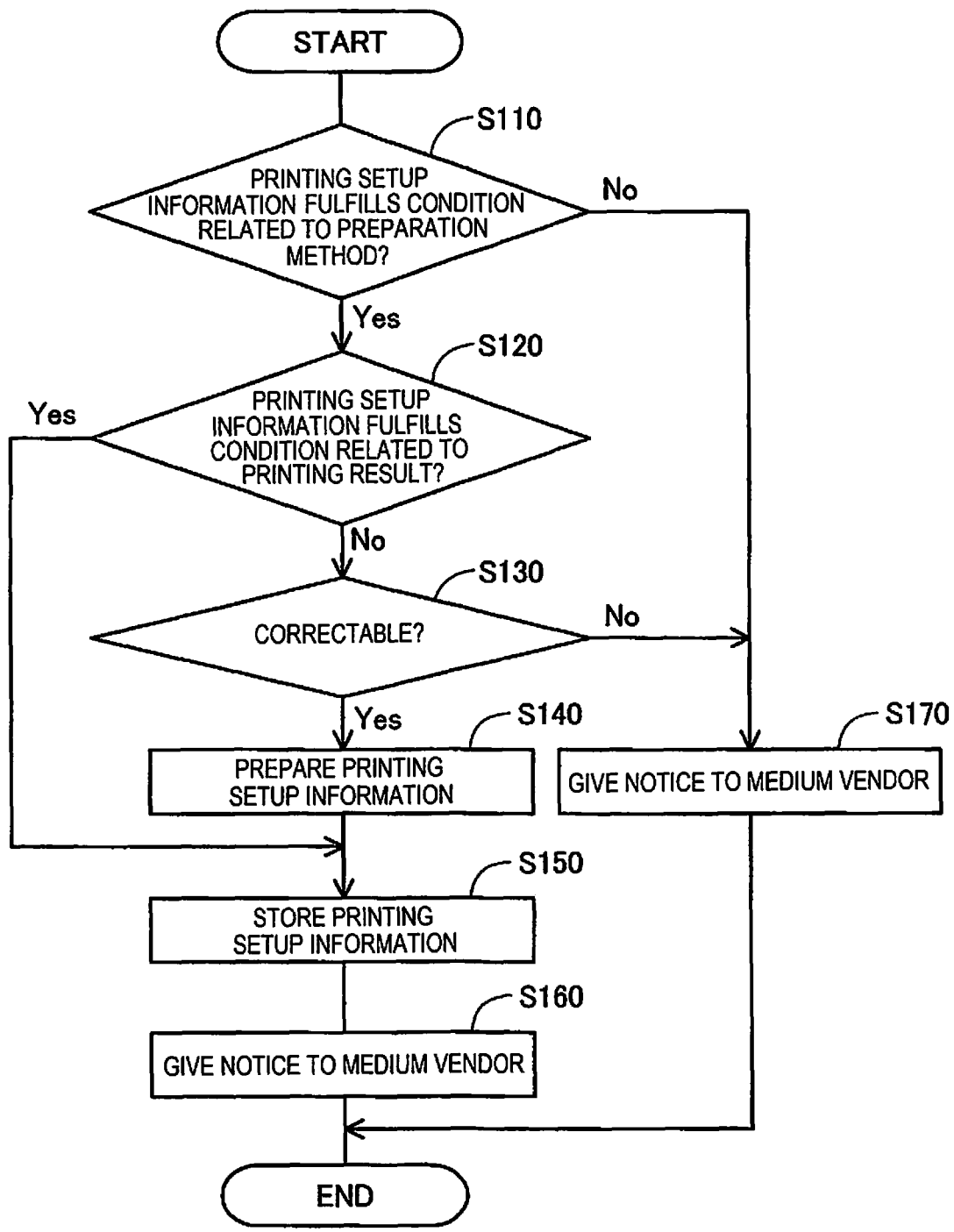
FIG. 5 is a flowchart showing a process of checking and storing the printing setup information Ips in the management server Sv.

(2) Check and Storage of Printing Setup Information:

FIG. 5 is a flowchart showing a process of checking and storing the printing setup information Ips in the management server Sv. When the management server Sv receives the printing setup information Ips from the medium vender MV, the management server Sv performs a process of checking the content of the printing setup information Ips (see an upper middle part of FIG. 1).

In the step S110 shown in FIG. 5, the management server Sv determines whether or not the printing setup information Ips received from the medium vendor MV fulfills the condition related to the preparation method of the printing setup information Ips set in advance.

When the printing setup information Ips does not fulfill the condition related to the preparation method includes, for example, (i) when the printing setup information Ips is not prepared using the regular profile preparation tool PMT licensed to the medium vendor MV, and (ii) when the printing setup information Ips is prepared using the regular profile preparation tool PMT, but is not prepared through a procedure set in advance. The determination in the step S110 can be achieved based on history information stored in the tag of the profile 1060 such as the information 1120 of the preparation method included in the printing setup information Ips (see FIG. 4).

When the printing setup information Ips received from the medium vendor MV fulfills the condition related to the preparation method of the printing setup information Ips, the process proceeds to the step S120. When the printing setup information Ips does not fulfill the condition related to the preparation method, the process proceeds to the step S170.

In the step S170, the management server Sv does not store the printing setup information Ips received from the medium vendor MV, but gives notice that the printing setup information Ips has not stored in the management server Sv to the medium vendor MV having transmitted the printing setup information Ips. On this occasion, the medium vendor MV is also notified of the reason that the printing setup information Ips has not been stored in the management server Sv.

In other words, when the printing setup information Ips having been received from the computer 100*v* does not fulfill the condition (see S110) related to the preparation method of the printing setup information Ips set in advance, the computer 100s of the management server Sv does not store the printing setup information Ips having been received from the computer 100v of the medium vendor MV in the setup storage section 113sS.

In the step S120, the management server Sv determines whether or not the printing setup information Ips received from the medium vendor MV fulfills the condition related to the printing result set in advance. It should be noted that the condition related to the preparation method of the printing setup information Ips determined in the step S110 and the condition related to the printing result determined in the step S120 are collectively referred to as "registration conditions."

In the step S120, the management server Sv performs printing of the color chart with the printer 200s in accordance with the printing setup information Ips having been transmitted from the medium vendor MV. The print data of the color chart has previously been stored in the application software for controlling the printer 200.

In the printing, there is used the printer of the model matching the information 1010 of the model of the printer stored in the printing setup information Ips out of the variety of models of printers held by the management server Sv. Out of samples of a variety of print media MD received from the medium vender MV, there is used the print medium MD corresponding to the information 1020 of the type of the print medium in the printing setup information Ips. There is used the ink of the type coinciding with the information 1030 of the type of the ink in the printing setup information Ips. There is used the printing mode coinciding with the information 1040 of the printing mode in the printing setup information Ips. The operation setup of the printer is executed based on the information 1050 of the operation setup parameters in the printing setup information Ips. The color conversion is performed in accordance with the information 1060 of the profile in the printing setup information Ips.

The management server Sv measures the printing result of the color chart with a sensor of the printer 200s to determine the evaluation values with respect to the quality of the printing result based on the output of the sensor. The determination method of the evaluation value is the same as the method when determining the evaluation value of the printing result in the medium vendor MV.

When all of the evaluation values coincide with the contents of the quality level information 1130 stored in the printing setup information Ips, and are each within a reference range set in advance, the management server Sv determines that the printing setup information Ips received from the medium vendor MV fulfills the condition related to the printing result set in advance. In other cases, the management server Sv determines that the printing setup information Ips received from the medium vendor MV does not fulfill the condition related to the printing result set in advance.

It should be noted that when the evaluation values described above are different from the contents of the quality level information 1130 stored in the printing setup information Ips, but each of the differences is within an allowable range set in advance, the evaluation values are treated as if the evaluation values coincided with the contents of the quality level information 1130 stored in the printing setup information Ips.

When the printing setup information Ips received from the medium vendor MV fulfills the condition related to the printing result, the process proceeds to the step S150. When the printing setup information Ips received from the medium vendor MV does not fulfill the condition related to the printing result set in advance, the process proceeds to the step S130.

In the step S130, the management server Sv determines whether or not it is possible to correct the printing setup information Ips to prepare the printing setup information Ips which fulfills the condition related to the printing result. For example, when the evaluation values related to the quality of the printing result determined in the step S120 do not coincide with the contents of the quality level information 1130 stored in the printing setup information Ips received from the medium vendor MV, but are each within the reference range set in advance, the management server Sv determines that it is possible to prepare the printing setup information Ips which fulfills the condition related to the printing result. When any one of the evaluation values related to the quality of the printing result determined in the step S120 is not within the reference range set in advance, the management server Sv determines that it is not possible to prepare the printing setup information Ips which fulfills the condition related to the printing result.

When it is not possible to correct the printing setup information Ips to prepare the printing setup information Ips which fulfills the condition related to the printing result, the process proceeds to the step S170. In other words, when the printing setup information Ips having been received from the computer 100v of the medium vendor MV does not fulfill the condition (see steps S120, S130) related to the printing result set in advance, the computer 100s of the management server Sv does not store the printing setup information Ips having been received from the computer 100v in the setup storage section 113sS.

In contrast, when it is possible to correct the printing setup information Ips to prepare the printing setup information Ips which fulfills the condition related to the printing result, the process proceeds to the step S140.

In the step S140, the management server Sv corrects the printing setup information Ips to prepare the printing setup information Ips which fulfills the condition related to the printing result. For example, when the evaluation values related to the quality of the printing result do not coincide with the contents of the quality level information 1130 stored in the printing setup information Ips received from the medium vendor MV, but are each within the reference range set in advance, the management server Sv performs the following process. That is, the management server Sv rewrites the evaluation values of the quality level information 1130 out of the printing setup information Ips received from the medium vendor MV with the evaluation values related to the quality of the printing result determined in the step S120 to prepare new printing setup information Ips (see FIG. 4).

The processes in the steps S120, S130, and S140 can be performed by the management server Sv, or can also be performed by other facilities or organizations to which the printing setup information Ips is transferred from the management server Sv. The other facilities or organizations which perform the processes of the steps S120, S130, and S140 can be the printer provider PP (see a middle right part of FIG. 1), or can also be facilities or organizations other than the printer provider PP. It should be noted that the facilities or the organizations other than the printer provider PP for performing the processes in the steps S120, S130, and S140 are the facilities or the organizations which are qualified by the printer provider PP to perform the processes in the steps S120, S130, and S140. When the facilities or the organizations other than the management server Sv perform the processes in the steps S120, S130, and S140, the sample of the print medium MD used in the printer 200v when preparing the printing setup information Ips is sent by the medium vendor MV to the facilities or the organizations.

In the step S150, the management server Sv stores the printing setup information Ips in the RAM 113s. When the process in the step S150 has been reached without going through the process in the step S140, the management server Sv stores the printing setup information Ips received from the medium vendor MV in the RAM 113s. When the process in the step S150 has been reached via the process in the step S140, the management server Sv stores the printing setup information Ips prepared in the step S140 in the RAM 113s.

In other words, when the printing setup information Ips having been received from the computer 100v of the medium vendor MV fulfills the registration condition including the condition related to the preparation method of the printing setup information Ips and the condition related to the printing result (see S110, S120), the computer 100s of the management server Sv stores the printing setup information Ips having been received from the computer 100v in the setup storage section 113sS. Subsequently, the process terminates.

By performing such processes, it is possible to control the quality of the printing setup information Ips provided from the management server Sv to the printing companies PCa, PCb, and PCas.

(3) Download of Printing Setup Information and Printing:

The printing company PCa downloads the printing setup information Ips corresponding to the combination of the printer 200a used for printing in the printing company PCa and the print medium MD from the management server Sv (see a middle left part of FIG. 1). The printing company PCa performs the setup based on the printing setup information Ips on the software for controlling the printer 200a to perform printing.

As the process due to the hardware, the following process is performed. That is, the computer 100a of the printing company PCa transmits the acquisition request of the printing setup information Ips specified by the combination of the model of the printer 200a and the type of the print medium MD to the computer 100s of the management server Sv. The computer 100a of the printing company PCa receives the printing setup information Ips specified in the one or more pieces of printing setup information Ips stored in the setup storage section 113sS of the management server Sv from the computer 100s of the management server Sv (see an upper right part of FIG. 3).

More specifically, the printing company PCa downloads the printing setup information Ips corresponding to (i) the model of the printer 200a, (ii) the type of the print medium MD, and (iii) the type of the ink used for printing in the printing company PCa from the management server Sv. On the other hand, in the printing company PCa, it is also possible to select the print medium to be used for printing in accordance with the information 1020 of the type of the print medium included in the printing setup information Ips thus downloaded. It is also possible to select the ink to be used for printing in accordance with the information 1030 of the type of the ink included in the printing setup information Ips (see FIG. 4).

The printer 200a to be used for printing in the printing company PCa is a printer 200 the same in model as the printer 200 used for specifying the printing setup information Ips in the acquisition request of the printing setup information Ips. The printer 200a performs printing using the printing setup information Ips received by the computer 100a of the printing company PCa. On this occasion, the printer 200a performs printing on the print medium MD of the type the same as the type 1020 of the print medium MD used for specifying the printing setup information Ips in the acquisition request of the printing setup information Ips.

In the printing company PCa, the printing mode to be used when performing printing is selected in accordance with the information 1040 of the printing mode included in the printing setup information Ips (see FIG. 4). The setup parameter to be used when performing printing is set in accordance with the information 1050 of the operation setup parameters included in the printing setup information Ips. The color conversion of the image data to be used for printing is performed using the information 1060 of the profile included in the printing setup information Ips. Each of the processes is executed by the computer 100a in which the program for controlling the printer 200a is installed.

It is possible for the application software for controlling the printer 200a provided to the printing company PCa to retrieve and then display (i) the preparer ID 1110 of the preparer of the printing setup information Ips, (ii) the information 1120 of the preparation method, and (iii) the quality level information 1130 representing the quality of the printing result (see FIG. 4) stored in the printing setup information Ips on the display device 115a. Therefore, it is possible for the printing company PCa to check the contents of the information prior to the color conversion.

The printed materials PM produced by the printing company PCa are delivered to the ordering party OP (see a lower middle part of FIG. 1). The ordering party OP pays the compensation Pcp0 for the printed materials PM to the printing company PCa.

It is possible for the printing company PCb and the printing company PCas to perform substantially the same process to perform printing with the printers 200b, 200as. It should be noted that it is also possible for the printing company PCas to receive the printing setup information Ips from the printing company PCa instead of the download of the printing setup information Ips from the management server Sv (see a lower left part of FIG. 1).

It is possible for the printing companies PCa, PCb, and PCas to obtain the following advantages by performing the setup based on the printing setup information Ips on the software for controlling the printers 200a, 200b, and 200as and performing printing. Specifically, it is possible for the printing companies PCa, PCb, and PCas to produce the printed materials having the high quality which has been achieved when the medium vendor MV has decided (i) the models of the printers 200a, 200b, and 200as, (ii) the type of the print medium MD, (iii) the type of the ink, (iv) the printing mode, and (v) the setup parameters to prepare the printing setup information Ips. Further, it is possible for the printing companies PCa, PCb, and PCas to perform setup of the printers 200a, 200b, and 200as in a short time compared to when the printing companies themselves perform the setup of the printers 200a, 200b, and 200as through a trial and error process.

The management server Sv stores a plurality of pieces of printing setup information Ips (see the upper middle part of FIG. 1). It is possible for the management server Sv to allow only the computer of the printing company fulfilling the condition set in advance to download some pieces of printing setup information Ips out of the plurality of pieces of printing setup information Ips.

For example, in the printing system PS, it is possible for the printing companies to make some contracts different in fee level from each other with a system administrator, and it is possible for the management server Sv to allow only the printing company having made the contract no lower in fee level than a certain level to download some pieces of printing setup information Ips. Further, it is also possible for the management server Sv to allow the printing company which has not made a contract for value to download other some pieces of printing setup information Ips.

It is possible for the management server Sv to allow only the printing company having the printer 200 connected to the network to download certain printing setup information Ips.

It is also possible for the management server Sv to permit the download in accordance with the type of the process following the printing by the printer 200 in each of the printing companies. For example, for the printing company which performs printing on the print medium, then attaches a transparent or translucent resin sheet on the print surface, and then performs lamination, it is possible for the medium vendor MV to prepare the printing setup information Ips different from the printing setup information Ips targeted at the printing company which does not perform such a process. Further, it is also possible for the management server Sv to allow only the printing company having registered in advance on the management server Sv to perform the lamination after performing printing to download the printing setup information Ips assuming such lamination.

On the other hand, it is also possible to arrange that the recording medium for lamination is provided with an RFID (Radio Frequency IDentifier) or a QR code (registered trademark), and it is possible for the printing company to download the printing setup information Ips for lamination by transmitting the information retrieved from the RFID or the QR code to the management server Sv. The lamination is performed for the purpose of improving a light resistance property and an abrasion resistance property.

By performing such a process, it is possible to operate the printing system so that only the printing setup information suitable for the printing company can be downloaded to the printing company.

The plurality of pieces of printing setup information Ips stored in the management server Sv includes a plurality of types of printing setup information Ips different in compensation for the download from each other. Further, the plurality of pieces of printing setup information Ips stored in the management server Sv includes a plurality of types of printing setup information Ips different in quality (see the reference numeral 1130) of printing result from each other. The printing companies PCa, PCb each pay a compensation Pcp1 corresponding to (i) the compensation for the download of the individual printing setup information Ips, (ii) the quality (see the reference numeral 1130 shown in FIG. 4) of the printing result of the printing setup information Ips, (iii) the number of pieces of printing setup information Ips downloaded by the printing company from the management server Sv, and (iv) the duration of use of the downloaded printing setup information Ips to the printer provider PP (see a central part of FIG. 1).

More specifically, the computers 100*a*, 100*b* of the printing companies PCa, PCb transmit the information Pcp1 representing the compensation to the computer 100*pp* of the printer provider PP via the computer 100*s* of the management server Sv.

The compensation for the download of the individual printing setup information Ips can be made different by the printing setup information Ips. Further, it is also possible to prepare the printing setup information Ips which does not require the compensation for the download of the individual printing setup information.

As the aspect of the payment of the compensation corresponding to the quality of the printing result of the printing setup information Ips, it is possible to adopt an aspect in which the higher the quality is, the higher charge is paid. It is also possible to adopt an aspect in which there is provided a classification of the quality of the printing result of the printing setup information Ips which can be downloaded, and the class of the quality of the printing result of the printing setup information Ips which can be downloaded is set in accordance with the compensation paid in advance.

As the aspect of the payment of the compensation corresponding to the number of pieces of printing setup information Ips which has been downloaded, it is possible to adopt an aspect in which the larger the number of downloaded pieces is, the higher charge is paid. It is also possible to adopt an aspect in which there is provided a classification of the number of pieces of printing setup information Ips which can be downloaded, and the upper limit of the number of pieces of printing setup information Ips which can be downloaded is set in accordance with the compensation paid in advance.

As the setting of the compensation corresponding to the duration of use, it is possible to adopt the setting in which free use of the printing setup information Ips is permitted for a certain trial period after the download, the compensation for use is required after the certain trial period elapses. Further, it is also possible to adopt the setting in which every time the printing setup information Ips is used for a certain period of time, for example, one month, the compensation therefor is required.

By performing such a process, it is possible for the printer provider PP to obtain the compensation Pcp1 corresponding to the content on which the printing companies PCa, PCb make use of the printing system PS. In accordance with the increase in compensation Pcp1 paid to the printer provider PP, it is possible for the printing companies PCa, PCb to make greater use of the printing system PS to perform printing. Therefore, it is difficult for the printing companies PCa, PCb to feel the variation in compensation Pcp1 corresponding to (i) the compensation for the download, (ii) the quality of the printing result, (iii) the number of pieces of printing setup information Ips downloaded, and (iv) the duration of use of the printing setup information Ips as a major burden.

The printing companies PCa, PCb pay the compensation Pcp2 corresponding to the amount of printing using the printing setup information Ips downloaded to the printer provider PP (see the central part of FIG. 1).

More specifically, the computers 100*a*, 100*b* of the printing companies PCa, PCb transmit the information Pcp2 representing the compensation to be paid in accordance with the amount of printing to the computer 100*pp* of the printer provider PP via the computer 100*s* of the management server Sv.

The amount of printing can be counted with the number of times of ejection of the ink droplet performed in each of the printers 200*a*, 200*b*. The software for controlling the printer 200 is capable of counting the number of times of ejection of the ink droplet. Further, the amount of printing can be counted with the amount of the ink consumed in the printing. It should be noted that since the ink is also consumed in the nozzle cleaning of the printer 200, the number of times of ejection of the ink droplet more accurately reflects the amount of the printed materials obtained by the printing companies PCa, PCb than the consumption of the ink.

The amount of printing can also be counted with the amount of the print medium MD used for the printing. When the print medium MD is a rolled elongated medium, the amount of the print medium MD can be evaluated with the length of the print medium MD used. When the print medium MD is a sheet-like medium, the amount of the print medium MD can be evaluated with the number of sheets of the print medium MD used.

By performing such a process, it is possible for the printer provider PP to obtain the compensation Pcp2 corresponding to the extent to which the printing companies PCa, PCb, and PCas make use of the printing system PS. In accordance with the increase in compensation Pcp2 paid to the printer provider PP, it is possible for the printing companies PCa, PCb to make greater use of the printing system PS to perform printing. Therefore, the increase in the compensation Pcp2 corresponding to the increase in the amount of printing is difficult to be felt as a major burden for the printing companies PCa, PCb.

(4) Advantages:

According to the present embodiment, the following advantages are provided compared to the aspect in which the mailing of the color chart sample is included in the process performed before setting the printing setup information Ips to the software for controlling the printers 200a, 200b, and 200as. In other words, it is possible for the printing companies PCa, PCb, and PCas to obtain the printing setup information Ips corresponding to the combination of the printers 200a, 200b, and 200as and the print medium MD to be used for printing in a short time.

According to the present embodiment, it is possible for the medium vendor MV to prepare the printing setup information Ips with which the optimum printing can be performed on the print medium MD manufactured by the medium vendor MV itself to the printing companies PCa, PCb as purchasers of the print medium MD. Therefore, it is possible for the medium vendor MV to reinforce the advantage in using the print medium MD manufactured by itself compared to the medium vendor which does not provide the printing setup information Ips with which the optimum printing can be performed on the print medium.

According to the present embodiment, it is possible for the printer provider PP to prepare the printing setup information Ips with which the appropriate printing can be performed using the printer 200 provided by itself to the printing companies PCa, PCb as users of the printer. Therefore, it is possible for the printer provider PP to reinforce the advantage in using the printer provided by itself compared to the provider which does not provide the printing setup information Ips with which the appropriate printing can be performed using the printer.

According to the present embodiment, there is a high possibility that the printing companies PCa, PCb, and PCas which can obtain the high quality printed materials for a short time using the printer 200 of the printer provider PP continuously use the printer 200, and further purchase the printer of the printer provider PP again when updating the printer. Therefore, according to the present embodiment, it is possible for the printer provider PP to continuously obtain a profit through the sales of the printer and the ink.

The printer provider PP in the present embodiment is also referred to as a "first provider." The medium vendor MV is also referred to as a "second provider." The printing companies PCa, PCb, and PCas are also referred to as "clients." The management server Sv is also referred to as a "storage section." The printer 200v is also referred to as a "provider printer." The printers 200a, 200b, and 200as are each referred to also as a "client printer." The operation setup parameters 1050 of the printer are each referred to also as a "setup parameter."

In the present specification, the computer 100pp of the printer provider PP is also referred to as a "first information terminal." The computer 100v of the medium vendor MV is also referred to as a "second information terminal." The computer 100a of the printing company PCa and the computer 100b of the printing company PCb are each referred to also as a "client information terminal." The management server Sv is also referred to as a "management section."

B. Second Embodiment

In the second embodiment, a part of the process in each of the printing companies PCa, PCb, and PCas is different from that of the first embodiment. Hereinafter, a point in which the second embodiment is different from the first embodiment will be described. The second embodiment is the same as the first embodiment in the other points than the point described hereinafter.

B1. Configuration of Printing System:

The configuration of the printing system PS2 in the second embodiment is the same as that of the printing system PS in the first embodiment.

It should be noted that in the second embodiment, the printing companies PCa, PCb, and PCas periodically perform calibrations of the printer 200a, 200b, and 200as. Specifically, discovery and resolution of a problem in the printers 200a, 200b, and 200as are performed, and a readjustment of each section of the printers 200a, 200b, and 200as irrespective of presence and absence is performed using the application software for controlling the printers 200. This operation includes, for example, resolution of misalignment of the dot formation positions in the main scanning direction in each of the printers 200a, 200b, and 200as, an adjustment of the distance between a platen for supporting the print medium and the nozzle for ejecting the ink, and resolution of clogging of the nozzle. When the calibration of the printer 200 is performed, the application software for controlling the printer 200 stores the time and date when the calibration is performed in the RAM 113a (see a lower left part of FIG. 1). The information of the time and data when the calibration is performed is stored in the RAM 113a in the state in which a party other than the printer provider PP such as the printing companies PCa, PCb, and PCas cannot rewrite the information.

The printing companies PCa, PCb, and PCas undergo a periodic quality audit related to printing by the printer provider PP or a facility or an organization certified by the printer provider PP. The contents of the quality audit are set in advance. The quality audit includes an audit on the operation condition of the printer, and audit on the management state of the ink and the print media, and an audit on the fact that the printing result due to the given print data fulfills a predetermined quality. As a result of the quality audit, when the condition set in advance is fulfilled, the information representing that the condition set in advance is fulfilled is input by the party which has performed the audit to the application software for controlling the printer 200a. As a result of the quality audit, the information representing the fact that it has been confirmed that the condition set in advance has been fulfilled is stored by the application software in the RAM 113a. As a result of the quality audit, the information representing the fact that it has been confirmed that the condition set in advance has been fulfilled is stored in the RAM 113a in the state in which a party other than the printer provider PP such as the printing companies PCa, PCb, and PCas cannot rewrite the information.

Operators and supervisors of the printing companies PCa, PCb, and PCas are enrolled in a periodic educational course related to printing held by the printer provider PP or a facility or an organization certified by the printer provider PP. The contents of the course are set in advance. The course includes initiation of knowledge related to, for example, what should be observed in the operation of the printer, and what should be observed in the storage of the ink and the print media. When the course has been taken, there is issued a certificate of the course including a code constituted by characters or numbers different by the course and the person taking the course. When the code is input to the application software for controlling the printer 200a, the application software confirms that the person taking the course is a licensee of the application software, and further stores the fact that the licensee has finished the course in the RAM 113a. The information representing the fact that a certain person has finished a certain course is stored in the RAM 113a in the state in which a party other than the printer provider PP such as the printing companies PCa, PCb, and PCas cannot rewrite the information.

B2. Process in Printing System:
(1) Preparation and Upload of Printing Setup Information:

The process of preparing and uploading the printing setup information Ips in the second embodiment is the same as the process of preparing and uploading the printing setup information in the first embodiment.

(2) Check and Storage of Printing Setup Information:

The process of checking and then storing the printing setup information Ips in the second embodiment is the same as the process of checking and then storing the printing setup information Ips in the first embodiment.

Figure 6:
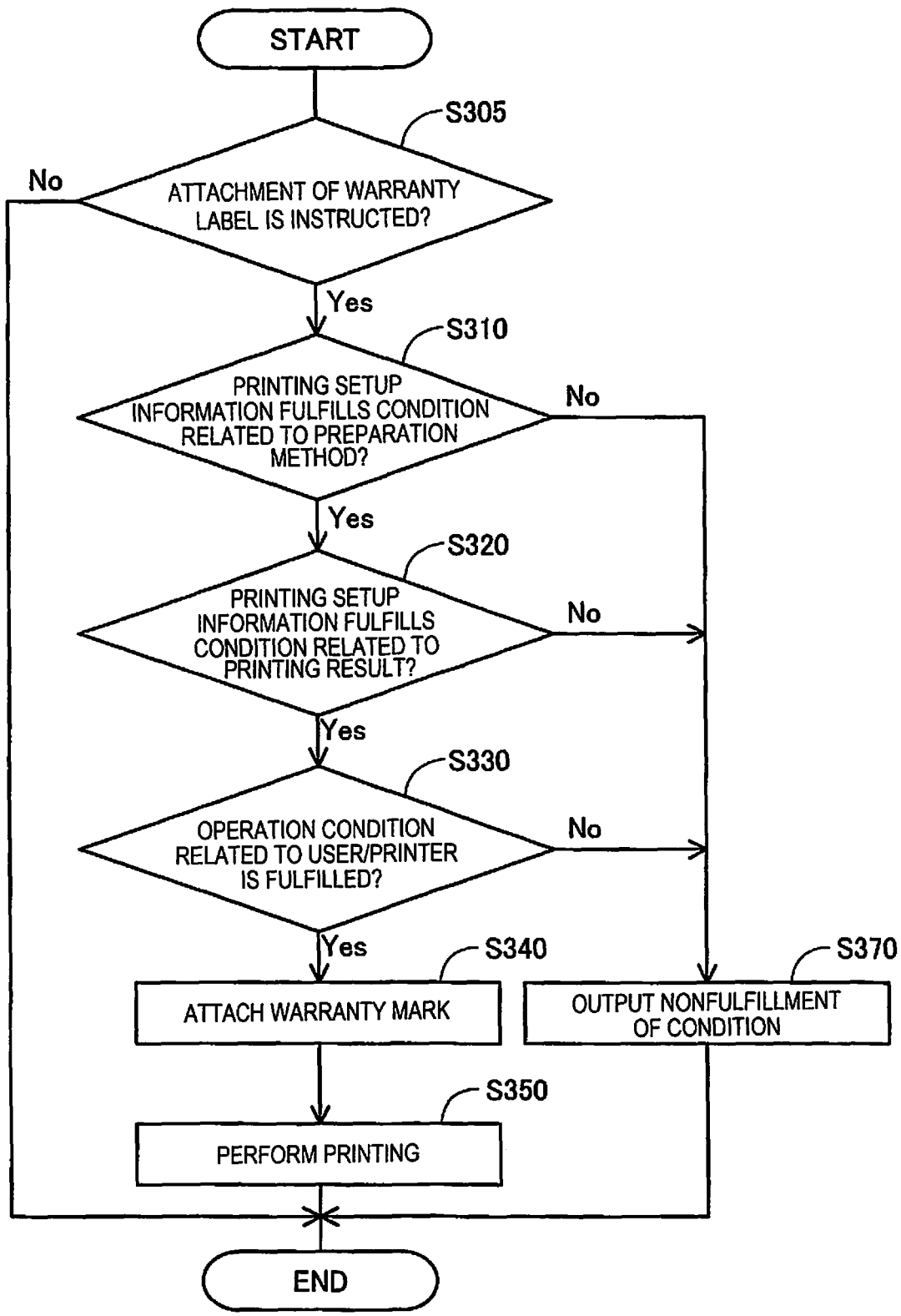
FIG. 6 is a flowchart showing a process to be executed by application software for controlling the printer 200*a* after reading the printing setup information Ips in the printing company PCa.

(3) Download of Printing Setup Information and Printing:

FIG. 6 is a flowchart showing a process to be executed by the application software for controlling the printer 200a after reading the printing setup information Ips in the printing company PCa. The process shown in FIG. 6 is specifically executed by the CPU 111a of the computer 100a (see a middle left part of FIG. 1).

In the step S305 shown in FIG. 6, the CPU 111a determines whether or not addition of a warranty label Mqa to the printed material PM is instructed via the input device 116a.

It is possible for the operator of the printing company PCa to select whether to add the warranty label Mqa to the printed material PM on the interface screen of the application software displayed on the display device 115a using the input device 116a (see a middle left part of FIG. 1). In other words, in the computer 100a and the printer 200a of the printing company PCa, even when the quality assurance condition described later is fulfilled, it is possible to make a selection of not forming the warranty label Mqa in an area on the printed material PM in printing. By performing such a process, when the ordering party OP which has requested the printing company PCa to perform printing does not want the display of the warranty label Mqa, it is possible to meet the requirement of the ordering party OP.

When the attachment of the warranty label Mqa to the printed material PM is instructed, the process proceeds to the step S310. When the attachment of the warranty label Mqa to the printed material PM is not instructed, the process terminates.

In the step S310, the CPU 111a determines whether or not the printing setup information Ips read by the application software fulfills the condition related to the preparation method of the printing setup information Ips set in advance. It should be noted that the condition related to the preparation method of the printing setup information Ips used in the step S310 can be the same as the condition used in the step S110 shown in FIG. 5, or can be a severer condition than the condition of the step S110 decided by the printing company PCa.

When the printing setup information Ips read by the application software fulfills the condition related to the preparation method of the printing setup information Ips, the process proceeds to the step S320. When the printing setup information Ips does not fulfill the condition related to the preparation method, the process proceeds to the step S370.

In the step S370, the CPU 111a does not execute the setup and the printing according to the printing setup information Ips read by the application software, but performs output of the fact that the setup and the printing according to the printing setup information Ips have not been performed via the display device 115a. On that occasion, the reason that the setup and the printing according to the printing setup information Ips is not performed is also displayed.

In the step S320, the CPU 111a determines whether or not the printing setup information Ips read by the application software fulfills the condition related to the printing result set in advance. Specifically, the CPU 111a determines whether or not the contents of the quality level information 1130 stored in the printing setup information Ips are each within a reference range set in advance. It should be noted that the reference range used in the step S320 can be the same as the reference range used in the step S120 shown in FIG. 5, or can also be a severer reference range than the reference range of the step S120 decided by the printing company PCa.

More specifically, in the step S320, the CPU 111a makes the following determination. The CPU 111a determines whether or not the color reproduction accuracy in the quality level information 1130 fulfills the accuracy condition of being higher than a standard set in advance. The CPU 111a determines whether or not the gradation characteristic condition that the rating of the gradation characteristic in the quality level information 1130 is higher than a standard set in advance is fulfilled.

Further, the CPU 111a determines whether or not a color difference between a chromatic value representing a target color and a calorimetric value as a result obtained by printing the target color with the printer 200a is within a certain standard. Specifically, the CPU 111a performs printing of the print data of the job Jb with the printer 200a in accordance with the printing setup information Ips read by the application software. This printing is the printing performed for the determination in the step S320. This printing can be performed with respect to a part of the image included in the print data of the job Jb instead of the whole of the image.

In the printing, the print medium MD used in the execution of the job Jb is used. There is used the ink of the type coinciding with the information 1030 of the type of the ink in the printing setup information Ips. There is used the printing mode coinciding with the information 1040 of the printing mode in the printing setup information Ips. The operation setup of the printer is executed based on the information 1050 of the operation setup parameters in the printing setup information Ips. The color conversion is performed in accordance with the information 1060 of the profile in the printing setup information Ips.

The CPU 111a measures one or more points in the printed material PM obtained in accordance with the print data of the job Jb using a sensor of the printer 200a, and then decides the evaluation value related to the quality of the printing result based on the output of the sensor. More specifically, the CPU 111a decides the color difference ΔE between the colorimetric value of the color included in the one or more points in the print sample formed by the printer 300 of the business office PCao and the colorimetric value of the color included in the corresponding point in the printed material PM obtained by the printer 200a. Then, whether or not the color differences ΔE of the respective points are all within a reference set in advance is determined. For example, whether or not the color differences ΔE of the respective points are smaller than 2.0 is determined. It should be noted that the colorimetry of the print sample is performed in advance, and the colorimetric values of the colors included in one or more points in the print sample are prepared in advance.

It should be noted that the determination on whether or not the color difference between the chromatic value representing the target value and the colorimetric value of the result obtained by printing the target color is within a certain standard in the step S320 can also be performed separately from the other determination in the step S320 after the application software for controlling the printer 200a reads the printing setup information Ips. In such a case, the result of the determination on the color difference performed in advance is stored in the RAM 113a, and is then retrieved from the RAM 113a in the process in the step S320.

Further, the determination on whether or not the color difference between the chromatic value representing the target color and the calorimetric value as the result obtained by printing the target color is within a certain standard can also be performed in accordance with the print data of the color chart including a plurality of patches of different colors instead of the printing result of the job Jb. The print data of the color chart has previously been stored in the application software for controlling the printer 200.

In the step S320, when all of the conditions are fulfilled, the CPU 111a determines that the printing setup information Ips read by the application software fulfills the condition related to the printing result set in advance. In other cases, the CPU 111a determines that the printing setup information Ips read by the application software does not fulfill the condition related to the printing result set in advance.

By performing such a process prior to the printing of the warranty label Mqa (see a lower middle part of FIG. 1), it is possible for the ordering party OP having requested the printing to the printing company PCa to obtain warranty that the quality of the printed material PM is high since the printed material PM is provided with the warranty label Mqa.

When the printing setup information Ips read by the application software fulfills the condition related to the printing result, the process proceeds to the step S330. When the printing setup information Ips read by the application software does not fulfill the condition related to the printing result set in advance, the process proceeds to the step S370.

In the step S330, the CPU 111a determines whether or not the user and the printer 200a fulfill the operation condition set in advance. It should be noted that the condition related to the preparation method of the printing setup information Ips determined in the step S310, the condition related to the printing result determined in the step S320, and the operation condition related to the user and the printer determined in the step S330 are collectively referred to as "warranty conditions."

Specifically, in the step S330, the CPU 111a makes the following determination. The CPU 111a determines whether or not the printing company PCa fulfills the condition that the printing company PCa undergoes a periodic quality audit related to printing set in advance. The information of the fact that the printing company undergoes the periodic quality audit related to printing is stored in advance in the RAM 113a by the application software for controlling the printer 200a. The CPU 111a makes the determination described above using the information stored in the RAM 113a.

The CPU 111a determines whether or not the printing company PCa fulfills the condition that the printing company PCa takes a periodic course related to printing set in advance. The information of the fact that the printing company takes the periodic course related to printing is stored in advance in the RAM 113a by the application software for controlling the printer 200a. The CPU 111a makes the determination described above using the information stored in the RAM 113a.

The CPU 111a determines whether or not the time and date when a calibration of the printer 200a has been performed fulfill the condition related to a period set in advance. The information of the time and date when the calibration has been performed is stored in advance in the RAM 113a by the application software for controlling the printer 200a. The CPU 111a makes the determination described above using the information stored in the RAM 113a.

The CPU 111a determines whether or not the ink used in the printer 200a fulfills the condition related to the manufacturer of the ink. The condition related to the manufacturer of the ink is that the ink used in the printer 200a is the ink manufactured by the printer provider PP or a facility or an organization certified by the printer provider PP.

The ink container as a genuine product housing the genuine ink is provided with a control circuit. The control circuit of the ink container transmits the information of the manufacturer of the ink container to the printer 200 when the ink container is attached to the printer 200. The CPU 111a is capable of obtaining the information of the manufacturer of each of the ink containers attached to the printer 200a from the printer 200a. When the ink in the plurality of ink containers attached to the printer 200a includes ink other than the ink manufactured by the printer provider PP or the facility or the organization certified by the printer provider PP, the CPU 111a determines that the ink used in the printer 200a does not fulfill the condition related to the manufacturer of the ink.

The CPU 111a determines whether or not the printer 200a fulfills the condition that the ink which does not pass the expiration data set in advance is used. The ink has the expiration data. The control circuit of the ink container transmits the expiration date of the ink container to the printer 200 when the ink container is attached to the printer 200. It is possible for the CPU 111a to obtain the expiration date of each of the ink containers attached to the printer 200a from the printer 200a. When one or more of the ink containers attached to the printer 200a pass the expiration date, the CPU 111a determines that the printer 200a does not fulfill the condition that the ink which does not pass the expiration date set in advance is used.

In the step S330 shown in FIG. 6, the CPU 111a of the computer 100a of the printing company PCa performs the following determination process to determine whether or not the user and the printer 200a fulfill the operation condition set in advance.

By performing such a process prior to the printing of the warranty label Mqa (see a lower middle part of FIG. 1), it is possible for the ordering party OP having requested the printing to the printing company PCa to obtain warranty that the quality of the printed material PM is high since the printed material PM is provided with the warranty label Mqa.

When the user and the printer 200a fulfill the operation condition set in advance, the process proceeds to the step S340. When the user and the printer 200a do not fulfill the operation condition set in advance, the process proceeds to the step S370.

In the step S340, the CPU 111a attaches data of the warranty label Mqa set in advance to the print data including target data based on which printing is performed on the print medium MD. More specifically, the print data is altered so that the warranty label Mqa is printed in an area Af which is an area located on the print medium MD and between an image Img as a printing target and an outer edge MDe of the print medium MD.

The data of the warranty label Mqa is stored in advance in the application software for controlling the printer 200. The data of the warranty label Mqa is stored in the RAM 113a in the state in which a party other than the printer provider PP such as the printing companies PCa, PCb, and PCas cannot rewrite the data.

In the step S350, the CPU 111a performs printing in accordance with the print data altered in the step S340 using the printer 200a which has been set up in accordance with the printing setup information Ips.

In other words, when the warranty conditions (see the steps S310, S320, and S330) including the fact that the printing setup information Ips fulfills a condition set in advance are fulfilled, it is possible for the printers 200a, 200b to print the warranty label Mqa set in advance in the area Af which is located on the print medium MD, and is different from that of the image as the printing target in the printing.

Figure 7:
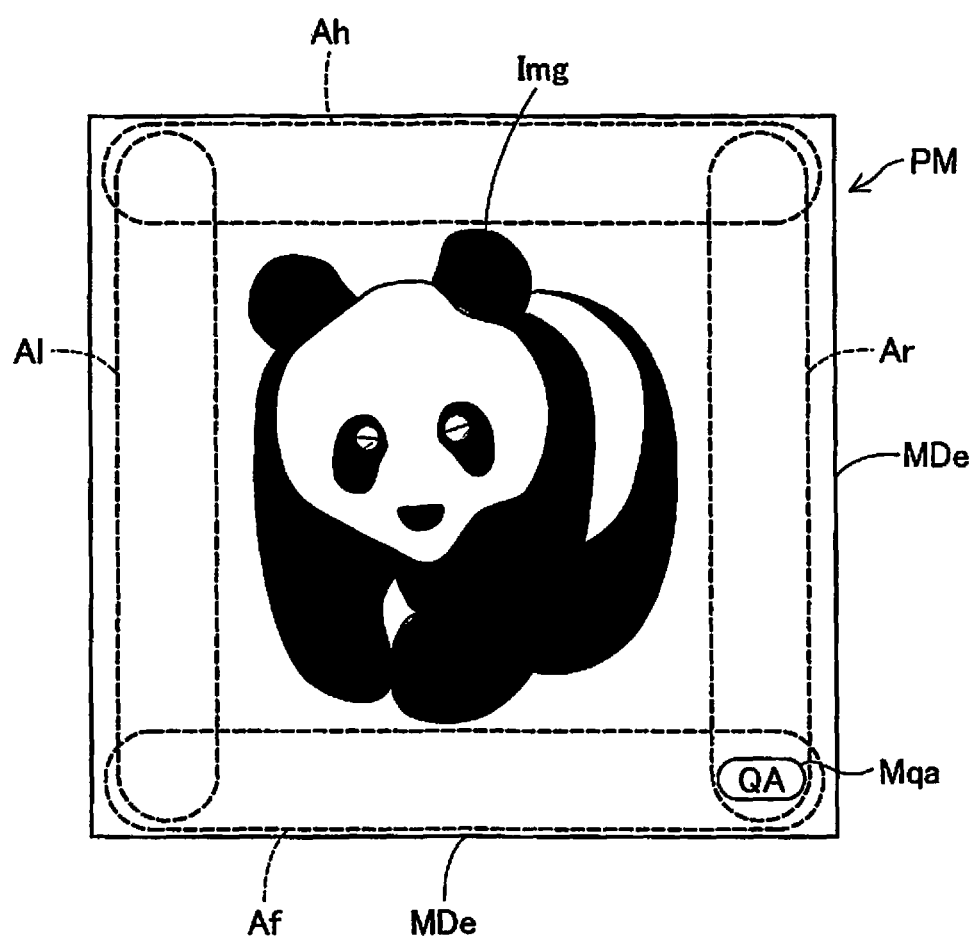
FIG. 7 is a diagram showing a printed material PM to be made as a result of the printing performed in the step S350 shown in FIG. 6.

FIG. 7 is a diagram showing a printed material PM to be made as a result of the printing performed in the step S350 shown in FIG. 6. In the step S350 shown in FIG. 6, the warranty label Mqa is printed in the area which is an area located on the print medium MD and between the image Img as a printing target and the outer edge MDe of the print medium MD. More specifically, the warranty label Mqa is printed in the footer Af of the printed material PM.

By performing such a process, when the setup of the printer 200a has been performed based on the printing setup information Ips not fulfilling the condition set in advance, and the printing has been performed, or when there is such a possibility, it is possible for the ordering party OP having requested the printing to the printing company PCa to know that fact since the warranty label Mqa is not provided to the printed material PM. In other words, the quality of the printed material is assured by the warranty label Mqa attached to the printed material PM.

When the printing in accordance with the print data altered in the step S340 is completed, the CPU 111a uploads the information of the fact that the printed materials PM of the job Jb have been produced by the printing fulfilling the warranty conditions together with the information with which the job Jb can be identified and the image as the printing target of the job Jb to the management server Sv. Subsequently, the process terminates.

It is possible for the ordering party OP to confirm the fact that the printed materials PM of the job Jb are produced by the printing fulfilling the warranty conditions by getting access to the management server Sv using the web browser or dedicated application software on the computer to input the information with which the job Jb can be identified.

It is also possible for the printing company PCa to perform printing for the job Jb without going through the process shown in FIG. 6. In such a case, the warranty label Mqa is not attached to the printed material MP.

The printer provider PP in the present embodiment is also referred to as the "first provider." The medium vendor MV is also referred to as the "second provider." The printing companies PCa, PCb, and PCas are also referred to as the "clients." The management server Sv is also referred to as the "storage section." The printer 200pp is also referred to as a "first provider printer." The printer 200v is also referred to as a "second provider printer." The printers 200a, 200b, and 200as are each referred to also as the "client printer." The operation setup parameters 1050 of the printer are each referred to also as the "setup parameter."

C. Third Embodiment

In the third embodiment, a method of deciding the compensation will be described in detail. The third embodiment is the same as the first embodiment in the other points than the point hereinafter described specifically.

Figure 8:
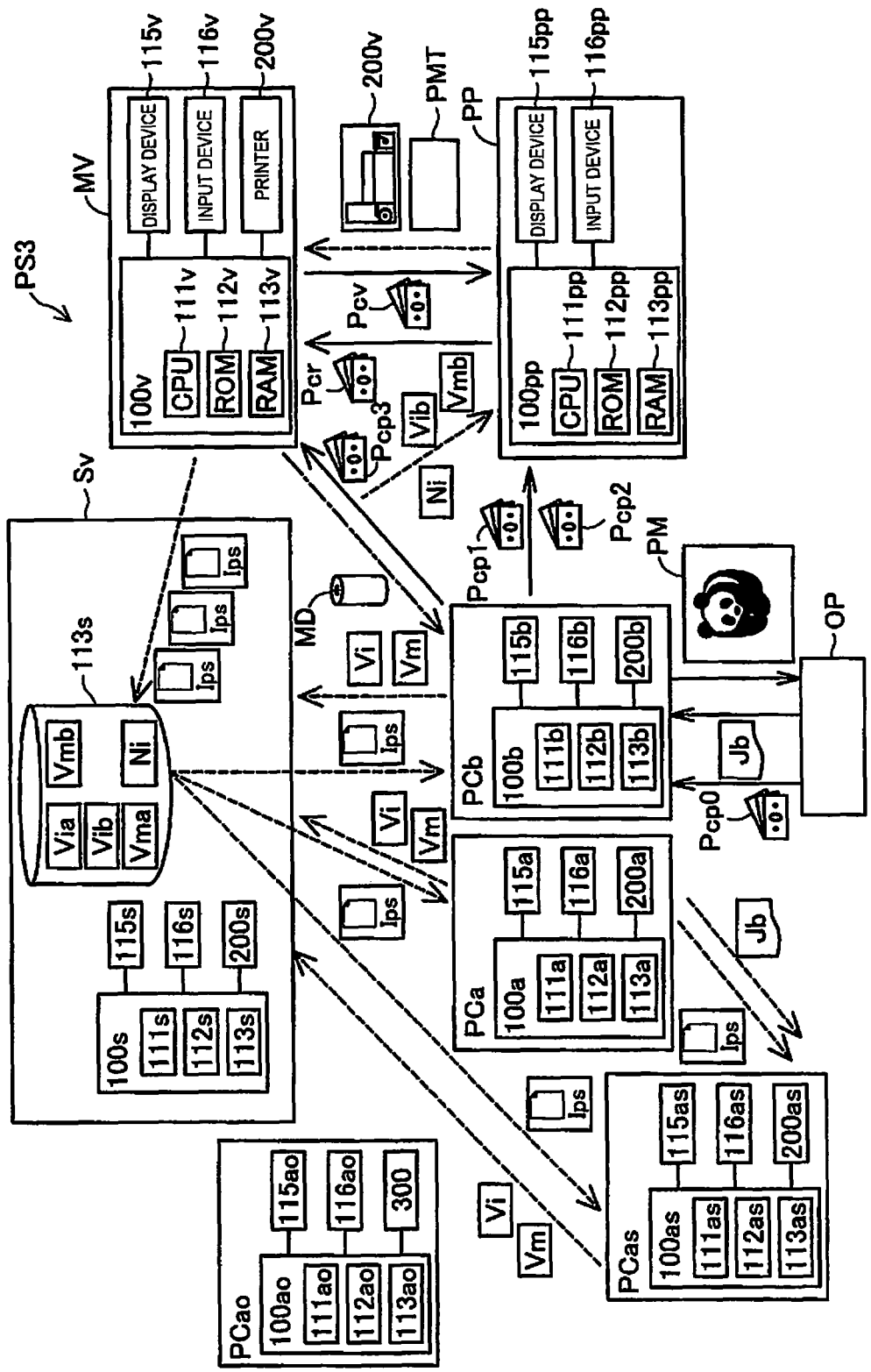
FIG. 8 is an explanatory diagram showing a printing system PS3 according to the present embodiment.

C1. Configuration of Printing System:

FIG. 8 is an explanatory diagram showing a printing system PS3 according to the present embodiment. The configuration of the printing system PS3 in the third embodiment is the same as that of the printing system PS in the first embodiment. In FIG. 8, the constituents common to FIG. 1 will be shown with the common reference symbols attached.

C2. Process in Printing System:

(1) Preparation and Upload of Printing Setup Information:

The process of preparing and uploading the printing setup information Ips in the third embodiment is the same as the process of preparing and uploading the printing setup information in the first embodiment.

(2) Check and Storage of Printing Setup Information:

The process of checking and then storing the printing setup information in the third embodiment is the same as the process of checking and then storing the printing setup information Ips in the first embodiment.

Figure 9:
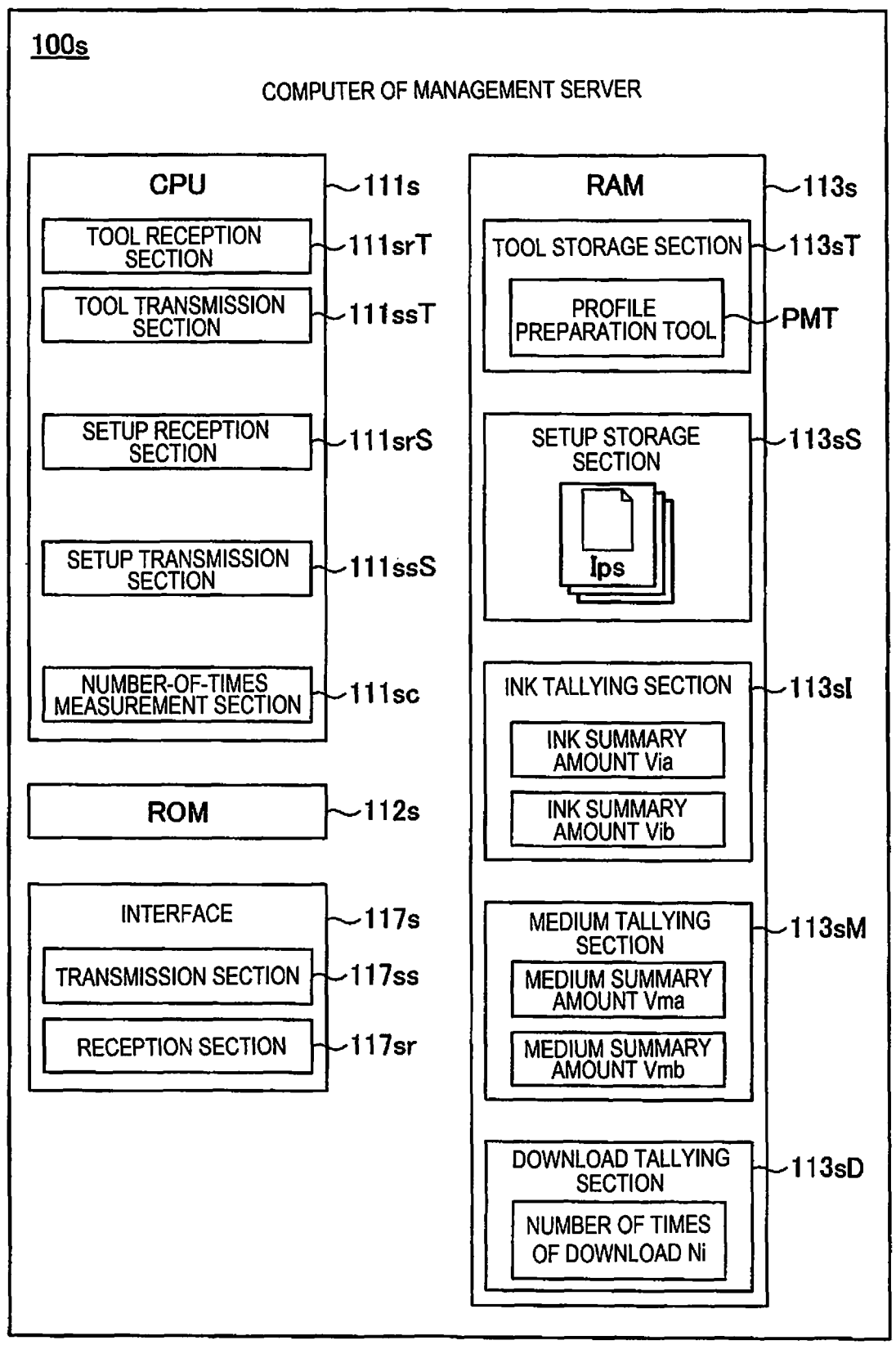
FIG. 9 is a block diagram showing functional blocks of the computer 100s of the management server Sv in a third embodiment.

(3) Download of Printing Setup Information and Printing:

In the third embodiment, the management server Sv measures the number of times of download by the printing companies PCa, PCb for each piece of the printing setup information Ips, and then stores the result in the RAM 113s of the computer 100s. The management server Sv increments the number of times of download stored for each piece of the printing setup information Ips by one every time the printing setup information Ips is transmitted to the printing companies PCa, PCb in accordance with the request from the printing companies PCa, PCb. The information of the number of times of download measured for each piece of the printing setup information Ips is shown in FIG. 8 collectively as Ni. The number of times of download Ni is cleared periodically, for example, every month, and is then counted again from the start. A functional section for measuring the number of times obtained by the computers 100a, 100b for each piece of the printing setup information Ips in the CPU 111s of the management server Sv is shown in FIG. 9 as a "number-of-times measurement section 111sc." A functional section for storing the number of times of download Ni is shown in FIG. 9 as a download tallying section 113sD.

The printing company PCa pays the compensation Pcp2 corresponding to the amount of printing using the printing setup information Ips downloaded to the printer provider PP (see the central part of FIG. 8). The amount of printing can be evaluated by an amount Vm of the print medium MD used in the printing by the client printer 200a on which the setup based on the printing setup information Ips has been performed. The amount Vm of the print medium MD used in the printing by the client printer 200a on which the setup based on the printing setup information Ips has been performed is described as a "medium consumption Vm." The method of calculating the compensation Pcp2 will be described below.

By performing such a process, it is possible for the printer provider PP to obtain the compensation Pcp2 corresponding to the extent to which the printing companies PCa, PCb, and PCas make use of the printing system PS3. In accordance with the increase in compensation Pcp2 paid to the printer provider PP, it is possible for the printing companies PCa, PCb to make greater use of the printing system PS3 to perform printing. Therefore, the increase in the compensation Pcp2 corresponding to the increase in the amount of printing is difficult to be felt as a major burden for the printing companies PCa, PCb.

The printing company PCa measures an amount Vi of the ink used in the printing by the client printer 200a on which the setup based on the printing setup information Ips has been performed. The amount Vi of the ink used in the printing by the client printer 200a on which the setup based on the printing setup information Ips has been performed is described as an "ink consumption Vi." The ink consumption Vi can be counted with the number of times of ejection of the ink droplet performed in each of the printers 200a, 200b. The software for controlling the printer 200 is capable of counting the number of times of ejection of the ink droplet.

The ink consumption Vi can also be counted with an amount of the ink having decreased in an ink tank of the printer 200. It should be noted that since the ink is also consumed in the nozzle cleaning of the printer 200, the number of times of ejection of the ink droplet more accurately reflects the amount of the printed materials obtained by the printing companies PCa, PCb than the decrement of the ink.

FIG. 9 is a block diagram showing functional blocks of the computer 100s of the management server Sv in the third embodiment. The ink consumption Vi is stored in the RAM 113a of the computer 100a so as to be associated with the printing setup information Ips used in that printing. The ink consumption Vi associated with the printing setup information Ips is transmitted from the printing company PCa to the management server Sv (see a middle left part of FIG. 8). Specifically, the computer 100a of the printing company PCa measures the amount of the ink used in the printing by the printer 200a performed using the printing setup information Ips, and then transmits the information Vi of the amount of the ink used to the computer 100s of the management server Sv. As a result, the ink consumption Vi as the information representing the result of the printing by the printer 200a performed using the printing setup information Ips is transmitted to the management server Sv.

The management server Sv tallies the ink consumption Vi for each of the printing companies PCa, PCb, and PCas, and then stores the result in the RAM 113s of the computer 100s as an ink summary amount Via. The ink summary amount Via is used for calculating the compensation Pcp2 to be paid from the printing companies PCa, PCb to the printer provider PP. The ink summary amount Via is cleared periodically, for example, every month, and is then tallied again from the start.

The management server Sv tallies the ink consumption Vi for each piece of the printing setup information Ips, and then stores the result in the RAM 113s of the computer 100s as an ink summary amount Vib. The ink summary amount Vib is cleared periodically, for example, every month, and is then tallied again from the start. A functional section for obtaining the ink summary amounts Via, Vib by tallying is shown in FIG. 9 as an ink tallying section 113sI. The ink tallying section 113sI as the functional section is specifically realized by the RAM 113s (see a middle right part of FIG. 9).

The printing company PCa pays the compensation Pcp3 corresponding to an amount Vma of the print medium used to the medium vendor MV (see the central part of FIG. 8). The specific payment process of the compensation Pcp3 is performed via the management server Sv. By performing such a process, it is possible for the medium vendor MV to obtain the compensation Pcp3 corresponding to the amount of the print medium MD used by the printing company PCa. The method of calculating the compensation Pcp3 will be described below.

The printing company PCa measures an amount Vm of the print medium MD used in the printing by the client printer 200a on which the setup based on the printing setup information Ips has been performed. When the print medium MD is a rolled elongated medium, the amount of the print medium MD can be evaluated with the length of the print medium MD used. When the print medium MD is a sheet-like medium, the amount of the print medium MD can be evaluated with the number of sheets of the print medium MD used.

The amount Vm of the print medium MD used is stored in the RAM 113a of the computer 100a so as to be associated with the printing setup information Ips used in that printing. The medium consumption Vm associated with the printing setup information Ips is transmitted from the printing company PCa to the management server Sv (see a middle left part of FIG. 8).

The management server Sv tallies the medium consumption Vm for each of the printing companies PCa, PCb, and PCas, and then stores the result in the RAM 113s of the computer 100s as a medium summary amount Vma. The medium summary amount Vma is used for calculating the compensation Pcp3 to be paid from the printing companies PCa, PCb to the medium vendor MV. The medium summary amount Vma is cleared periodically, for example, every month, and is then tallied again from the start.

The management server Sv tallies the medium consumption Vm for each piece of the printing setup information Ips, and then stores the result in the RAM 113s of the computer 100s as a medium summary amount Vmb. The medium summary amount Vmb is cleared periodically, for example, every month, and is then tallied again from the start. A functional section for obtaining the medium summary amounts Vma, Vmb by tallying is shown in FIG. 9 as a medium tallying section 113sM. The medium tallying section 113sM as the functional section is specifically realized by the RAM 113s (see a lower right part of FIG. 9).

The medium summary amount Vmb can be used for calculating a reward Pcr to be paid from the printer provider PP to the medium vendor MV. It should be noted that in the present embodiment, the medium summary amount Vmb is not used for calculating the reward Pcr. The reward Pcr is paid in reward for preparing the printing setup information Ips high in value. It should be noted that the reward Pcr is referred to as a "compensation Pcr" in some cases as a collective expression with other compensations.

The printer provider PP obtains the medium summary amount Vmb periodically, for example, every month from the management server Sv. The medium summary amount Vmb represents the result of the printing by the client printers 200a, 200b, and 200as on which the setup based on each of the pieces of printing setup information Ips has been performed in the printing companies PCa, PCb, and PCas.

The printer provider PP decides the reward Pcr based on the ink summary amount Vib for each piece of the printing setup information Ips. The printer provider PP pays the reward Pcr to the medium vendor MV which prepared each piece of the printing setup information Ips (see a middle right part of FIG. 8).

Specifically, the computer 100pp of the printer provider PP receives the information Vib of the amount of the ink for each piece of the printing setup information Ips used in the printing by the client printers 200a, 200b performed using the printing setup information Ips from the management server Sv. As a result, the ink summary amount Vib for each piece of the printing setup information Ips representing the result of the printing is received by the computer 100pp of the printer provider PP. The computer 100pp of the printer provider PP transmits the information Pcr representing the reward decided based on the amount of the ink used in the printing to the computer 100v of the medium vendor MV which transmitted the printing setup information Ips used in the printing by the printers 200a, 200b to the management server Sv. As a result, the information Pcr representing the reward decided based on the result of the printing is received by the computer 100v of the medium vendor MV which transmitted the printing setup information Ips to the management server Sv. It should be noted that the information Pcr representing the reward is transmitted to the computer 100v of the medium vendor MV via the management server Sv.

Substantially the same process is performed also on the printing company PCb and the printing company PCas, and thus, the payment of the compensations Pcp1 through Pcp3, and Pcr is performed.

By performing such a process, it is possible to provide the medium vendor MV with an incentive to prepare the printing setup information Ips which is frequently used by the printing companies PCa, PCb, and PCas, and has a utility value for the printing companies PCa, PCb. As a result, the printing setup information Ips which has a utility value for the printing companies PCa, PCb, and is capable of realizing high-quality printing is prepared by the medium vendor MV. As a result, since high-quality printing is performed by the printer 200 manufactured by the printer provider PP using the high-quality printing setup information Ips, the brand values of the printer 200 manufactured by the printer provider PP and the printer provider PP are raised.

In the present embodiment, the reward Pcr to be paid to the medium vendor MV for the printing setup information Ips is decided based on the ink summary amount Vib used in the printing for each piece of the printing setup information Ips. Therefore, the reward Pcr is apt to be decided reflecting an actual usage result in the printing companies PCa, PCb, and PCas compared to the aspect in which the reward Pcr is decided based on the number of times Ni of the download of the printing setup information Ips from the management server Sv.

For example, it is conceivable when the printing setup information Ips is not used in actual printing despite that the printing setup information Ips has been downloaded from the management server Sv. When the medium vendor MV and one of the printing company PCa and the printing company PCb conspired to perform the download of the printing setup information Ips not used in the printing a large number of times, the medium vendor MV obtains an unjust reward Pcr from the printer provider PP as a result. However, in the present embodiment, the reward Pcr to be paid to the medium vendor MV is decided based on the medium summary amount Vmb. Therefore, it is possible to prevent such an injustice.

The printer provider PP in the present embodiment is also referred to as the "first provider." The medium vendor MV is also referred to as the "second provider." The printing companies PCa, PCb, and PCas are also referred to as the "clients." The management server Sv is also referred to as the "storage section." The printer 200v is also referred to as the "provider printer." The operation setup parameters 1050 of the printer are each referred to also as the "setup parameter."

D. Fourth Embodiment

Figure 10:
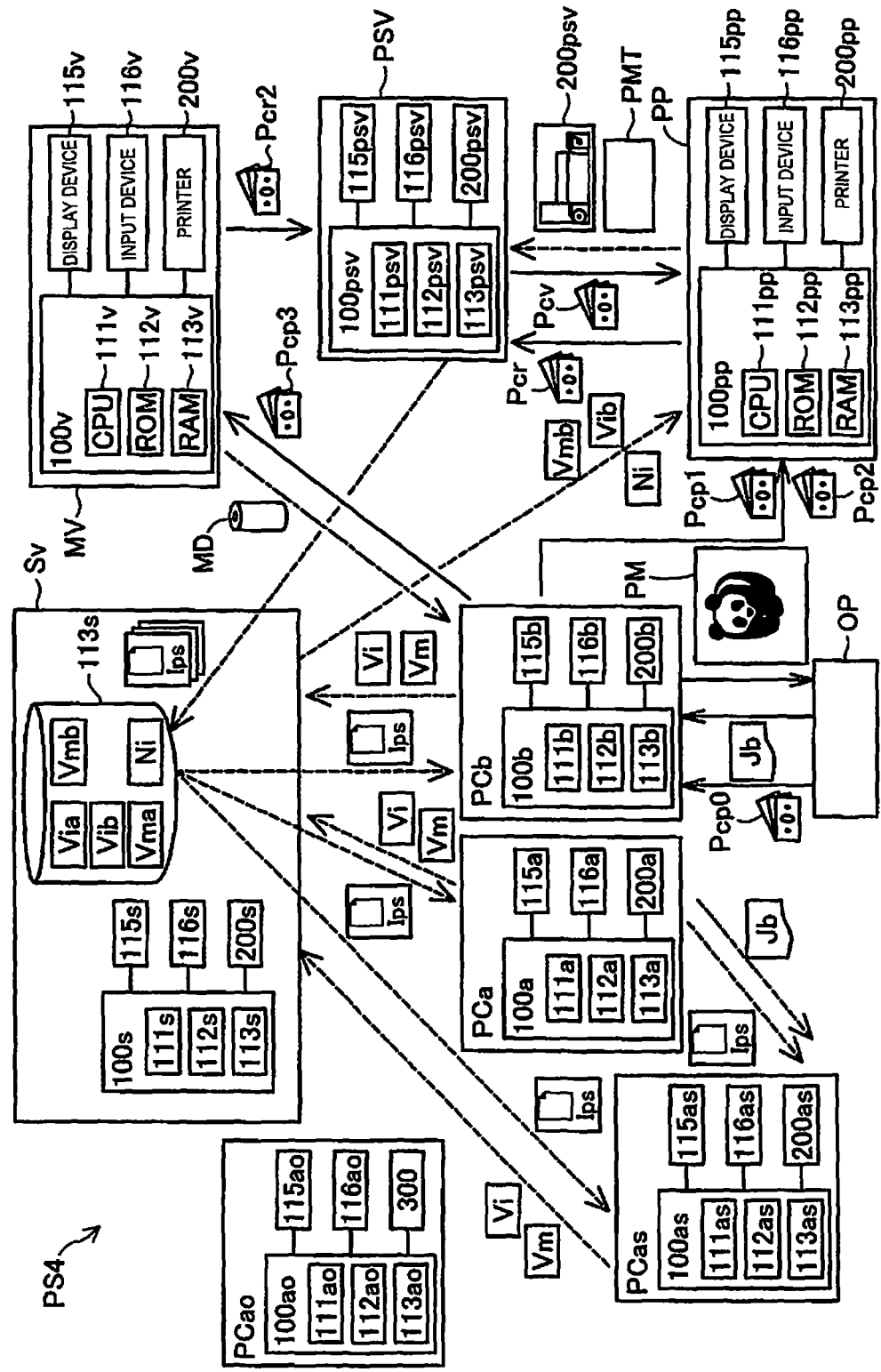
FIG. 10 is an explanatory diagram showing a printing system PS4 according to the present embodiment.

D1. Configuration of Printing System:

FIG. 10 is an explanatory diagram showing a printing system PS4 according to the present embodiment. The printing system PS4 includes a printing setup vendor PSV as a constituent element. The other points in the configuration of the printing system PS4 are the same as those of the printing system PS according to the first embodiment. In the present embodiment, regarding the constituent elements having the same configurations as those of the constituent elements in the first embodiment, the description of the configurations will be omitted. In the present embodiment, regarding the constituent elements exerting the same functions as those of the constituent elements in the first embodiment, the description of the functions will be omitted. In FIG. 10, the constituents common to FIG. 1 will be shown with the common reference symbols attached.

In the present embodiment, the printer provider PP provides the printers 200, 300 used in the printing setup vendor PSV, the medium vender MV, the printing companies PCa, PCb, the business office PCao of the printing company PCa, and the subsidiary PCas of the printing company PCa.

The printers 200 manufactured by the printer provider PP are used in the printing setup vendor PSV, the medium vendor MV, the printer provider PP, and the management server Sv in order to prepare the printing setup information Ips. The printer 200 used in the printing setup vendor PSV is described as a "printer 200psv" (see a middle right part of FIG. 10).

The printers 200a, 200b, 200as, 200psv, 200v, 200pp, and 200s are the printers the same in model. In the present specification, when describing the printers 200a, 200b, 200as, 200psv, 200v, 200pp, and 200s without distinction, the description of "printer 200" is used. The configuration of the printer 200 in the present embodiment is the same as the configuration of the printer 200 in the first embodiment.

The printing setup vendor PSV provides a profile corresponding to a combination of the model of the printer 200 and the type of the print medium MD. Specifically, the printing setup vendor PSV is a company which prepares the printing setup information Ips including the profile corresponding to each of combinations of a variety of types of printers 200 and a variety of types of print media MD to supply the printing setup information Ips prepared to the outside (see a middle right part of FIG. 10). In FIG. 10, the printing setup vendor PSV is drawn as a single constituent element. However, in reality, the printing setup vendor PSV is one of a plurality of enterprises having substantially the same functions, and having a competitive relationship with each other.

The printing setup vendor PSV provides the printing setup information Ips to be used when performing printing in the medium vendor MV, the printing companies PCa, PCb, and PCas, and the business office PCao of the printing company PCa. The printing setup information Ips prepared by the printing setup vendor PSV is used in the printing companies PCa, PCb, and PCas in order to mass-produce the printed materials (see a central part of FIG. 10). The printing setup information Ips prepared by the printing setup vendor PSV is used in the business office PCao of the printing company PCa in order to make a print sample (see a middle left part of FIG. 10).

The printing setup vendor PSV has the computer 100*psv*, a display device 115*psv*, an input device 116*psv*, and the printer 200*psv* (see a middle right part of FIG. 10). The printer 200*psv* is coupled to the computer 100*psv*. The computer 100*psv* controls the printer 200*psv*. The computer 100*psv* is provided with a CPU 111*psv* as a processor, a ROM 112*psv*, and a RAM 113*psv*.

A program for controlling the printer 200*psv* is installed in the computer 100*psv*. In the computer 100*psv*, the CPU 111*psv*, the RAM 113*psv*, and the ROM 112*psv* as hardware resources and the control program cooperate with each other. Specifically, the CPU 111*psv* loads the computer program stored in the ROM 112*psv* or the RAM 113*psv* as the rigid disk to the RAM 113*psv* as a semiconductor memory, and then executes the computer program to thereby realize a variety of functions. The information obtained or prepared by the CPU 111*psv* is stored in the RAM 113*psv*.

The management server Sv is capable of transmitting/receiving information between the printer provider PP, the medium vendor MV, the printing setup vendor PSV, the printing companies PCa, PCb, the business office PCao of the printing company PCa, and the subsidiary PCas of the printing company PCa (see an upper middle part of FIG. 10). The management server Sv is connected to the printer provider PP, the medium vender MV, the printing setup vendor PSV, the printing companies PCa, PCb, the business office PCao of the printing company PCa, and the subsidiary PCas of the printing company PCa via a network. The management server Sv processes and then stores information obtained from the printer provider PP, the medium vender MV, the printing setup vendor PSV, the printing companies PCa, PCb, the business office PCao of the printing company PCa, and the subsidiary PCas of the printing company PCa.

The computer 100*s* realizes a function of transmitting/receiving the information with the computer 100*psv* of the printing setup vendor PSV, the computer 100*v* of the medium vendor MV, the computers 100*a*, 100*b*, and 100*as* of the printing companies PCa, PCb, and PCas, and the computer 100*ao* of the business office 100*ao* in addition to the functions exerted by the computer 100*a* in the printing company PCa.

Figure 11:
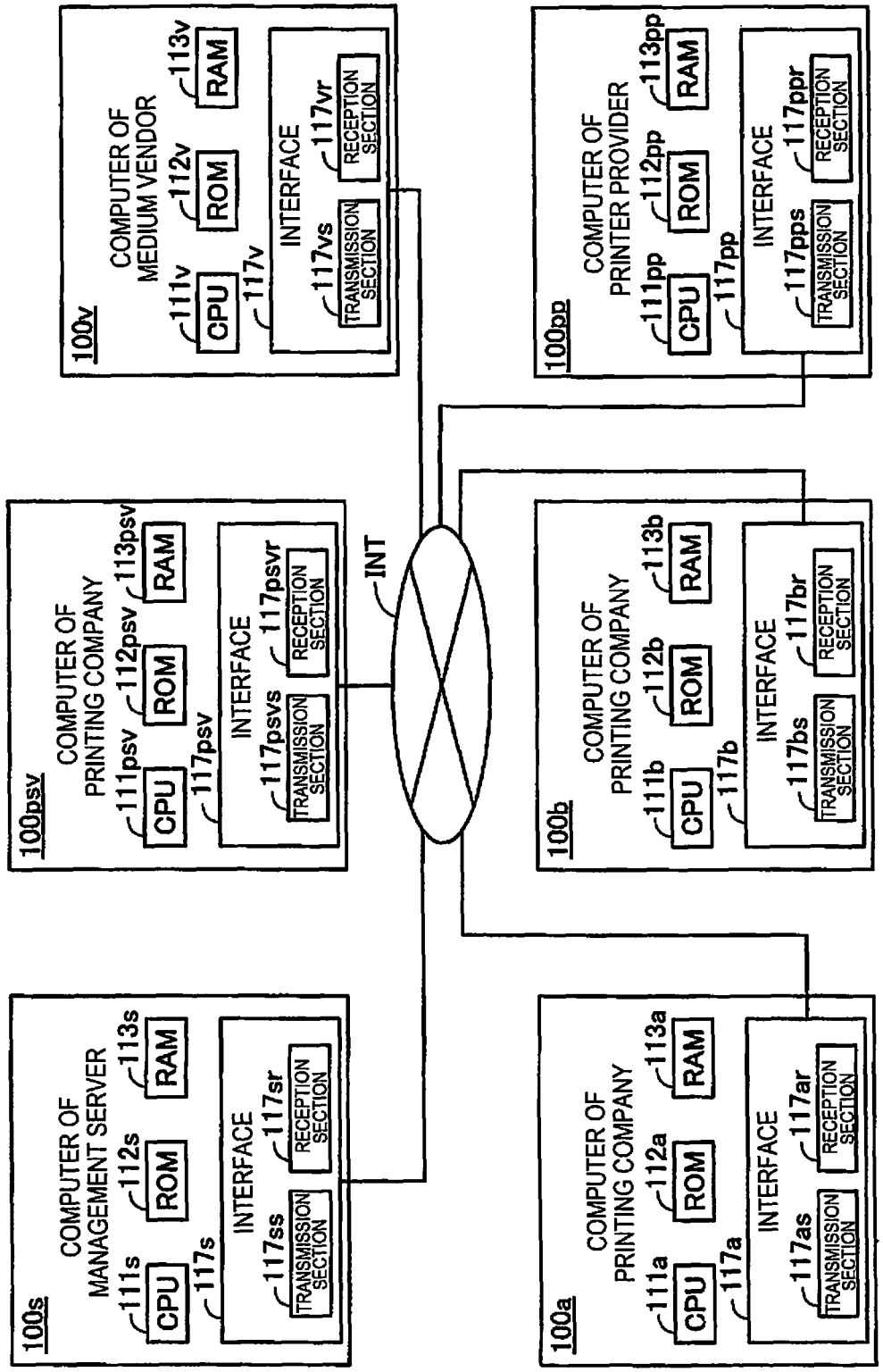
FIG. 11 is a block diagram showing a relationship between a computer 100psv of a printing setup vendor PSV, the computer 100PP of the printer provider PP, the computer 100v of the medium vendor MV, the computer 100a of the printing company PCa, the computer 100b of the printing company PCb, and the computer 100s of the management server Sv.

FIG. 11 is a block diagram showing a relationship between the computer 100*psv* of the printing setup vendor PSV, the computer 100PP of the printer provider PP, the computer 100*v* of the medium vendor MV, the computer 100*a* of the printing company PCa, the computer 100*b* of the printing company PCb, and the computer 100*s* of the management server Sv. It should be noted that the computer 100*as* of the printing company PCas and the computer 100*ao* of the business office PCao have substantially the same configuration and function as those of the computer 100*a* of the printing company PCa or the computer 100*b* of the printing company PCb, and are therefore omitted from the illustration in FIG. 11.

The computer 100*psv* of the printing setup vendor PSV is provided with an interface 117*psv* for performing communication with the outside (see an upper middle part of FIG. 11). The interface 117*psv* functions as a transmission section 117*psys* for transmitting information to the outside, and a reception section 117*psvr* for receiving information from the outside.

In the printing system PS4, (i) the computer 100*psv* provided to the printing setup vendor PSV, (ii) the computer 100*pp* provided to the printer provider PP, (iii) the computer 100*v* provided to the medium vendor MV, (iv) the computers 100*a*, 100*b* which are provided respectively to the printing companies PCa, PCb and to which the printers 200 are respectively coupled, and (v) the management server Sv are connected to each other via the respective interfaces 117 and the Internet INT.

D2. Process in Printing System:

(1) Preparation and Upload of Printing Setup Information:

The printer provider PP prepares the printer 200*psv* and the profile preparation tool PMT to provide the printing setup vendor PSV with the printer 200*psv* and the profile preparation tool PMT (see a lower right part of FIG. 10). The profile preparation tool PMT is specifically executed in the CPU 111*psv* of the computer 100*psv*. The profile will be described later.

The printing setup vendor PSV prepares the profile corresponding to the combination of the printer 200*psv* and one of a variety of types of print media MD manufactured by the medium vendor MV using the printer 200*psv* and the profile preparation tool PMT. The printing setup vendor PSV prepares the printing setup information Ips including the profile, and then transmits the printing setup information Ips to the management server Sv in order to make the management server Sv store the printing setup information Ips (see an upper middle part of FIG. 10).

Such a process is performed for each of the types of the print media MD provided by the medium vendor MV. As a result, in the management server Sv, there are stored one or more pieces of printing setup information Ips each including the profile corresponding to the combination of the printer and the print medium MD. The printing setup vendor PSV pays a compensation Pcv corresponding to the number of pieces of printing setup information Ips to be stored in the management server Sv to the printer provider PP (see a lower right part of FIG. 10). The specific payment process of the compensation Pcv is performed via the management server Sv.

By performing such a process, it is possible for the printer provider PP to obtain the compensation Pcv corresponding to the extent to which the printing setup vendor PSV makes use of the printing system PS4. It is possible for the printing setup vendor PSV to further achieve the promotion of the use of the print medium MD by the printing companies PCa, PCb, and PCas by making use of the printing system PS4 in accordance with an increase in the compensation Pcv to be paid to the printer provider PP. As a result, the reward Pcr which can be obtained from the printer provider PP increases. Therefore, the increase in the compensation Pcv corresponding to the increase in the number of pieces of printing setup information Ips is difficult to be felt as a major burden for the printing setup vendor PSV.

It is possible for the printing setup vendor PSV to perform the process of transmitting the printing setup information Ips designating one or more printing companies which are allowed to download the printing setup information Ips from the management server Sv out of the printing companies PCa, PCb, and PCas in the process of transmitting the printing setup information Ips to the management server Sv. The management server Sv allows only the designated printing company to download the printing setup information Ips which is the printing setup information Ips stored, and is transmitted from the printing setup vendor PSV designating the printing company allowed to download (see a middle left part of FIG. 10).

By performing such a process, it is possible for the printing setup vendor PSV to provide the printing setup information Ips only to the one or more printing companies having a specific relationship with the printing setup vendor PSV. It is possible for the one or more printing companies designated to use the printing setup information Ips which other printing companies are not allowed to use.

In the present embodiment, the preparer ID1110 of the printing setup information Ips has previously been stored in the profile preparation tool PMT when the profile preparation tool PMT is provided to the printing setup vendor PSV (see a lower part of FIG. 4).

The preparer ID is different by the printing setup vendor PSV provided with the profile preparation tool PMT. In other words, the preparer ID can be made to correspond one-to-one to the printing setup vendor PSV allowed to use the profile preparation tool PMT. It is also possible to assign the preparer ID to an individual worker as an employee of the printing setup vendor PSV. It is possible for the printing companies PCa, PCb, and PCas which have downloaded the printing setup information Ips from the management server Sv to know the preparer of the printing setup information Ips based on the preparer ID 1110 in the printing setup information Ips (see a lower left part of FIG. 10).

The quality level information 1130 includes evaluation values of a color reproduction accuracy, a color reproduction range, a gradation characteristic, the granularity, and ink bleeding with respect to the printing result. In order to prepare the quality level information 1130, the printing setup vendor PSV performs the following process.

The printing setup vender PSV performs printing of a color chart on the print medium MD using the printer 200*psv*. The print data of the color chart has previously been stored in the application software for controlling the printer 200.

The printing setup vendor PSV measures the printing result of the color chart with a sensor of the printer 200*psv* to determine the evaluation values with respect to the printing result based on the output of the sensor. Specifically, the color reproduction accuracy, the color reproduction range, and the gradation characteristic are evaluated based on the output of the spectrophotometer. The granularity and the ink bleeding are evaluated based on the output of the digital still camera. The evaluation values of the respective items determined based on the output of the sensors are stored in the printing setup information Ips as the quality level information 1130.

The printing setup vendor PSV transmits the sample of the print medium MD used in the printer 200*psv* when preparing the printing setup information Ips to the management server Sv when the printing setup vendor PSV uploads the printing setup information Ips to the management server SV, or before uploading the printing setup information Ips.

(2) Check and Storage of Printing Setup Information:

When the management server Sv receives the printing setup information Ips from the printing setup vender PSV, the management server Sv performs a process of checking the content of the printing setup information Ips (see an upper middle part of FIG. 10).

The process of checking the contents of the printing setup information Ips performed in the management server Sv is the same as that in the first embodiment except the point that the preparer and the transmission source of the printing setup information Ips as the processing target are the printing setup vendor PSV instead of the medium vendor MV, and the point that the notification destination in the steps S160, S170 is the printing setup vendor PSV instead of the medium vendor MV (see FIG. 5).

It should be noted that in the fourth embodiment, when the facilities or the organizations other than the management server Sv perform the processes in the steps S120, S130, and S140 shown in FIG. 3, the sample of the print medium MD used in the printer 200*psv* when preparing the printing setup information Ips is sent by the printing setup vendor PSV to the facilities or the organizations.

(3) Download of Printing Setup Information and Printing:

The process of downloading the printing setup information Ips and performing printing in the fourth embodiment is the same as the process of downloading the printing setup information Ips and performing printing in the first embodiment.

In the present embodiment, it is possible for the printing companies PCa, PCb, and PCas to obtain the following advantages by performing the setup based on the printing setup information Ips on the software for controlling the printers 200*a*, 200*b*, and 200*as* and performing printing. Specifically, it is possible for the printing companies PCa, PCb, and PCas to produce the printed materials having the high quality which has been achieved when the printing setup vendor PSV or the printer provider PP has decided (i) the models of the printers 200*a*, 200*b*, and 200*as*, (ii) the type of the print medium MD, (iii) the type of the ink, (iv) the printing mode, and (v) the setup parameters to prepare the printing setup information Ips. Further, it is possible for the printing companies PCa, PCb, and PCas to perform setup of the printers 200*a*, 200*b*, and 200*as* in a short time compared to when the printing companies themselves perform the setup of the printers 200*a*, 200*b*, and 200*as* through a trial and error process.

In the present embodiment, the printer provider PP decides the reward Pcr based on the medium summary amount Vmb for each piece of the printing setup information Ips. The printer provider PP pays the reward Pcr to the printing setup vendor PSV which prepared each piece of the printing setup information Ips (see a middle right part of FIG. 10).

Specifically, the computer 100*pp* of the printer provider PP receives the information Vm of the amount of the print medium MD for each piece of the printing setup information Ips used in the printing by the client printers 200*a*, 200*b* performed using the printing setup information Ips from the management server Sv. As a result, the information Vm of the amount of the print medium MD for each piece of the printing setup information Ips representing the result of the printing is received by the computer 100*pp* of the printer provider PP. The computer 100*pp* of the printer provider PP transmits the information Pcr representing the reward decided based on the amount of the print medium MD used in the printing to the computer 100pcv of the printing setup vendor PSV which transmitted the printing setup information Ips used in the printing by the printers 200a, 200b to the management server Sv. As a result, the information Pcr representing the reward decided based on the result of the printing is received by the computer 100psv of the printing setup vendor PSV which transmitted the printing setup information Ips to the management server Sv. The information Pcr representing the reward is transmitted to the computer 100pcv of the printing setup vendor PSV via the management server Sv.

Substantially the same process is performed also on the printing company PCb and the printing company PCas, and thus, the payment of the compensations Pcp1 through Pcp3, and Pcr is performed.

By performing such a process, it is possible to provide the printing setup vendor PSV with an incentive to prepare the printing setup information Ips which is frequently used by the printing companies PCa, PCb, and PCas, and has a utility value for the printing companies PCa, PCb. As a result, the printing setup information Ips which has a utility value for the printing companies PCa, PCb, and is capable of realizing high-quality printing is prepared by the printing setup vendor PSV. As a result, since high-quality printing is performed by the printer 200 manufactured by the printer provider PP using the high-quality printing setup information Ips, the brand values of the printer 200 manufactured by the printer provider PP and the printer provider PP are raised.

In the present embodiment, the reward Pcr to be paid to the printing setup vendor PSV for the printing setup information Ips is decided based on the medium summary amount Vmb as an amount of the print medium MD used in the printing. Therefore, the reward Pcr is apt to be decided reflecting the actual usage result in the printing companies PCa, PCb, and PCas compared to the aspect in which the reward Pcr is decided based on the number of times Ni of the download of the printing setup information Ips from the management server Sv.

For example, it is conceivable when the printing setup information Ips is not used in actual printing despite that the printing setup information Ips has been downloaded from the management server Sv. When the printing setup vendor PSV and one of the printing company PCa and the printing company PCb conspired to perform the download of the printing setup information Ips not used in the printing a large number of times, the printing setup vendor PSV obtains an unjust reward Pcr from the printer provider PP as a result. However, in the present embodiment, the reward Pcr to be paid to the printing setup vendor PSV is decided based on the medium summary amount Vmb. Therefore, it is possible to prevent such an injustice.

The printer provider PP in the present embodiment is also referred to as the "first provider." The medium vendor MV is also referred to as the "second provider." The printing setup vendor PSV is also referred to as a "third provider." The printing companies PCa, PCb, and PCas are each referred to also as the "client." The management server Sv is also referred to as the "storage section." The printer 200psv is also referred to as the "provider printer." The operation setup parameters 1050 of the printer are each referred to also as the "setup parameter."

In the present specification, the computer 100psv of the printing setup vendor PSV is also referred to as a "third information terminal."

Figure 12:
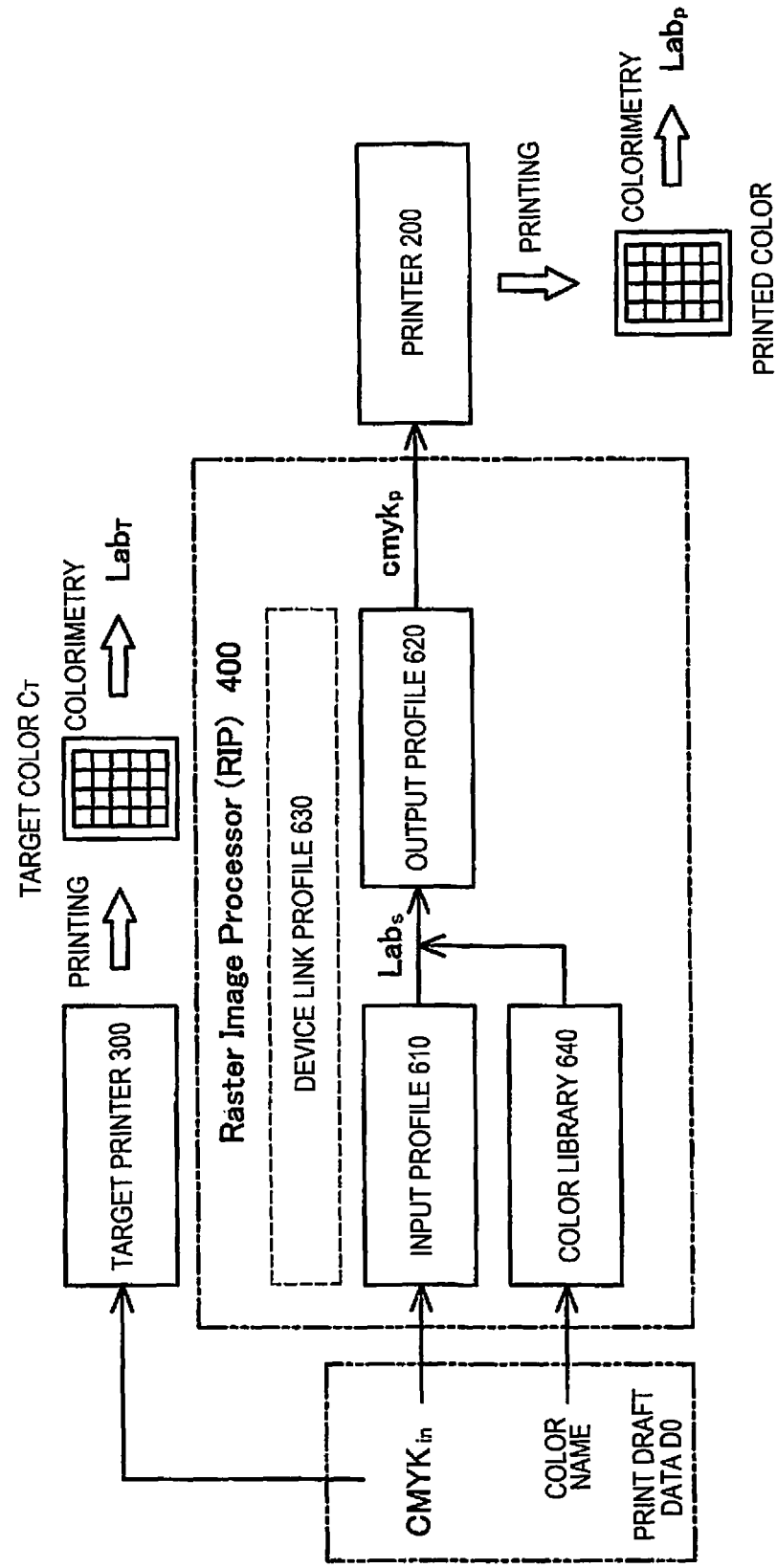
FIG. 12 is an explanatory diagram showing an example of a color management system used in the printing systems PS, PS2 shown in FIG. 1, the printing system PS3 shown in FIG. 8, and a printing system PS4 shown in FIG. 10.

E. Element Technology in Printing System (1) Mechanism of Color Management System:

FIG. 12 is an explanatory diagram showing an example of a color management system used in the printing systems PS, PS2 shown in FIG. 1, the printing system PS3 shown in FIG. 8, and the printing system PS4 shown in FIG. 10. The color management system is realized by a commercial printer 200, a target printer 300, and an RIP (Raster Image Processor) 400.

The target printer 300 is a target device for forming the printed material expressing the target color $C_T$ as a color to be the target. In the printing system PS, the target printer 300 corresponds to the printer 300 used for making the print sample in the business office PCao of the printing company PCa (see a middle left part of FIG. 1).

The target printer 300 receives color data CMYK including combinations of the gray levels of the respective ink used by the target printer 300, and performs printing of reproducing the specific color in accordance with the color data CMYK. The ink used by the target printer 300 is cyan (C) ink, magenta (M) ink, yellow (Y) ink, and black (K) ink for the target printer 300. The color data CMYK represents coordinates in a CNYK color space with the gray levels of the respective ink of CMYK used in the target printer 300 as the coordinate axes.

In the present embodiment, the target printer 300 performs printing in accordance with certain color data CMYK, and the target color $C_T$ in the color matching is obtained as the color represented by the printed material thus made as the result of the printing (see an upper middle part of FIG. 12). The target color $C_T$ is an aggregate of a plurality of colors reproduced in respective places different from each other on a single sheet. It should be noted that the explanation will hereinafter be presented focusing attention to one color out of the target color $C_T$ in order to make it easy to understand the technology. The target color $C_T$ can be identified by a coordinate value (L*a*b* value) in a CIE L*a*b* color space which can be obtained by performing colorimetry on the printed material formed by the target printer 300 with a colorimetric instrument. The coordinate value in the CIE L*a*b* color space of the target color $C_T$ is denoted as $Lab_T$ in FIG. 12 (see an upper right part of FIG. 12). In the present specification, the L*a*b* color space is also described as an Lab color space. The L*a*b* value is also described as an Lab value.

The target color $C_T$ can also be identified by the color data CMYK representing the coordinates in the CNYK color space with the gray levels of the respective ink of CMYK used in the target printer 300 as the coordinate axes. It should be noted that the color data CMYK depends on the colors of the respective ink of CMYK used in the target printer 300. The color data CMYK when expressing the target color $C_T$ on the printed material is called color data $CMYK_{in}$ (see a middle left part of FIG. 12).

The commercial printer 200 is an inkjet printer used when reproducing the colors of the printed material formed by the target printer 300. In the printing system PS, the commercial printer 200 corresponds to the printer 200 used for mass-producing the printed materials in the printing companies PCa, PCb, and PCas (see a lower left part of FIG. 1).

The commercial printer 200 receives color data cmyk including combinations of the gray levels of the respective ink used by the commercial printer 200, and performs printing of reproducing the specific color in accordance with the color data cmyk. The ink used by the commercial printer 200 is cyan (c) ink, magenta (m) ink, yellow (y) ink, and black (k) ink for the commercial printer 200. The color data cmyk represents coordinates in a cmyk color space with the gray levels of the respective ink of cmyk used in the commercial printer 200 as the coordinate axes.

The RIP (Raster Image Processor) 400 is capable of receiving the color data $CMYK_{in}$ for the target printer 300, then converting the color data $CMYK_{in}$ into the color data cmyk for the commercial printer 200, and supplying the commercial printer 200 with the color data cmyk (see a middle left part of FIG. 12). The color data cmyk for the commercial printer 200 generated by converting the color data $CMYK_{in}$ for the target printer 300 is referred to as color data $cmyk_p$ (see a middle right part of FIG. 12).

The RIP 400 is capable of receiving color names in a Pantone (registered trademark) color library, then generating the color data cmyk for the commercial printer 200 based on the color names, and then supplying the commercial printer 200 with the color data cmyk (see a lower left part of FIG. 12). In other words, the RIP 400 is capable of receiving the color names representing the target color $C_T$, then generating the color data $cmyk_p$ for the commercial printer 200 based on the color names, and then supplying the commercial printer 200 with the color data $cmyk_p$.

The data which includes the color data $CMYK_{in}$ representing the target color $C_T$ or the information of the color names representing the target color $C_T$, and is input to the RIP 400 is referred to as print draft data D0 (see a middle left part of FIG. 12).

The RIP 400 includes an input profile 610, an output profile 620, and a color library 640. The color library 640 is a Pantone (registered trademark) color library.

The input profile 610 is a file describing the color characteristic of the ink used in the target printer 300. Specifically, the input profile 610 holds a correspondence relationship between the coordinates in the color space of the ink colors CMYK of the target printer 300 and the coordinates in the Lab color space as a PCS (Profile Connection Space).

The output profile 620 is a file describing the color characteristic of the ink used in the commercial printer 200. Specifically, the output profile 620 holds a correspondence relationship between the coordinates in the Lab color space as the PCS (Profile Connection Space) and the coordinates in the color space of the ink colors cmyk of the commercial printer 200. The input profile 610 and the output profile 620 are formed in accordance with a data format of the ICC profile.

In the print draft data D0, when the target color $C_T$ is specified by the color data $CMYK_{in}$, the RIP 400 performs the following process. The RIP 400 converts the color data $CMYK_{in}$ of the print draft data D0 into the color data $Lab_s$ as the data of the colors specified in the Lab color space as the PCS (Profile Connection Space) with reference to the input profile 610 (see a middle left part of FIG. 12).

In the print draft data D0, when the target color $C_T$ is specified by the color names in the Pantone (registered trademark) color library, the RIP 400 performs the following process. The RIP 400 generates the color data $Lab_s$ as the data of the colors specified in the Lab color space based on the color names with reference to the color library 640 (see a middle left part of FIG. 12).

The RIP 400 converts the color data $Lab_s$ into the color data $cmyk_p$ with reference to the output profile 620 (see a middle right part of FIG. 12).

Due to the process described hereinabove, the colors approximate to the target color $C_T$ printed by the target printer 300 can be reproduced by the commercial printer 200 using the cyan (c) ink, the magenta (m) ink, the yellow (y) ink, and the black (k) ink for the commercial printer 200.

It should be noted that in the example shown in FIG. 12, the RIP 400 includes the input profile 610 and the output profile 620. However, it is possible for the RIP 400 to hold a device link profile 630 instead of the input profile 610 and the output profile 620, or together with the input profile 610 and the output profile 620. The device link profile 630 holds a correspondence relationship between the coordinates in the color space of the ink colors CMYK of the target printer 300 and the coordinates in the color space of the ink colors cmyk of the commercial printer 200. It is possible for the RIP 400 to convert the color data $CMYK_{in}$ of the print draft data D0 into the color data $cmyk_p$ with reference to the device link profile 630.

Also when referring to the device link profile 630 instead of the input profile 610 and the output profile 620 in the RIP 400, it is possible for the commercial printer 200 to reproduce the colors approximate to the target color $C_T$ printed by the target printer 300 using the cyan (c) ink, the magenta (m) ink, the yellow (y) ink, and the black (k) ink for the commercial printer 200.

It should be noted that it is also possible for the output profile 620 and the device link profile 630 to be formed assuming a typical print medium. However, in the printing system PS according to the present embodiment, the profile 1060 as the output profile 620 is prepared for each of the print media MD (see an upper right part of FIG. 1 and the reference numeral 1060 shown in FIG. 4).

Figure 13:
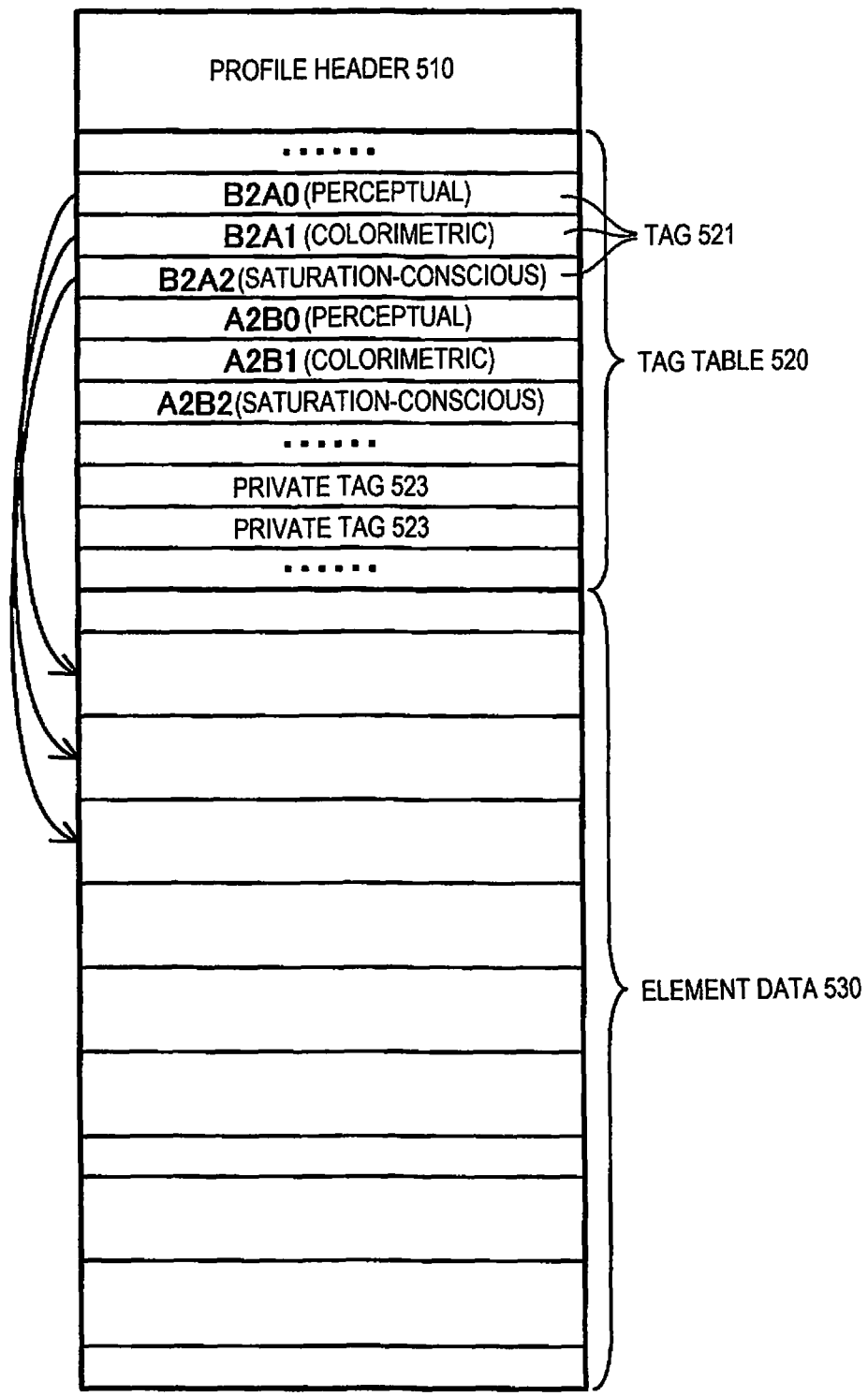
FIG. 13 is a diagram schematically showing a structure of an ICC profile 500.

(2) Structure of Profile:

FIG. 13 is a diagram schematically showing a structure of an ICC profile 500. The ICC profile is a series of data featuring input/output equipment related to colors and a color space compliant to the standard pronounced by International Color Consortium in the color management. The input profile 610 and the output profile 620 shown in FIG. 12 are formed in accordance with the data format of the ICC profile. The ICC profile 500 includes a profile header 510, a tag table 520, and an element table 530.

The tag table 520 includes one or more tags 521. Each of the tags 521 is associated with the data in the element data 530. It is possible for the one or more tags 521 to include private tags 523 for customizing the ICC profile 500. The element data 530 stores a color conversion table for converting the color data between the PCS (Profile Connection Space) and a device dependent color space.

Out of the one or more tags 521, A2Bx tags (x denotes 0, 1, or 2) are associated with a color conversion table for converting the color data in the device dependent color space such as the CMYK color space of the target printer 300 or the cmyk color space of the commercial printer 200 into the color data in the Lab color space. B2Ax tags (x denotes 0, 1, or 2) include a color conversion table for converting the color data in the Lab color space into the color data in the device dependent color space.

The A2B0 tag and the B2A0 tag are associated with a color conversion table for performing perceptual (Perceptual) color conversion. The perceptual color conversion is color conversion giving greater importance to the reproduction of tone of a color. The perceptual color conversion is used mainly for conversion of a photographic image wide in color gamut.

The A2B1 tag and the B2A1 tag are associated with a color conversion table for performing relative and colorimetric (Media-Relative Colorimetric) color conversion or absolute and colorimetric (Absolute Colorimetric) color conversion. The colorimetric color conversion is conversion faithful to a colorimetric value. The colorimetric color conversion is used mainly for conversion for color proof output with digital proof for which correct color matching is required.

The A2B2 tag and the B2A2 tag are associated with a color conversion table for performing saturation-conscious (Saturation) color conversion. The saturation-conscious color conversion is conversion giving greater importance to clearness of a color rather than accuracy of the hue. The saturation-conscious color conversion is used mainly for conversion of graph display in business graphics.

(3) Adjustment of Profile:

In the RIP 400, when the input profile 610 and the output profile 620 are referred to, or when the device link profile 630 is referred to, the color sufficiently approximate to the target color $C_T$ cannot be reproduced in the commercial printer 200 in some cases due to an error included in the profile, an error in the colorimetry, a variation in printer, and so on. Further, in some cases, it is not necessary to reproduce an appropriate color by the commercial printer 200 as output equipment with respect to the entire color space which can be reproduced by the target printer 300 as input equipment, but it is sufficient for the commercial printer 200 to be able to reproduce an appropriate color in only a part of the color space which can be reproduced by the target printer 300. In such a case, by adjusting some or all of the input profile 610, the output profile 620, and the device link profile 630, it is possible to make the reproduced color of the commercial printer 200 further approximate to the target color $C_T$.

When adjusting the profile, designation of one or more profiles as the adjustment target out of the input profile 610, the output profile 620, and the device link profile 630, data representing colors as the adjustment target in the color space of the profile as the adjustment target, and data representing target colors to which the colors as the adjustment target need to be approximated by the adjustment are input via an input interface on the computer. The input interface on the computer will be described later.

When the output profile 620 is adjusted, the following process is performed. Colorimetry is performed on the printed material printed by the commercial printer 200 in accordance with the color data $cmyk_p$ to generate color data $Lab_p$ (see a lower right part of FIG. 12). A color difference between the color data $Lab_s$ (see a central part of FIG. 12) specified in the Lab color space as the PCS and the color data $Lab_p$ obtained by performing the colorimetry on the printed material by the commercial printer 200 is calculated. The output profile 620 is adjusted so that the color difference decreases.

When the input profile 610 is adjusted, the following process is performed. Colorimetry is performed on the printed material printed by the commercial printer 200 in accordance with the color data $cmyk_p$ to generate color data $Lab_p$ (see a lower right part of FIG. 12). A color difference between color data $Lab_T$ (see an upper right part of FIG. 12) which is obtained by performing the colorimetry on the printed material by the target printer 300, and represents the target color $C_T$ and the color data $Lab_p$ obtained by performing the colorimetry on the printed material by the commercial printer 200 is calculated. The input profile 610 is adjusted so that the color difference decreases.

When the device link profile 630 is adjusted, the device link profile 630 is adjusted so that the color difference between the color data $Lab_T$ (see an upper right part of FIG. 12) and the color data $Lab_p$ obtained by performing the colorimetry on the printed material by the commercial printer 200 decreases similarly to when the input profile 610 is adjusted.

For example, when the error included in the profile is adjusted, one of the input profile 610, the output profile 620, and the device link profile 630 is designated in the input interface on the computer, and then the adjustment process is performed on the computer.

When the color proof of making the color of the printed material printed by the commercial printer 200 approximate to the target color $C_T$ is performed, the input profile 610 and the output profile 620 are designated, and the adjustment process is performed on the computer. When the RIP 400 holds the device link profile 630 together with the input profile 610 and the output profile 620 with respect to the same combination of the input equipment and the output equipment, it is also possible for the adjustment process to be performed on the computer with the output profile 620 and the device link profile 630 designated when the color proof is performed.

Further, when the color proof of making the colors of the printed material printed by the commercial printer 200 approximate to the target color $C_T$ is performed, some or all of the following coordinate values can be designated in the input interface on the computer: a coordinate value in the color space of the ink colors CMYK of the target printer 300 as the input equipment; a coordinate value in the color space of the ink colors cmyk of the commercial printer 200 as the output equipment; and a coordinate value in the Lab color space as the PCS. The coordinate value designated in the profile is adjusted via the computer.

When a certain output value of some or all of the input profile 610, the output profile 620, and the device link profile 630 is changed to a different value, an output value corresponding to an input value adjacent to the input value corresponding to the output value thus adjusted is also adjusted at the same time. This is for preventing the situation in which a gradation property of the reproduced color deteriorates due to the change in the certain output value to the different value. The adjustment range as the range of the input value corresponding to the output value adjusted at the same time when the certain output value is changed to the different value can be designated by the input interface on the computer. By designating the range of the input value corresponding to the output value adjusted at the same time when the certain output value is changed to the different value, the range affected when the certain output value is changed to the different value is controlled.

When some or all of the input profile 610, the output profile 620, and the device link profile 630 are adjusted, when the target color is not designated in the PCS (Profile Connection Space), it is possible to adjust the target file after converting the target file into the color data Lab expressed in the PCS.

When some or all of the input profile 610, the output profile 620, and the device link profile 630 are adjusted, it is also possible to receive the designation of the rendering intent via the input interface on the computer and then adjust the profile in accordance with the rendering intent thus designated. The rendering intent includes "perceptual" (Perceptual), "relative colorimetric" (Media-Relative Colorimetric), "absolute colorimetric" (Absolute Colorimetric), and "saturation-conscious" (Saturation).

Figure 14:
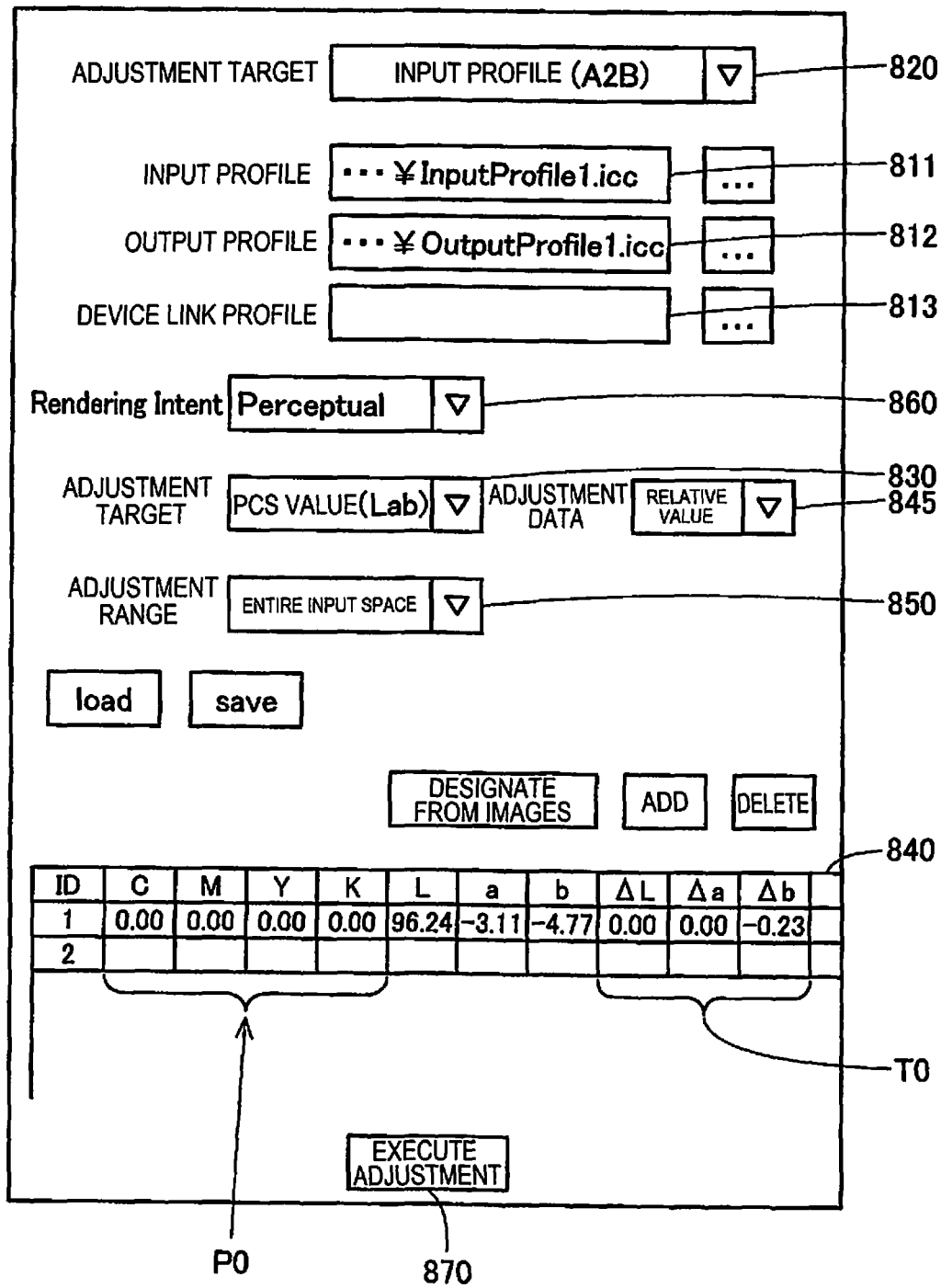
FIG. 14 is a diagram showing an example of a user interface screen 800 to be displayed on a screen of a computer when a profile is adjusted.

(4) User Interface Screen for Adjusting Profile:

FIG. 14 is a diagram showing an example of a user interface screen 800 to be displayed on a screen of a computer when a profile is adjusted. The user interface screen 800 (hereinafter described as a "UI screen 800") has an input profile selection field 811, an output profile selection field 812, a device link profile selection field 813, an adjustment target profile designation field 820, an adjustment target color space selection field 830, a target reception area 840, an adjustment data selection field 845, an adjustment range designation field 850, an intent designation field 860, and an adjustment execution button 870.

The selection fields 811 through 813 are fields for designating the profile to be used for the color conversion. The input profile selection field 811 is a field for the user to select and designate the input profile to be used for the color conversion out of the input profiles 610 stored in the RAM 113v (see an upper right part of FIG. 1) when the input profile 610 is used for the color conversion. When the input profile 610 is not used for the color conversion, the input profile selection field 811 is left blank.

The output profile selection field 812 is a field for the user to select and designate the output profile to be used for the color conversion out of the output profiles 620 stored in the RAM 113v when the output profile 620 is used for the color conversion. When the output profile 620 is not used for the color conversion, the output profile selection field 812 is left blank.

The device link profile selection field 813 is a field for the user to select and designate the device link profile to be used for the color conversion out of the device link profiles 630 stored in the RAM 113v when the device link profile 630 is used for the color conversion. When the device link profile 630 is not used for the color conversion, the device link profile selection field 813 is left black.

The one or more profiles designated via the selection fields 811 through 813, and used for the color conversion become candidates of the adjustment target profile.

The adjustment target profile designation field 820 is a field for designating the profile to be the adjustment target. In the adjustment target designation field 820, a single profile is selected from the profiles designated as the profiles to be used for the color conversion in the selection fields 811 through 813. In the example shown in FIG. 14, the input profile is designated in the input profile selection field 811, the output profile is designated in the output profile selection field 812, and the device link profile is not designated in the device link profile selection field 813. Therefore, in the adjustment target profile designation field 820, the input profile or the output profile can only be selected. In the example shown in FIG. 14, the input profile is selected as the adjustment target profile.

The adjustment target color space selection field 830 is a field for designating the color space to be the adjustment target out of the two color spaces with which the profile to be the adjustment target is associated. In the example shown in FIG. 14, the input profile is selected as the profile to be the adjustment target in the adjustment target profile designation field 820. Therefore, in the adjustment target color space selection field 830, either one of the "input data" for designating the CMYK color space of the target printer 300 and the "PCS value" for designating the Lab color space as the PCS (Profile Connection Space) can be selected. In the example shown in FIG. 14, the Lab color space is selected as the color space to be the adjustment target.

It should be noted that when the output profile is selected as the adjustment target in the adjustment target profile designation field 820, it is possible to select either one of the "PCS value" for designating the Lab color space as the PCS, and the "output data" for designating the cmyk color space of the commercial printer 200 in the adjustment target color space selection field 830. When the device link profile is selected as the adjustment target, any one of the "input data," the "PCS value," and the "output data" can be selected in the adjustment target color space selection field 830.

The adjustment data selection field 845 is a field for designating whether the content of the adjustment is designated with a value in the coordinate of the color space, namely a target value, or designated with a relative value, namely a variation from the current value. In the adjustment data selection field 845, an "absolute value" or a "relative value" can be selected. In the example shown in FIG. 14, the relative value is selected. The display for designating the alteration content in the target reception area 840 is changed in accordance with the selection in the adjustment data selection field 845.

The target reception area 840 is a field for designating the color P0 as the adjustment target and the alteration content TO of the color P0 as the adjustment target. In the target reception area 840, the color P0 as the adjustment target is designated with the coordinate value in the color space of the ink colors CMYK of the target printer 300, or the coordinate value in the Lab color space as the PCS. In the target reception area 840, the alteration content TO of the color P0 as the adjustment target is designated with the target value in the coordinate in the Lab color space, or the variation from the value of the color P0 as the adjustment target in the coordinate in the Lab color space. In the example shown in FIG. 14, since the "relative value" is selected in the adjustment data selection field 845, the alteration content TO of the color P0 as the adjustment target is designated with the variation from the value of the color P0 as the adjustment target in the coordinate in the Lab color space.

The adjustment range designation field 850 is a field for designating the adjustment range in the profile as the adjustment target. In the adjustment range designation field 850, it is possible for the user to select whether the adjustment range as a range adjusted in accordance with the alternation content TO thus designated is set to the entire color space or a part of the entire color space is designated as the adjustment range. More specifically, in the adjustment range designation field 850, one of the "entire area of the input space" and a "radius" can be selected. In the example shown in FIG. 14, in the adjustment range designation field 850, there is made the selection of the "entire area of the input space" for setting the entire area of the color space as the adjustment range.

It should be noted that when the selection of the "radius" for designating a part of the entire area of the color space has been made in the adjustment range designation field 850, a field for inputting the radius in the Lab color space as the PCS is displayed in the target reception area 840. The gray levels in the color space located inside the sphere having the designated radius centered on the color P0 as the adjustment target in the Lab color space are adjusted in accordance with the alternation content TO designated with respect to the color P0 as the adjustment target.

The intent designation field 860 is a field for designating the rendering intent. In the intent designation field 860, it is possible to select one of "Perceptual" (perceptual), "Relative Colorimetric" (relative colorimetric), and "Saturation" (saturation-conscious). When "Perceptual" (perceptual) is selected in the intent designation field 860, the color conversion table for performing the perceptual color conversion is prepared (see the A2B0 tag and the B2A0 tag shown in FIG. 13) as the color conversion table after the adjustment. When "Relative Colorimetric" (relative colorimetric) is selected in the intent designation field 860, the color conversion table for performing the relative colorimetirc color conversion is prepared (see the A2B1 tag and the B2A1 tag shown in FIG. 13) as the color conversion table after the adjustment. When "Saturation" (saturation-conscious) is selected in the intent designation field 860, the color conversion table for performing the saturation-conscious color conversion is prepared (see the A2B2 tag and the B2A2 tag shown in FIG. 13) as the color conversion table after the adjustment. In FIG. 14, there is designated "Perceptual" as the designated intent.

Figure 15:
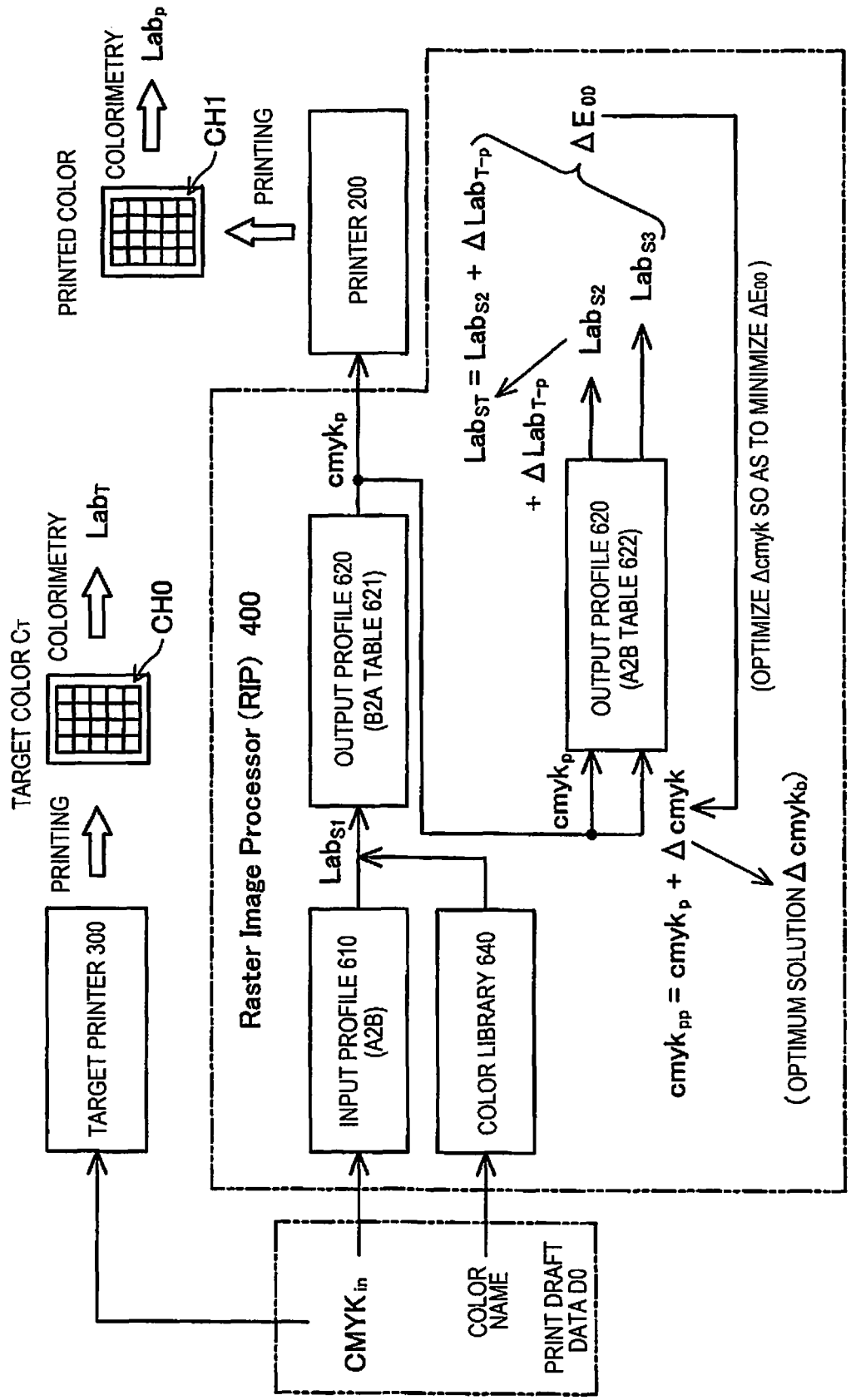
FIG. 15 is an explanatory diagram showing a process of an adjustment of a printing result of a commercial printer targeting on a printing result of a target printer.

(5) Adjustment of Printing Result of Commercial Printer Targeting on Printing Result of Target Printer:

FIG. 15 is an explanatory diagram showing a process of an adjustment of a printing result of the commercial printer targeting on a printing result of the target printer. In the example shown in FIG. 15, the output profile 620 is provided with a B2A table 621 and an A2B table 622 (see a central part of FIG. 15).

The B2A table 621 is a table for conversing the coordinates in the Lab color space as the PCS (Profile Connection Space) into the coordinates in the color space of the ink colors cmyk of the commercial printer 200.

The A2B table 622 is a table for conversing the coordinates in the color space of the ink colors cmyk of the commercial printer 200 into the coordinates in the Lab color space as the PCS. The conversion by the A2B table 622 corresponds to performing a simulation of colors of the printed material printed by the commercial printer 200 when making the commercial printer 200 perform printing with the color data specified in the color space of the ink colors cmyk of the commercial printer 200.

The input profile 610 (see a middle left part of FIG. 15) is provided with the A2B table 611. The A2B table 611 provided to the input profile 610 is a table for conversing the coordinates in the color space of the ink colors CMYK of the target printer 300 into the coordinates in the Lab color space as the PCS. In FIG. 15, illustration of the A2B table 611 is omitted in order to make it easy to understand the technology.

In the example shown in FIG. 15, the output gray levels of the B2A table 621 in the output profile 620 are adjusted so that the colors of the printed material printed by the commercial printer 200 approximates to the target color $C_T$ as the colors of the printed material printed by the target printer 300 (see a central part of FIG. 15).

Firstly, the color data $cmyk_p$ for the commercial printer 200 prepared by converting the color data $CMYK_{in}$ for the target printer 300 is altered with an initial value of color adjustment vector Δcmyk. The color data $cmyk_p$ for the commercial printer 200 which has been altered with the initial value of the color adjustment vector Δcmyk is referred to as color data $cmyk_{pp}$ (see a lower left part of FIG. 15).

It should be noted that the initial values of a plurality of color adjustment vectors Δcmyk are prepared. Then, the initial value of the color adjustment vector Δcmyk which minimizes the objective function related to the printing result is selected from the initial values of the plurality of color adjustment vectors Δcmyk. Subsequently, the color adjustment vector Δcmyk to be used in the next process is determined based on the color adjustment vector Δcmyk thus selected. By repeating such a process, the optimum color adjustment vector $\Delta cmyk_b$ is decided.

By converting the color data $cmyk_{pp}$ altered by the color adjustment vector Δcmyk with the A2B table 622 of the output profile 620, color data $Lab_{S3}$ in the Lab color space is obtained (see a lower right part of FIG. 15). The color data $Lab_{S3}$ in the Lab color space represents the colors of the printed material formed by the commercial printer 200 when making the commercial printer 200 perform printing with the color data $cmyk_{pp}$.

On the other hand, by converting the color data $cmyk_p$ for the commercial printer 200, which has been prepared by converting the color data $CMYK_{in}$ for the target printer 300, with the A2B table 622 in the output profile 620, there is obtained color data $Lab_{S2}$ in the Lab color space (see a lower right part of FIG. 15). The color data $Lab_{S2}$ in the Lab color space represents the colors of the printed material formed by the commercial printer 200 when making the commercial printer 200 perform printing with the color data $cmyk_p$. By adding a color adjustment vector $\Delta Lab_{T-p}$ representing the alteration content TO of the color P0 as the adjustment target designated by the user to the color data $Lab_{S2}$, color data $Lab_{ST}$ representing the colors as the target is obtained (see a middle right part of FIG. 15 and the reference symbols P0, TO shown in FIG. 14).

A color difference $\Delta E_{00}$ between the color data $Lab_{S3}$ (see a lower right part of FIG. 15) of the colors of the printed material formed by the commercial printer 200 when making the commercial printer 200 perform printing with the color data $cmyk_{pp}$ altered with the initial value of the color adjustment vector Δcmyk and the color data $Lab_{ST}$ (see a middle right part of FIG. 15) representing the colors as the target is calculated for the initial value of each of the color adjustment vectors Δcmyk. The color difference $\Delta E_{00}$ obtained for each of the initial values of the color adjustment vectors Δcmyk corresponds to a difference between the printing result achieved by each of the initial values of the color adjustment vectors Δcmyk and the printing result achieved by an ideal color adjustment vector $\Delta cmyk_i$.

The initial value of the color adjustment vector Δcmyk the smallest in the value of the objective function including the square of the color difference $\Delta E_{00}$ as a constituent element out of the plurality of color adjustment vectors Δcmyk is selected from the plurality of initial values of the color adjustment vectors Δcmyk. Then, the plurality of color adjustment vectors Δcmyk to be used in the next process is prepared based on the initial value of the color adjustment vector Δcmyk thus selected. Thereafter, substantially the same process is repeated to decide the optimum color adjustment vector $\Delta cmyk_b$.

By adjusting the color data $cmyk_p$ (see a middle right part of FIG. 15) for the commercial printer 200, which is prepared by converting the color data $CMYK_{in}$ for the target printer 300 with the input profile 610 and the B2A table 621 in the output profile 620, with the optimum color adjustment vector $\Delta cmyk_b$, the following advantages can be obtained. Specifically, it is possible to approximate the colors of the printed material printed by the commercial printer 200 to the target color $C_T$ as the colors of the printed material printed by the target printer 300. The output gray levels of the B2A table 621 in the output profile 620 are adjusted by the optimum color adjustment vector $\Delta cmyk_b$ (see a central part of FIG. 15).

Figure 16:
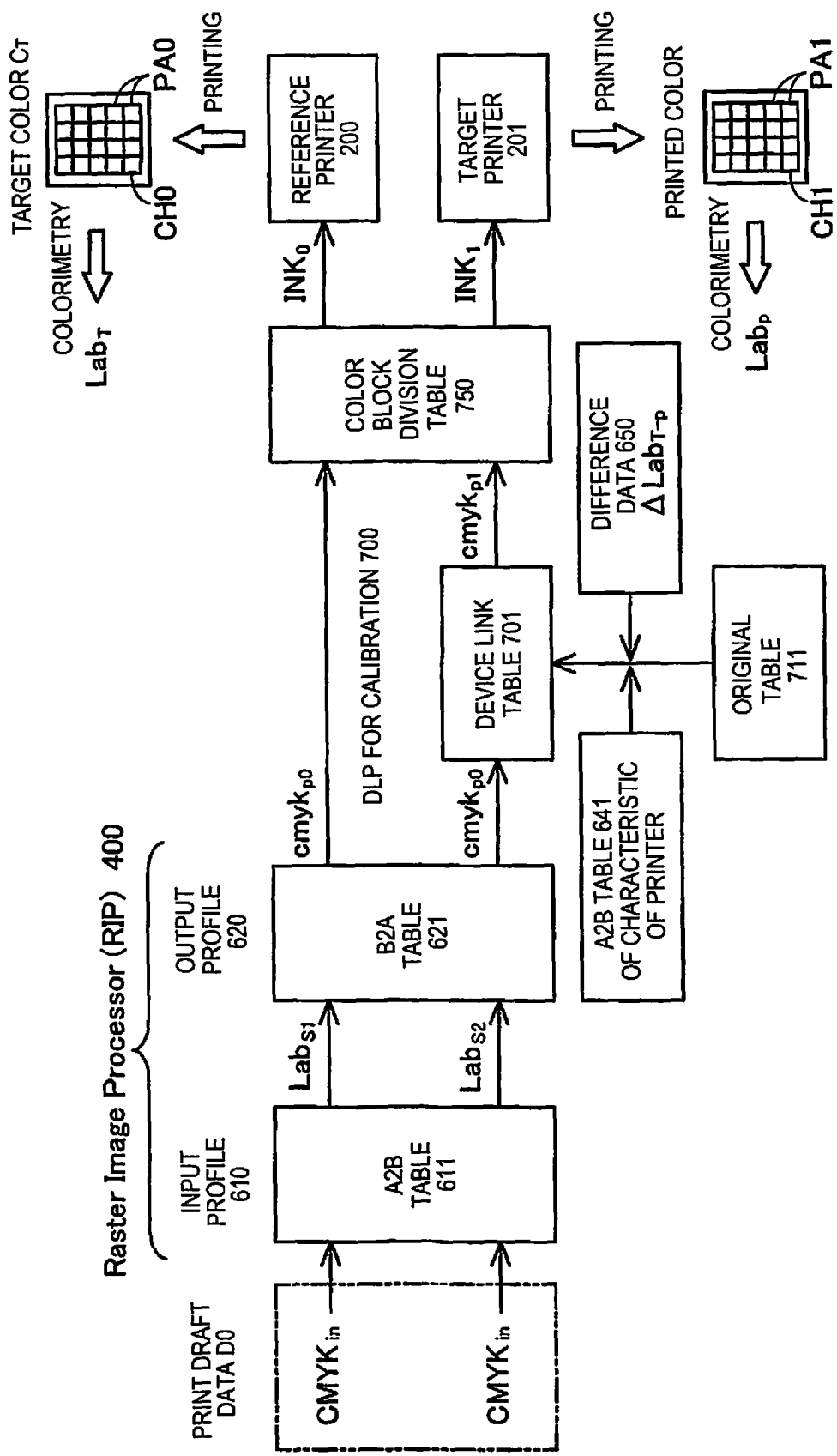
FIG. 16 is an explanatory diagram showing a process of an adjustment in printing result between the commercial printers.

(6) Adjustment in Printing Result Between Commercial Printers:

FIG. 16 is an explanatory diagram showing a process of an adjustment in printing result between the commercial printers. Although omitted in the description hereinabove, when the ink of another color is used in the commercial printer 200 in addition to the cyan (c) ink, the magenta (m) ink, the yellow (y) ink, and the black (k) ink, the following process is performed. Specifically, the color data $cmyk_p$ in which the colors are each expressed by a combination of the gray levels of the four colors of cyan (c), magenta (m), yellow (y), and black (k) is converted into color data INK in which the colors are each expressed by a combination of the gray levels of five or more ink colors used in the commercial printer 200 using a color block division table 750 (see a middle right part of FIG. 16). The commercial printer 200 performs printing with the color data INK. In FIG. 16, the color data in which the colors are each expressed by a combination of the respective gray levels of the four colors of cyan (c), magenta (m), yellow (y), and black (k) is represented by color data $cmyk_{p0}$. The color data in which the colors are each expressed by a combination of the respective gray levels of the colors of the five or more colors of ink used in the commercial printers 200, 201 is represented by color data $INK_0$, $INK_1$.

Even when printing is performed by the commercial printers 200, 201 the same in model with the same color data $cmyk_{p0}$, the colors reproduced in the printing result of the commercial printer 200 and the colors reproduced in the printing result of the commercial printer 201 are different from each other in some cases. In such a case, the colors reproduced in the printing result are unified by the following process.

One of the commercial printers 200 is set as a reference printer 200. The rest of the commercial printers 201 are set as target printers 201 as the adjustment target. The color data to be input to the target printers 201 is adjusted so that the colors which are reproduced in the printing result PA1 of the target printers 201, and are specified by the color data $Lab_p$ approximate to the colors which are reproduced in the printing result PA0 of the reference printer 200, and are specified by the color data $Lab_T$.

Specifically, the color data $cmyk_{p0}$ output from the RIP 400 is converted into the color data $cmyk_{p1}$ with the device link table 701 provided to the device link profile 700 for calibration (see a central part of FIG. 16). The color data $cmyk_{p1}$ is the color data with which colors more approximate to the colors reproduced in the printing result PA0 of the reference printer 200 are reproduced in the target printers 201 compared to the color data $cmyk_{p0}$. It should be noted that the colors reproduced in the printing result PA0 of the reference printer 200 are specified by the color data $Lab_T$. The colors reproduced in the printing result PA1 of the target printers 201 are specified by the color data $Lab_p$.

The device link table 701 is a table having a combination of the respective gray levels of the four colors of cyan (c), magenta (m), yellow (y), and black (k) as an input value, and having a combination of the respective gray levels of the four colors of cyan (c), magenta (m), yellow (y), and black (k) as an output value. The device link table 701 is prepared in such a manner as described below.

Firstly, an original table 711 is prepared. The original table 711 is a table having a combination of the respective gray levels of the four colors of cyan (c), magenta (m), yellow (y), and black (k) as an input value, and having a combination of the respective gray levels of the four colors of cyan (c), magenta (m), yellow (y), and black (k) as an output value. In the original table 711, the combination of the respective gray levels of as the output value is the same as the combination of the respective gray levels as the input value. In other words, the transformation with the original table 711 is an identical transformation.

The device link table 701 is prepared by altering the output value of the original table 711. The variation Δcmyk of the output gray level of the original table 711 is decided so that the colors of the printed material printed by the target printers 201 approximate to the target color $C_T$ as the colors of the printed material printed by the reference printer 200.

An A2B table 641 is prepared. The A2B table 641 is a table for conversing the coordinates in the color space of the ink colors cmyk of the target printers 201 into the coordinates in the Lab color space as the PCS (Profile Connection Space). The conversion by the A2B table 641 corresponds to performing a simulation of colors of the printed material printed by the target printers 201 when making the target printers 201 perform printing with the color data specified in the color space of the ink colors cmyk of the target printers 201.

The A2B table 641 is prepared in such a manner as described below. The color data in the cmyk color space for printing a color chart is input to the target printers 201 to make the target printer 201 print a color chart CH1. The colorimetry is performed on the patches PA1 of the respective colors in the color chart CH1 to obtain colorimetric values $Lab_p$ (see a lower right part of FIG. 16). By associating the colorimetric values $Lab_p(L,a,b)$ of the respective patches PA1 with the combinations (c,m,y,k) of the gray levels of the basic colors in the cmyk color space of the respective patches PA1, the A2B table 641 is formed.

Difference data 650 is prepared. The difference data 650 is data representing a difference between the colors reproduced by the reference printer 200 and the colors reproduced by the target printers 201 in the Lab color space. The difference data 650 is prepared in such a manner as described below. The same color data in the cmyk color space for printing the color chart is input to the reference printer 200 and the target printers 201 to make the reference printer 200 and the target printer 201 respectively print the color charts CH0, CH1. Then, the colorimetry is performed on the corresponding patches PA0, PA1 in the respective color charts CH0, CH1 to obtain colorimetric values $Lab_T$, $Lab_p$ (see an upper right part and a lower right part of FIG. 16).

By performing a process of associating the difference (ΔL,Δa,Δb) between the colorimetric values $Lab_T$, $Lab_p$ with the combination of the respective gray levels of the four colors of cyan (c), magenta (m), yellow (y), and black (k) in the cmyk color space of the patch PA0 or PA1 for each of the patches in the color charts CH0, CH1, the difference data 650 is prepared. As a result, the difference data 650 thus prepared is a table having a combination of the gray levels of the basic colors in the cmyk color space as the input, and having the color difference in the Lab color space as the output. A difference between the color expressed by the reference printer 200 and the color expressed by the target printers 201 is described as $\Delta Lab_{T-p}$.

Subsequently, the optimum value $\Delta cmyk_b$ of the variation of the output gray level of the original table 711 is decided with substantially the same method as the method described with reference to FIG. 15. It should be noted that the A2B table 641 (see a lower middle part of FIG. 16) functioning as a simulator of the target printers 201 is used instead of the A2B table 622 (see a lower middle part of FIG. 15) in the output profile 620.

More specifically, the following process is performed. The output color data $cmyk_p$ of the B2A table 621 in the output profile 620 is input to the A2B table 641 after being converted (see a central part of FIG. 15) with a tentative device link table 701 obtained by altering the original table 711 with a tentative variation Δcmyk. The A2B table 641 functions as a simulator of the target printers 201.

As the evaluation of the variation Δcmyk with which the original table 711 is altered, evaluation of the output of the A2B table 641 is performed (see the reference symbols $Lab_{s3}$ and $\Delta E_{00}$ in the lower right part of FIG. 15). Such a process is performed with respect to a plurality of tentative variations £cmyk. Then, the variation Δcmyk minimizing the objective function related to the printing result is selected. The plurality of variations Δcmyk to be used in the next process is prepared based on the variation Δcmyk thus selected. By repeating such a process, the optimum value $\Delta \mathrm{cmyk}_b$ of the variation of the output gray level of the original table 711 is decided.

The output gray level of the original table 711 is altered with the optimum value $\Delta \mathrm{cmyk}_b$ of the variation of the output gray level of the original table 711, and thus, the device link table 701 is prepared (see a central part of FIG. 16).

In this aspect, the color reproduced by the target printers 201 is approximated to the color reproduced by the reference printer 200 by disposing the device link table 701 for altering the output value of the B2A table 621 instead of adjusting the B2A table 621 for converting the coordinate in the Lab color space into the coordinate in the color space of the ink colors cmyk of the commercial printer 200. Therefore, the process for the adjustment is performed in the cmyk color space. Therefore, it is possible to perform the color adjustment without being affected by the gamut mapping between the both spaces in the conversion between the Lab color space as the PCS (Profile Connection Space) and the cmyk color space for the printer. As a result, it is possible to approximate the reproduced colors to each other between the target printers 201 and the reference printer 200 both of which receive the same color data specified in the cmyk color space to reproduce the colors.

It should be noted that in the RIP 400, it is possible to hold the device link table 701 independently of the B2A table 621, or to hold the B2A table 621 the output value of which is altered based on the device link table 701.

Figure 17:
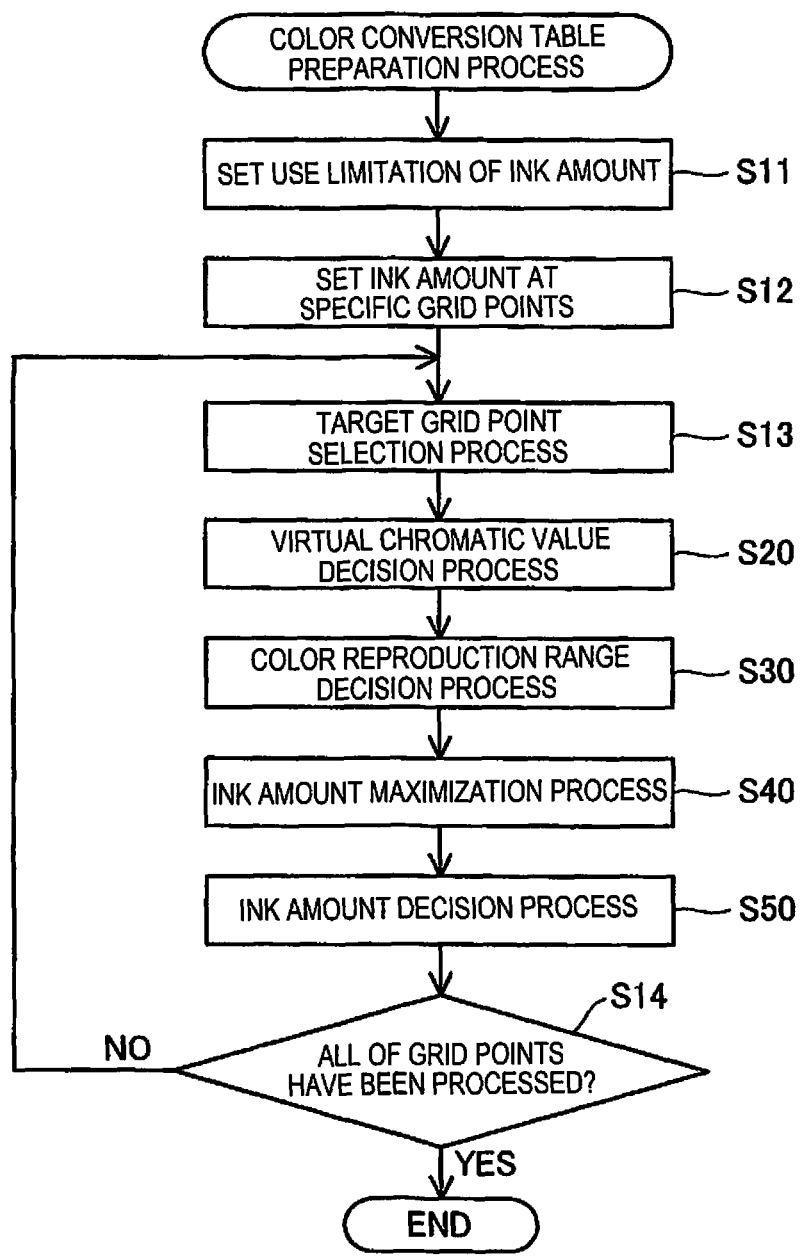
FIG. 17 is a flowchart showing a process of preparing a B2A table 621 and a color block division table 750 as a color conversion table.

(7) Process of Preparing Color Conversion Table:

FIG. 17 is a flowchart showing a process of preparing the B2A table 621 and the color block division table 750 as the color conversion table (see a central part of FIG. 15 and the reference numerals 621 and 750 shown in FIG. 16). The process shown in FIG. 17 is executed when preparing the information 1060 of the profile of the printer in the printing setup information Ips by the computer 100v of the medium vendor MV or the computer 100psv of the printing setup vendor PSV (see an upper right part of FIG. 1, a middle right part of FIG. 10, and the reference numeral 620 shown in FIG. 4). It should be noted that although only the output profile 620 is described in the information 1060 of the profile of the printer in the printing setup information Ips shown in FIG. 4, it is possible to include the color block division table 750 in the information 1060.

In the process of preparing the B2A table 621 and the color block division table 750 (see a central part of FIG. 15 and the reference numerals 621 and 750 shown in FIG. 16), there are decided the combinations of the gray levels in the cmyk color space corresponding to the combinations of the gray levels in the Lab color space as the PCS. In the present specification, the combination of the gray levels in the Lab color space as the PCS is also referred to as a "grid point." The gray level in the cmyk color space is also referred to as an "ink amount."

In the step S11, a use limitation on the ink amount is set as an initial setup in accordance with an operation of the user.

In the step S12, the ink amount at a specific grid point is set in accordance with an operation of the user.

In the step S13, a target grid point as one of the grid points to be the target of deciding the ink amount is selected. As the method of selecting the target grid point, it is possible to use a known technology described in JP-A-2011-223345. An outline of the process will hereinafter be described.

It is assumed that there are N (N is an integer expressed as $2^n$, n is a positive integer) grid points disposed along a certain coordinate axis direction of the color conversion table. It is assumed that those N grid points have grid-point numbers (1 through N) in the sequence of alignment along the direction of the coordinate axis. Those grid points are provided with processing numbers in accordance with the following process.

Firstly, a first grid point is provided with 1 as the processing number, and an N-th grid point is provided with 2 as the processing number. Subsequently, among combinations of the grid points the processing numbers of which have been decided, and which are adjacent to each other, a set of grid points having the largest difference in grid-point number are selected, and the next processing number is assigned to the grid point located at the midpoint between the set of grid points. It should be noted that when there are two or more combinations of the grid points having the largest difference in grid-point number, the combination including the grid point the smallest in grid-point number is selected. Due to such a process as described above, the processing number is provided to each of the grid points.

In the step S13, among the grid points which align along the coordinate axis direction, and in which the ink amount is not decided, the grid point having the smallest processing number is selected as the target grid point.

In the step S20, a virtual chromatic value is decided for the target grid point. The virtual chromatic value is specifically gray levels of the respective ink colors in the cmyk color space. With respect to some of the grid points including the grid points located at the vertexes of the color conversion table, the virtual chromatic value is decided in advance using a different method from the method described below. The grid points located at the vertexes of the color conversion table are the grid points the coordinate value of which is specified by a combination of the maximum value or the minimum value of the gray level with respect to each of the coordinate axes in the color space of the color conversion table.

Regarding the two grid points respectively located the nearest to the target grid point on both sides of the target grid point in the color conversion table, the virtual chromatic value has already been decided in accordance with the processing number. The virtual chromatic value of the target grid point is decided using the virtual chromatic values of those grid points on the both sides. Specifically, there is formed a cubic spline function having the virtual chromatic value, more specifically, the gray level of any one of cmyk as the output, and connecting two grid points the virtual chromatic values of which have been known, and the target grid point the virtual chromatic value of which has not been decided. The virtual chromatic value of the target grid point is decided so that the square sum of the quadratic differential values of the cubic spline function becomes the smallest.

In the step S30, the virtual chromatic values of some of the target grid points are altered so that the color reproduction range becomes the largest within the range of the use limitation of the ink amount designated by the user.

In the step S40, the process of maximizing the sum of the ink amounts corresponding to the target grid points. Due to this process, for example, a part of the amount of the black ink is replaced with the combination of the amounts of the cyan ink, the magenta ink, the yellow ink. As a result, the granularity of the printing result is improved.

In the step S50, the ink amount corresponding to the target grid point is decided so that the ink amount gradation characteristic becomes the best. With respect to some of the grid points including the grid points located at the vertexes of the color conversion table, the ink amount is decided in advance using a different method from the method described below (see step S12).

Regarding the two grid points respectively located the nearest to the target grid point on both sides of the target grid point, the ink amount has already been decided in accordance with the processing number. The ink amount of the target grid point is decided using the ink amounts of those grid points on the both sides. Specifically, there is formed a cubic spline function having the ink amount as the output, and connecting two grid points the ink amounts of which have been known, and the target grid point the ink amount of which has not been decided. The ink amount of the target grid point is decided so that the square sum of the quadratic differential values of the cubic spline function becomes the smallest. As a result, the ink amount corresponding to the target grid point is decided so that the ink amount gradation characteristic becomes the best.

In the step S14, whether or not the ink amount has been decided for all of the grid points in the color conversion table is determined. When there is a grid point for which the ink amount has not been decided, the process returns to the step S13. When the ink amount is decided for all of the grid points, the process terminates.

Due to the process described hereinabove, it is possible to prepare the B2A table 621 and the color block division table 750 as the color conversion table (see the central part of FIG. 15 and the reference numerals 621 and 750 shown in FIG. 16).

In the preparation method of the color conversion table shown in FIG. 17, the virtual chromatic value is decided using the cubic spline function connecting a plurality of grid points so that the square sum of the quadratic differential values becomes the smallest. Further, the combination of the ink amounts of each of the grid points is decided using the cubic spline function connecting a plurality of grid points so as to minimize the square sum of the quadratic differential values. Therefore, it is possible to realize printing achieving both of the gradation characteristic of the chromatic value in the printing result and an improvement in gradation characteristic of the ink amount.

Further, by using the preparation method of the color conversion table according to the present embodiment, it is possible not only to prepare the color conversion table in advance, but also to re-prepare the color conversion table every time the printing condition changes.

F. Another Embodiment 1

F1. Another Configuration 1:

(1) In the embodiment described above, the printer provider PP provides the medium vendor MV with the printer 200v and the profile preparation tool PMT (see a middle right part of FIG. 1). As an aspect of the provision, it is possible to adopt direct distribution or rental (including licensing), or indirect distribution or rental (including licensing) via a business agent from the printer provider PP to the medium vendor MV. Further, as an aspect of the provision, it is possible to adopt distribution or rental via the market.

In the embodiment described above, the printer provider PP provides the medium vendor MV with the printer 200v and the profile preparation tool PMT (see a middle right part of FIG. 1). However, the subject which provides the medium vendor MV with the printer 200v and the subject which provides the medium vendor MV with the profile preparation tool PMT can be different from each other. In other words, it is possible for the printer provider PP to provide the medium vendor MV with the printer 200v while a tool vendor different from the printer provider PP provides the medium vendor MV with the profile preparation tool PMT.

(2) In the embodiment described above, the printers 200 are each provided with a spectrophotometer for measuring the colors applied to the printed material, and a digital still camera for taking an image formed on the printed material. However, it is possible for the printer used when preparing the printing setup information to have an aspect not provided with at least one of the spectrophotometer and the digital still camera. For example, it is possible for the medium vendor MV to separately prepare a sensor for deciding the quality of the printing result. It is possible for the printer provider PP to rent such a sensor to the medium vendor MV.

(3) In the embodiment described above, the quality level information 1130 includes the evaluation values of the color reproduction accuracy, the color reproduction range, the gradation characteristic, linearity, the granularity, and ink bleeding with respect to the printing result (see FIG. 4). However, it is also possible for the quality level information to have an aspect not including at least one of the evaluation values of the color reproduction accuracy, the color reproduction range, the gradation characteristic, the linearity, the granularity, and the ink bleeding. The quality level information can also include other evaluation values with respect to the printing result.

(4) In the embodiment described above, the recording medium for lamination is provided with the RFID (Radio Frequency IDentifier) or the QR code (registered trademark). Further, by transmitting the information retrieved from the RFID or the QR code to the management server Sv, it becomes possible for the printing companies PCa, PCb to download the printing setup information Ips for lamination. However, such a process can be applied not only to the printing setup information Ips for the recording medium for lamination, but also to the printing setup information Ips prepared for a variety of recording media. In such an aspect, designation of the type of the print medium when selecting the printing setup information Ips can automatically be performed.

(5) In the embodiment described above, the printing company performs the setup based on the printing setup information Ips on the software for controlling the printer 200 to perform printing. However, the setup based on the printing setup information Ips can directly be performed on the printer. Further, the setup based on the printing setup information Ips can be performed on both of the printer and the software for controlling the printer.

F2. Another Configuration 2:

In the embodiment described above, the printing setup information Ips includes the following information (see FIG. 4): the information 1010 of the model of the intended printer; the information 1020 of the type of the intended print medium; the information 1030 of the type of the ink to be used in the intended printer; the information 1040 of the printing mode to be used in the intended printer; the information 1050 of the operation setup parameters of the printer including the feed speed of the medium in the intended printer; and the information 1060 of the profile of the intended printer.

However, it is possible for the printing setup information Ips to have an aspect not including at least one of these pieces of information. It should be noted that it is preferable for the printing setup information Ips to include the information 1010 of the model of the intended printer, the information 1020 of the type of the intended print medium, and the information 1030 of the type of the ink to be used in the intended printer.

F3. Another Configuration 3:

In the embodiment described above, the medium vendor MV pays a compensation Pcv corresponding to the number of pieces of printing setup information Ips to be stored in the management server Sv to the printer provider PP (see the middle right part of FIG. 1). However, it is also possible for the medium vendor MV to pay the compensation Pcv independent of the number of pieces of printing setup information Ips to be stored in the management server Sv to the printer provider PP.

Further, it is also possible to adopt an aspect in which there is provided a classification of the number of pieces of printing setup information Ips which can be uploaded, and the number of pieces of printing setup information Ips which can be uploaded by the medium vendor MV is set in accordance with the compensation paid in advance by the medium vendor MV.

Further, it is also possible to adopt an aspect in which the compensation is paid from the printing companies PCa, PCb to the printer provider PP, but the compensation is not paid from the medium vendor MV to the printer provider PP.

F4. Another Configuration 4:

In the embodiment described above, when the printing setup information Ips received from the medium vendor MV does not fulfill the condition set in advance related to the printing result, the management server Sv does not store the printing setup information Ips received from the medium vendor MV (see steps S120 through S140, and S170 shown in FIG. 5). However, it is also possible to adopt an aspect in which the management server Sv stores the printing setup information Ips received from the medium vendor MV without checking such a condition as described above.

F5. Another Configuration 5:

In the embodiment described above, when the printing setup information Ips received from the medium vendor MV does not fulfill the condition related to the preparation method of the printing setup information Ips, the management server Sv does not store the printing setup information Ips received from the medium vendor MV, but gives the notice that the printing setup information Ips has not been stored in the management server Sv to the medium vendor MV which has transmitted the printing setup information Ips. However, it is also possible to adopt an aspect in which when the printing setup information Ips received from the medium vendor MV does not fulfill the condition related to the preparation method of the printing setup information Ips, the management server does not give such a notice. Further, it is also possible to adopt an aspect in which the management server Sv stores the printing setup information Ips received from the medium vendor MV without checking such a condition as described above.

Further, in the embodiment described above, when the printing setup information Ips received from the medium vendor MV fulfills the condition related to the preparation method and the condition related to the printing result, the management server Sv stores the printing setup information Ips in the RAM 113s. However, it is also possible to add other conditions as the registration conditions for the management server Sv to store the printing setup information Ips to the RAM 113s.

F6. Another Configuration 6:

In the embodiment described above, the printing setup information Ips includes a preparer ID 1110 representing the preparer who prepared the printing setup information Ips, the information 1120 of the preparation method when preparing the printing setup information Ips, and the quality level information 1130 representing the quality of the printing result when performing printing using the printing setup information Ips. However, it is possible for the printing setup information Ips to have an aspect not including one or more of these pieces of information.

F7. Another Configuration 7:

In the embodiment described above, it is possible for the medium vendor MV to perform the process of transmitting the printing setup information Ips designating one or more printing companies which are allowed to download the printing setup information Ips from the management server Sv out of the printing companies PCa, PCb, and PCas in the process of transmitting the printing setup information Ips to the management server Sv. The management server Sv allows only the designated printing company to download the printing setup information Ips which is the printing setup information Ips stored, and is transmitted from the medium vendor MV designating the printing company allowed to download (see a middle left part of FIG. 1).

However, it is also possible for the management server Sv to allow other companies than the printing companies designated to download the printing setup information Ips. Further, it is also possible for the management server Sv not to allow the printing companies designated to download the printing setup information Ips.

Further, it is possible for the printing system PS to have an aspect in which it is not possible to designate one or more printing companies which are allowed to download the printing setup information Ips.

F8. Another Configuration 8:

In the embodiment described above, it is possible for the management server Sv to allow only the printing company fulfilling the condition set in advance to download some pieces of printing setup information Ips out of the plurality of pieces of printing setup information Ips. However, it is possible to adopt an aspect in which such a limitation is not provided regarding the printing companies which are allowed to download the printing setup information Ips.

F9. Another Configuration 9:

In the embodiment described above, the printing companies PCa, PCb each pay the compensation Pcp1 corresponding to (i) the compensation for the download of the individual printing setup information Ips, (ii) the quality (see the reference numeral 1130 shown in FIG. 4) of the printing result of the printing setup information Ips, (iii) the number of pieces of printing setup information Ips downloaded by the printing company from the management server Sv, and (iv) the duration of use of the downloaded printing setup information Ips to the printer provider PP (see a central part of FIG. 1). However, it is also possible for the compensation Pcp1 to be paid from the printing companies PCa, PCb to the printer provider PP to be decided without considering at least one of these items. Further, it is also possible for the compensation Pcp1 to be paid from the printing companies PCa, PCb to the printer provider PP to be decided taking other factors into consideration.

For example, it is also possible to adopt an aspect in which the compensation Pcp2 corresponding to the amount of printing is paid to the printer provider PP, but the compensation Pcp1 corresponding to the use of the printing setup information Ips is not paid to the printer provider PP.

Further, it is also possible to adopt an aspect in which the compensation is paid from the medium vendor MV to the printer provider PP, but the compensation is not paid from the printing companies PCa, PCb to the printer provider PP.

F10. Another Configuration 10:

In the embodiment described above, the printing companies PCa, PCb pay the compensation Pcp2 corresponding to the amount of printing using the printing setup information Ips downloaded to the printer provider PP (see the central part of FIG. 1). However, it is possible for the printing companies PCa, PCb to take a response of not paying the compensation Pcp2 corresponding to the amount of printing using the printing setup information Ips downloaded to the printer provider PP. For example, it is also possible to adopt an aspect in which the compensation Pcp1 corresponding to the use of the printing setup information Ips is paid to the printer provider PP, but the compensation Pcp2 corresponding to the amount of printing is not paid to the printer provider PP.

F11. Still Another Configuration:

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to an aspect of the present disclosure, there is provided a printing system including a first provider configured to provide a printer, a second provider configured to provide a print medium, at least one client configured to perform printing on the print medium using the printer, and a storage section configured to process and store information, wherein the first provider, the second provider, the at least one client, and the storage section are coupled to each other via a network.

The first provider provides the second provider with a provider printer and a profile preparation tool as software, the second provider executes a process of preparing a profile corresponding to a combination of the provider printer and the print medium using the provider printer and the profile preparation tool, and then transmitting printing setup information including the profile to the storage section in order to make the storage section store the printing setup information for one or more print media provided by the second provider, and the client downloads the printing setup information corresponding to the combination of a client printer used for printing in the client and a print medium used for the printing from the storage section, then performs setup based on the printing setup information on one of software configured to control the client printer and the client printer, and then performs the printing.

By adopting such an aspect, it is possible for the client to obtain the printing setup information corresponding to the combination of the client printer used for printing and the print medium used for the printing in a short time compared to an aspect in which mailing of a color chart sample is included in a process prior to setting the printing setup information to one of the software for controlling the client printer and the client printer.

(2) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

By adopting such an aspect, it is possible for the client to obtain a printed material having a quality assumed when the second provider prepares the profile designating (i) the model of the client printer, (ii) the type of the print medium, (iii) the type of the ink, (iv) the printing mode, and (v) the setup parameter by performing the setup based on the printing setup information on the software for controlling the client printer or the client printer, and then performing printing.

(3) In the printing system according to the above aspect, it is possible to adopt an aspect in which the second provider pays a compensation corresponding to a number of pieces of the printing setup information to be stored in the storage section to the first provider.

By adopting such an aspect, it is possible for the first provider to obtain the compensation corresponding to the extent to which the second provider makes use of the printing system. It is possible for the second provider to further achieve the promotion of the use of the print medium by the client by making use of the printing system in accordance with an increase in the compensation to be paid to the first provider.

(4) In the printing system according to the above aspect, it is possible to adopt an aspect in which the storage section fails to store the printing setup information received from the second provider when the printing setup information received from the second provider fails to fulfill a condition related to a printing result set in advance, and stores the printing setup information received from the second provider when the printing setup information received from the second provider fulfills a registration condition including the condition related to the printing result.

By adopting such an aspect, it is possible to control the quality of the printing setup information provided from the storage section to the client.

(5) In the printing system according to the above aspect, it is possible to adopt an aspect in which the storage section fails to store the printing setup information received from the second provider when the printing setup information received from the second provider fails to fulfill a condition related to a preparation method of the printing setup information set in advance, and stores the printing setup information received from the second provider when the printing setup information received from the second provider fulfills a registration condition including the condition related to the preparation method of the printing setup information.

By adopting such an aspect, it is possible to control the quality of the printing setup information provided from the storage section to the client.

(6) In the printing system according to the above aspect, it is possible to adopt an aspect in which the printing setup information further includes information representing a preparer of the printing setup information.

By adopting such an aspect, it is possible for the client using the printing setup information to know the preparer of the printing setup information downloaded.

(7) In the printing system according to the above aspect, it is possible to adopt an aspect in which the second provider may execute the process of transmitting the printing setup information designating one or more of the clients allowed to download the printing setup information in the process of transmitting the printing setup information to the storage section.

By adopting such an aspect, it is possible for the second provider to provide the printing setup information only to the one or more of the clients having a specific relationship with the second provider. It is possible for the one or more clients designated to use the printing setup information which other clients are not allowed to use.

(8) In the printing system according to the above aspect, it is possible to adopt an aspect in which the storage section stores a plurality of pieces of the printing setup information, and allows only a client which fulfills a condition set in advance out of the one or more clients to download some pieces of the printing setup information out of the plurality of pieces of the printing setup information.

By adopting such an aspect, it is possible to operate the printing system so that only the printing setup information suitable for the client can be downloaded to the client.

(9) In the printing system according to the above aspect, it is possible to adopt an aspect in which the storage section stores a plurality of pieces of the printing setup information, the plurality of pieces of the printing setup information includes a plurality of types of the printing setup information different in compensation for download from each other, and a plurality of types of the printing setup information different in level representing a quality of a printing result from each other, and the client pays a compensation corresponding to (i) a compensation for download of the printing setup information, (ii) the level representing the quality of the printing result of the printing setup information, (iii) a number of pieces of the printing setup information downloaded from the storage section, and (iv) a duration of use of the printing setup information downloaded from the storage section to the first provider.

By adopting such an aspect, it is possible for the first provider to obtain the compensation corresponding to the content for which the client makes use of the printing system. It is possible for the client to make greater use of the printing system to perform printing in accordance with the increase in compensation paid to the first provider.

(10) In the printing system according to the above aspect, it is possible to adopt an aspect in which the client pays a compensation corresponding to an amount of printing using the printing setup information downloaded to the first provider.

By adopting such an aspect, it is possible for the first provider to obtain the compensation corresponding to the extent to which the client makes use of the printing system. It is possible for the client to make greater use of the printing system to perform printing in accordance with the increase in compensation paid to the first provider.

G. Another Embodiment 2

G1. Another Configuration 1:

(1) In the embodiment described above, when the "warranty conditions" are not fulfilled, the CPU 111a does not perform printing (see steps S310 through S330, and S370 shown in FIG. 6). However, it is possible to adopt an aspect in which when the "warranty conditions" are not fulfilled, printing not attached with the warranty label Mqa is performed.

(2) In the embodiment described above, the warranty label Mqa is constituted by the characters "QA" and the ellipse surrounding the characters "QA" (see FIG. 7). However, a mark to be attached to the printed material when the "warranty conditions" have been fulfilled can be one represented only by a figure, or can also be one represented only by characters. The mark to be attached to the printed material when the "warranty conditions" have been fulfilled can also be a text such as "ALL OF THE COLORS ARE SUCCESSFULLY REPRODUCED IN THE MATS."

(3) In the embodiment described above, the warranty label Mqa is printed in the footer Af. However, it is also possible for the warranty label Mqa to be attached to a header Ah of the printed material PM, an area Ar on the right side of the image Img as the printing target in the printed material PM, or an area Al on the left side thereof.

(4) In the embodiment described above, only the mark constituted by the characters "QA" and the ellipse surrounding the characters "QA" is printed in the footer Af as the warranty label Mqa (see FIG. 7). However, it is also possible for the warranty label Mqa to include information which can identify the job Jb. It is possible for the warranty label Mqa to include the information which can identify the job Jb in an aspect of, for example, a one-dimensional or two-dimensional bar code. It is possible for the user to access the management server Sv to confirm that the printed material PM of the job Jb has been produced by printing fulfilling the warranty conditions using the information which can identify the job Jb and is printed on the printed material.

(5) In the embodiment described above, when the printing in accordance with the print data altered in the step S340 shown in FIG. 6 is completed, the computer 100a of the printing company PCa uploads the information of the fact that the printed material PM of the job Jb have been produced by the printing fulfilling the warranty conditions together with the information which can identify the job Jb to the management server Sv (see step S350 shown in FIG. 7). It is possible for the computer 100a of the printing company PCa to upload still other information to the management server Sv.

It is possible for the computer 100a of the printing company PCa to upload an operating rate and operating time of the printer owned by the printing company PCa to the management server Sv. It is possible for the computer 100a of the printing company PCa to upload expected operating time of the printer owned by the printing company PCa to the management server Sv. In such an aspect, it is possible for the ordering party OP to access the management server Sv to check the expected operating time, the operating rate, and so on of the printer of each of the printing companies to assign the job Jb to each of the printing companies.

It is possible for the computer 100a of the printing company PCa to upload an attach rate of each type of the print medium to the printer 200a to the management server Sv. It is possible for the computer 100a of the printing company PCa to upload a consumption rate per unit time such as one month or a half year of each type of the print medium to the management server Sv. It is possible for the computer 100a of the printing company PCa to upload the data of the quality variation of the printing result between lots, and the data of the evaluation result on the job Jb obtained from the ordering party OP to the management server Sv.

In such an aspect, it is possible for the management server Sv to provide the medium vendor MV with the data described above. It is possible for the medium vendor MV to set a production schedule for each type of the print medium MD based on the attach rate to the printer 200a and the consumption rate of each type of the print medium. It is possible for the medium vendor MV to perform the quality control of the print medium MD based on the data of the quality variation of the printing result between lots, and the data of the evaluation result on the job Jb obtained from the ordering party OP.

It is possible for the computer 100a of the printing company PCa to upload the sensor data obtained by measuring the printed material PM with the sensor of the printer 200a, and the use amount in the printing for each ink to the management server Sv. By obtaining the information of number of times of drive of each nozzle of the printer 200a and the type of the droplet ejected by each drive from the printer 200a, it is possible for the computer 100a to calculate the use amount of each ink in the printing.

In such an aspect, it is possible for the management server Sv to provide the printer provider PP with the data described above. It is possible for the printer provider PP to calculate the compensation Pcp2 (see a lower right part of FIG. 1) based on the use amount of each ink in the printing. By performing such a process, it is possible to decide the compensation Pcp2 excluding the ink consumption which does not directly advantage the printing company PCa such as the ink consumption in the cleaning of the nozzles or the preliminary ejection of the ink before starting printing.

It is possible for the printer provider PP to provide the maintenance service for the printer 200a of the printing company PCa at an appropriate timing based on the sensor data and the use amount of each ink in the printing. It is possible for the printer provider PP to perform the production of the printer and design of a new printer taking the sensor data into consideration.

It is possible for the management server Sv to provide the printer provider PP with the amount of download of each piece of the printing setup information Ips. It is possible for the printer provider PP to calculate the compensation Pcv (see a middle right part of FIG. 1) based on the amount of download of each piece of the printing setup information Ips. By performing such a process, it is possible to appropriately set the compensation Pcv based on the result.

(6) In the embodiment described above, the quality level information 113O includes the evaluation values of the color reproduction accuracy, the color reproduction range, the gradation characteristic, the granularity, and ink bleeding with respect to the printing result (see FIG. 4). However, it is also possible for the quality level information to have an aspect not including at least one of the evaluation values of the color reproduction accuracy, the color reproduction range, the gradation characteristic, the granularity, and the ink bleeding. The quality level information can also include other evaluation values with respect to the printing result.

(7) In the embodiment described above, in the step S320 shown in FIG. 6, the CPU 111a determines whether or not the gradation characteristic condition that the rating of the gradation characteristic in the quality level information 113O (see a lower part of FIG. 4) included in the printing setup information Ips is higher than a standard set in advance is fulfilled. However, the determination on whether or not the gradation characteristic condition is fulfilled performed prior to the printing of the warranty label Mqa can be performed using another method. In other words, it is possible to determine whether or not the gradation characteristic condition is fulfilled by actually printing the color chart with the printer 200a, and then performing the colorimetry on the printing result using the sensor of the printer 200a similarly to the evaluation of the color difference. By adopting such an aspect, it is possible to determine whether or not the gradation characteristic condition is fulfilled based on the gradation characteristic of the actual printed material.

(8) In the embodiment described above, the information of the fact that the printing company PCa undergoes the periodic quality audit related to printing is stored in advance in the RAM 113a by the application software for controlling the printer 200a (see a middle left part of FIG. 1). It is possible to adopt an aspect in which the information representing whether or not each of the printing companies undergoes the periodic quality audit related to printing is stored in the RAM 113pp by the printer provider PP so as to be associated with each of the printing companies, and is obtained via the application software for controlling the printer 200 of each of the printing companies when performing printing in each of the printing companies.

In the embodiment described above, the information of the fact that the printing company PCa takes the periodic course related to printing is stored in advance in the RAM 113a by the application software for controlling the printer 200a. The information of the time and date when the calibration has been performed in the printing company PCa is stored in advance in the RAM 113a by the application software for controlling the printer 200a. It is possible to adopt an aspect in which the information described above is also stored in the RAM 113pp by the printer provider PP so as to be associated with each of the printing companies, and is obtained via the application software for controlling the printer 200 when performing printing in each of the printing companies similarly to the information representing whether or not each of the printing companies undergoes the periodic quality audit.

(9) In the embodiment described above, in the step S340 shown in FIG. 6, the print data is altered so that the warranty label Mqa is printed in an area Af which is an area located on the print medium MD and between an image Img as a printing target and an outer edge MDe of the print medium MD. However, it is possible for the print data to be altered so that the warranty label Mqa is printed in another area. For example, in the rolled elongated medium, it is also possible for the print data to be altered so that the warranty label Mqa is printed in an area between the image Img and the image Img as the printing target with respect to the longitudinal direction.

Further, when a plurality of images Img is printed along a first direction and a second direction perpendicular to the first direction on the print medium MD, it is also possible for the print data to be altered so that the warranty label Mqa is printed in an area between the image Img and the image Img with respect to at least one of the first direction and the second direction.

In other words, it is sufficient for the printing companies PCa, PCb, and PCas as the clients to be able to print the warranty label Mqa set in advance in an area which is located on the print medium MD, and is different from that of the image Img as the printing target in the printing when the warranty conditions including the fact that the printing setup information Ips fulfills a condition set in advance are fulfilled.

G2. Another Configuration 2:

(1) In the embodiment described above, the management server Sv is connected to the printer provider PP via the network (see a lower right part of FIG. 1). However, it is also possible to adopt an aspect in which the management server Sv is not connected to the printer provider PP via the network, but is connected to the printing companies Pca, PCb via the network.

(2) In the embodiment described above, the process to be performed by the medium vendor MV including the preparation and the upload of the printing setup information Ips is also performed by the printer provider PP (see a lower right part of FIG. 1). However, it is also possible to adopt an aspect in which the printer provider PP does not perform the process to be performed by the medium vendor MV.

G3. Another Configuration 3:

(1) The management server Sv is connected to the medium vendor MV via the network (see an upper right part of FIG. 1). However, it is also possible to adopt an aspect in which the management server Sv is not connected to the medium vendor MV via the network, but is connected to the printing companies Pca, PCb via the network. Further, it is also possible to adopt an aspect in which the management server Sv receives the information from the medium vendor MV via a physical recording medium.

(2) In the embodiment described above, the process including the preparation and the upload of the printing setup information Ips is performed by the medium vendor MV and the printer provider PP (see a right part of FIG. 1). However, it is also possible to adopt an aspect in which the medium vendor MV does not perform the process including the preparation and the upload of the printing setup information Ips.

G4. Another Configuration 4:

In the embodiment described above, there is described the aspect in which the recording medium for lamination is provided with the RFID or the QR code (registered trademark). However, it is also possible to adopt an aspect in which the recording medium on which the lamination is not assumed to be performed is also provided with the RFID or the QR code (registered trademark). Regarding also such an aspect, it is possible to make it possible to download the printing setup information Ips prepared for the recording medium by the printing company transmitting the information retrieved from the RFID or the QR code to the management server Sv.

G5. Another Configuration 5:

In the embodiment described above, the warranty conditions include that the color reproduction accuracy included in the printing setup information Ips fulfills the accuracy condition set in advance, and that the printing setup information Ips fulfills the condition related to the preparation method set in advance (see the steps S310, S320 shown in FIG. 6, and the reference numeral 1130 shown in FIG. 4). However, it is possible to adopt an aspect in which the warranty conditions do not include either one of these items. It is sufficient for the warranty conditions to include some condition for ensuring some quality of the printed material such as the color reproduction range or the gradation characteristic.

G6. Another Configuration 6:

In the embodiment described above, the warranty conditions include (i) that the printing company undergoes a periodic quality audit related to printing set in advance, (ii) that the printing company takes a periodic course related to printing set in advance, (iii) that the printer of the printing company uses genuine ink, (iv) that the printer of the printing company uses the ink which does not pass the expiration date set in advance, and (v) that the time and date when the calibration of the printer of the printing company has been performed fulfills a condition related to a period set in advance (see the step S330 shown in FIG. 6).

However, it is possible to adopt an aspect in which the warranty conditions do not include one or more of these conditions. It is sufficient for the warranty conditions to include some condition for ensuring some quality of the printed material such as the linearity or the granularity.

G7. Another Configuration 7:

In the embodiment described above, the warranty conditions include that the rating of the gradation characteristic included in the printing setup information Ips fulfills the gradation characteristic condition set in advance. However, it is possible to adopt an aspect in which the warranty conditions do not include the gradation characteristic. It is sufficient for the warranty conditions to include some condition for ensuring some quality of the printed material such as the color reproduction range.

G8. Another Configuration 8:

In the embodiment described above, the warranty conditions include that the color difference between the chromatic value representing the target color and the colorimetric value of the result obtained by printing the target color is within a certain standard (see the step S320 shown in FIG. 6). However, it is possible to adopt an aspect in which the warranty conditions do not include the condition on the color difference. It is sufficient for the warranty conditions to include some condition for ensuring some quality of the printed material such as the evaluation value related to the ink bleeding.

G9. Another Configuration 9:

In the embodiment described above, when the warranty conditions are fulfilled, it is possible for the printing companies PCa, PCb, and PCas to make the selection of not forming the warranty label Mqa in an area such as the footer or the header in the printing (see the step S305 shown in FIG. 6). However, it is possible to adopt an aspect in which the warranty label Mqa is inevitably printed when the warranty conditions are fulfilled.

G10. Still Another Configuration:

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to an aspect of the present disclosure, there is provided a printing system including a client configured to perform printing on a print medium using a printer, and a storage section configured to process and store information, wherein the client and the storage section are connected to each other via a network. The storage section stores one or more pieces of printing setup information each including a profile corresponding to a combination of a printer and a print medium. The client downloads the printing setup information corresponding to a combination a client printer used for printing in the client and a print medium used for the printing from the storage section, performs setup based on the printing setup information on one of software configured to control the client printer and the client printer to perform the printing, and prints a warranty label set in advance in an area which is located on the print medium and is different from an image as a printing target in the printing when a warranty condition including that the printing setup information fulfills a condition set in advance is fulfilled.

By adopting such an aspect, when the setup of the printer has been performed based on the printing setup information not fulfilling the condition set in advance, and the printing has been performed, it is possible for a person who has requested printing to the client to know that fact since the warranty label is not provided to the printed material. In other words, the quality of the printed material is assured by the warranty label attached to the printed material.

(2) In the printing system according to the above aspect, it is possible to adopt an aspect in which a first provider configured to provide a printer is connected to the storage section via the network, and the first provider executes a process of preparing printing setup information including a profile corresponding to a combination of a first provider printer and a print medium using the first provider printer and a profile preparation tool as software, and then transmitting the printing setup information to the storage section in order to make the storage section store the printing setup information for one or more print media.

By adopting such an aspect, it is possible for the client to obtain the printing setup information corresponding to the combination of the client printer used for printing and the print medium used for the printing in a short time compared to an aspect in which mailing of a color chart sample is included in a process prior to setting the printing setup information to one of the software for controlling the client printer and the client printer.

Further, by adopting such an aspect, it is possible for the first provider to prepare the printing setup information with which the appropriate printing can be performed using the printer provided by itself to the client as a user of the printer. Therefore, it is possible for the first provider to reinforce the advantage in using the printer provided by itself compared to a provider which does not provide the printing setup information with which the appropriate printing can be performed using the printer.

(3) In the printing system according to the above aspect, it is possible to adopt an aspect in which a second provider configured to provide a print medium is connected to the storage section via the network, the first provider provides the second provider with a second provider printer and a profile preparation tool as software, and the second provider executes a process of preparing printing setup information including a profile corresponding to a combination of a second provider printer and a print medium using the second provider printer and the profile preparation tool, and then transmitting the printing setup information to the storage section in order to make the storage section store the printing setup information for one or more print media provided by the second provider.

By adopting such an aspect, it is possible for the client to obtain the printing setup information corresponding to the combination of the client printer used for printing and the print medium used for the printing in a short time compared to an aspect in which mailing of a color chart sample is included in a process prior to setting the printing setup information to one of the software for controlling the client printer and the client printer.

Further, by adopting such an aspect, it is possible for the second provider to prepare the printing setup information with which the appropriate printing can be performed using the print medium provided by itself to the client as a purchaser of the print medium. Therefore, it is possible for the second provider to reinforce the advantage in using the print medium provided by itself compared to a provider which does not provide the printing setup information with which the appropriate printing can be performed on the print medium.

(4) In the printing system according to the above aspect, it is possible to adopt an aspect in which the printing setup information includes a model of an intended printer, a type of an intended print medium, a type of ink to be used in the intended printer, resolution required to be realized in the intended printer, a number of printing passes in printing by the intended printer, a setup parameter of the printer including a feed speed of a medium in the intended printer, and the profile of the intended printer.

By adopting such an aspect, it is possible for the client to obtain a printed material having a quality assumed when the profile has been prepared designating (i) the model of the client printer, (ii) the type of the print medium, (iii) the type of the ink, (iv) the printing mode, and (v) the setup parameter by performing the setup based on the printing setup information on the software for controlling the client printer or the client printer, and then performing printing.

In the printing system according to the above aspect, it is possible to adopt an aspect in which the warranty condition includes one or more of conditions that color reproduction accuracy included in the printing setup information fulfills an accuracy condition set in advance and that the printing setup information fulfills a condition related to a preparation method of the printing setup information set in advance.

By adopting such an aspect, it is possible for a person who has requested printing to the client to obtain an assurance that the printed material is high in quality due to the warranty label provided to the printed material.

In the printing system according to the above aspect, it is possible to adopt an aspect in which the warranty condition includes one or more of conditions that the client undergoes a periodic quality audit related to printing set in advance, that the client takes a periodic course related to printing set in advance, that the client printer uses genuine ink, that the client printer uses the ink which does not pass the expiration date set in advance, and that the time and date when the calibration of the client printer was performed fulfills a condition related to a period set in advance.

By adopting such an aspect, it is possible for a person who has requested printing to the client to obtain an assurance that the printed material is high in quality due to the warranty label provided to the printed material.

(5) In the printing system according to the above aspect, it is possible to adopt an aspect in which the warranty condition includes that the rating of the gradation characteristic included in the printing setup information fulfills the gradation characteristic condition set in advance.

By adopting such an aspect, it is possible for a person who has requested printing to the client to obtain an assurance that the printed material is high in quality due to the warranty label provided to the printed material.

In the printing system according to the above aspect, it is possible to adopt an aspect in which the warranty condition includes that a color difference between a chromatic value representing a target color and a colorimetric value of a result obtained by printing the target color is within a certain standard.

By adopting such an aspect, it is possible for a person who has requested printing to the client to obtain an assurance that the printed material is high in quality due to the warranty label provided to the printed material.

(6) In the printing system according to the above aspect, it is possible to adopt an aspect in which when the warranty condition is fulfilled, the client may make a selection of not forming the warranty label in the area in the printing.

By adopting such an aspect, when a person who requested printing to the client does not want the display of the warranty label, it is possible to meet his or her requirement.

H. Another Embodiment 3

H1. Another Configuration 1:

In the embodiment described above, the number of times of download Ni, the ink summary amount Vib, Via, and the medium summary amount Vma, Vmb are cleared periodically, for example, every month, and are then counted again from the start. Further, the ink summary amount Vib, Via, the medium summary amount Vma, Vmb are used to calculate the compensation or the reward every month. However, it is also possible for these measurement values to be measured in other periods such as one week, three months, or six months. Further, these measurement values can also be measured in respective facilities different from each other.

H2. Another Configuration 2:

In the embodiment described above, a variety of compensations are paid via the computer 100*s* of the management server Sv. However, each of the compensations can be paid via another server, or can also be paid directly between the information terminals.

H3. Another Configuration 3:

In the embodiment described above, the printer provider PP pays the reward Pcr decided based on the medium summary amount Vmb (see an upper middle part and an upper right part of FIG. 8). The medium summary amount Vmb is an amount of the print medium MD used by the medium vendor MV which has prepared the printing setup information Ips in the printing by the client printers 200*a*, 200*b* on which the setup based on the printing setup information Ips has been performed. However, the reward Pcr can also be decided using other methods.

(1) The medium summary amount Vmb (see an upper middle part of FIG. 8) tallied for each piece of the printing setup information Ips also represents the result of the printing by the client printers 200*a*, 200*b* on which the setup based on each piece of the printing setup information Ips has been performed in the printing companies PCa, PCb. Therefore, it is also possible to adopt such an aspect as described below.

The printer provider PP obtains the medium summary amount Vmb periodically, for example, every month from the management server Sv. The printer provider PP decides the reward Pcr based on the medium summary amount Vmb for each piece of the printing setup information Ips. Further, the printer provider PP pays the reward Pcr to the medium vendor MV which has prepared the printing setup information Ips.

More specifically, the computers 100*a*, 100*b* of the printing companies PCa, PCb measure the amount of the print medium MD used in the printing by the printer 200*a*, 200*b* performed using the printing setup information Ips, and then transmit the information Vm of the amount of the print medium MD used to the computer 100*s* of the management server Sv. As a result, the medium consumption Vm as the information representing the result of the printing by the printers 200*a*, 200*b* performed using the printing setup information Ips is transmitted to the management server Sv.

The computer 100*pp* of the printer provider PP receives the information Vm of the amount of the print medium MD for each piece of the printing setup information Ips used in the printing by the client printers 200*a*, 200*b* performed using the printing setup information Ips from the management server Sv. As a result, the information Vm of the amount of the print medium MD for each piece of the printing setup information Ips representing the result of the printing is received by the computer 100*pp* of the printer provider PP. The computer 100*pp* of the printer provider PP transmits the information Pcr representing the reward decided based on the amount of the print medium MD for each piece of the printing setup information Ips used in the printing to the computer 100*v* of the medium vendor MV which transmitted the printing setup information Ips used in the printing by the client printers 200*a*, 200*b* to the management server Sv. The information Pcr representing the reward is transmitted to the computer 100*v* of the medium vendor MV via the management server Sv.

Also in this aspect, the reward Pcr is apt to be decided reflecting the actual usage result in the printing companies PCa, PCb compared to the aspect in which the reward Pcr to be paid to the medium vendor MV is decided based on the number of times Ni of the download from the management server Sv.

(2) The number of times Ni of the download measured for each piece of the printing setup information Ips also represents the result of the printing by the client printers 200*a*, 200*b* on which the setup based on each piece of the printing setup information Ips has been performed in the printing companies PCa, PCb. Therefore, it is also possible to adopt such an aspect as described below.

The printer provider PP obtains the number of times of download Ni measured for each piece of the printing setup information Ips periodically, for example, every month from the management server Sv. The printer provider PP decides the reward Pcr based on the number of times Ni of the download of the printing setup information Ips. Further, it is also possible for the printer provider PP to pay the reward Pcr to the medium vendor MV which has prepared the printing setup information Ips.

More specifically, the computer 100*pp* of the printer provider PP receives the information Ni of the number of times of the acquisition of the printing setup information Ips from the computer 100*s* of the management server Sv. Then, the computer 100*pp* of the printer provider PP transmits the information Pcr representing the reward decided based on the number of times of the acquisition of the printing setup information Ips to the computer 100*v* of the medium vendor MV which transmitted the corresponding printing setup information Ips to the management server Sv. The information Pcr representing the reward is transmitted to the computer 100*v* of the medium vendor MV via the management server Sv.

The number of times Ni of the download of the printing setup information Ips is measured in the management server Sv. Therefore, it can easily be figured out compared to the medium summary amount Vmb and the ink summary amount Vib obtained by tallying the amount Vm of the print medium MD and the amount Vi of the ink used in the printing companies PCa, PCb, and PCas and then received by the management server Sv. Therefore, the process for deciding the compensation Pcr is easy.

H4. Still Another Configuration:

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to an aspect of the present disclosure, there is provided a printing system including a first provider configured to provide a printer, a second provider configured to provide a print medium, at least one client configured to perform printing on the print medium using the printer, and a storage section configured to process and store information, wherein the first provider, the second provider, the at least one client, and the storage section are connected to each other via a network. The first provider provides the second provider with a provider printer and a profile preparation tool as software, the second provider executes a process of preparing printing setup information including a profile corresponding to a combination of the provider printer and the print medium using the provider printer and the profile preparation tool, and then transmitting the printing setup information to the storage section in order to make the storage section store the printing setup information for one or more print media provided by the second provider, the client downloads the printing setup information corresponding to the combination of a client printer used for printing in the client and a print medium used for the printing from the storage section, then performs setup based on the printing setup information on one of software configured to control the client printer and the client printer, and then performs the printing, and the first provider pays a reward decided based on a result of the printing performed by the client printer on which setup based on the printing setup information was performed in the client to the second provider which prepared the printing setup information.

By adopting such an aspect, an incentive to prepare the printing setup information which is frequently used by the client, and which has a utility value for the client can be provided to the second provider. As a result, the printing setup information which has a utility value for the client, and is capable of realizing high-quality printing is prepared by the second provider. Further, since the reward is decided based on the result of the printing, it is possible to fairly set the reward.

(2) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

By adopting such an aspect, it is possible for the client to obtain a printed material having a quality assumed when the second provider prepares the profile designating (i) the model of the client printer, (ii) the type of the print medium, (iii) the type of the ink, (iv) the printing mode, and (v) the setup parameter by performing the setup based on the printing setup information on the software for controlling the client printer or the client printer, and then performing printing.

(3) In the printing system according to the above aspect, it is possible to adopt an aspect in which the client measures an amount of the print medium used in the printing by the client printer on which the setup based on the printing setup information was performed, and the first provider pays the reward decided based on the amount of the print medium used in the printing by the client printer on which the setup based on the printing setup information was performed to the second provider which prepared the printing setup information.

In such an aspect, the reward to be paid to the second provider is decided based on the amount of the print medium used in the printing. Therefore, the reward is apt to be decided reflecting the actual usage result in the client compared to the aspect in which the reward to be paid to the second provider is decided based on the number of times of the download from the storage section.

(4) In the printing system according to the above aspect, it is possible to adopt an aspect in which the client measures an amount of ink used in the printing by the client printer on which the setup based on the printing setup information was performed, and the first provider pays the reward decided based on the amount of the ink used in the printing by the client printer on which the setup based on the printing setup information was performed to the second provider which prepared the printing setup information.

In such an aspect, the reward to be paid to the second provider is decided based on the amount of the ink used in the printing. Therefore, the reward is apt to be decided reflecting the actual usage result in the client compared to the aspect in which the reward to be paid to the second provider is decided based on the number of times of the download from the storage section.

(5) In the printing system according to the above aspect, it is possible to adopt an aspect in which the storage section measures a number of times of download performed by the client for each piece of the printing setup information, and the first provider pays the reward decided based on the number of times of the download of the printing setup information to the second provider which prepared the printing setup information.

In such an aspect, the reward is decided based on the number of times of the download of the printing setup information. The number of times of the download of the printing setup information can easily be figured out using the storage section compared to the amount of the print medium used in the client. Therefore, the process of deciding the reward is easy compared to the aspect in which the reward is decided based on the amount of the print medium.

I. Another Embodiment 4

I1. Another Configuration 1:

(1) In FIG. 10, the computers 100*v*, 100*a*, 100*b*, 100*as*, 100*ao*, 100*psv*, 100*pp*, and 100*s* provided respectively to the medium vendor MV, the printing companies PCa, PCb, PCas, the business office PCao, the printing setup vendor PSV, the printer provider PP, and the management server Sv are each drawn as a computer having one housing. However, each of these computers can also be realized by a plurality of computers connected to each other via a network. Further, it is possible for a single computer to realize the functions of two or more of the computers 100*v*, 100*a*, 100*b*, 100*as*, 100*ao*, 100*psv*, 100*pp*, and 100*s*.

(2) In the embodiment described above, the process to be performed by the printing setup vendor PSV including the preparation and the upload of the printing setup information Ips is also performed by the medium vendor MV and the printer provider PP (see a lower right part of FIG. 10). However, it is also possible to adopt an aspect in which one or both of the medium vendor MV and the printer provider PP do not perform the process to be performed by the printing setup vendor PSV.

(3) In the embodiment described above, the process including the preparation and the upload of the printing setup information Ips is performed by the printing setup vendor PSV, the medium vendor MV, and the printer provider PP (see a right part of FIG. 10). However, it is also possible to adopt an aspect in which the printing setup vendor PSV does not perform the process including the preparation and the upload of the printing setup information Ips.

(4) In the embodiment described above, the printer provider PP provides the printing setup vendor PSV with the printer 200*psv* and the profile preparation tool PMT (see a middle right part of FIG. 10). As an aspect of the provision, it is possible to adopt direct distribution or rental (including licensing), or indirect distribution or rental (including licensing) via a business agent from the printer provider PP to the printing setup vendor PSV. Further, as an aspect of the provision, it is possible to adopt distribution or rental via the market.

In the embodiment described above, the printer provider PP provides the printing setup vendor PSV with the printer 200*psv* and the profile preparation tool PMT (see a middle right part of FIG. 10). However, the subject which provides the printing setup vendor PSV with the printer 200*psv* and the subject which provides the printing setup vendor PSV with the profile preparation tool PMT can be different from each other. In other words, it is possible for the printer provider PP to provide the printing setup vendor PSV with the printer 200*psv* while a tool vendor different from the printer provider PP provides the printing setup vendor PSV with the profile preparation tool PMT.

(5) In the embodiment described above, the management server Sv performs the printing of the color chart with the printer 200*s* in the step S120 shown in FIG. 5. The management server Sv measures the printing result of the color chart with a sensor of the printer 200*s* to determine the evaluation values with respect to the quality of the printing result based on the output of the sensor. However, it is also possible to adopt an aspect in which the management server Sv does not perform the printing and the measurement of the color chart.

In such an aspect, it is possible for the medium vendor MV to print the color chart with the printer 200*v* in accordance with the printing setup information Ips which the medium vendor MV tries to transmit to the management server Sv prior to the transmission of the printing setup image Ips to the management server Sv. The method of printing is the same as the method in the step S120 shown in FIG. 5.

The medium vendor MV measures the printing result of the color chart with a sensor of the printer 200*v* to determine the evaluation values with respect to the quality of the printing result based on the output of the sensor. The determination method of the evaluation value is the same as the method when determining the evaluation value of the printing result in the medium vendor MV. The medium vendor MV includes the evaluation value of the printing result in the printing setup information Ips which the medium vendor MV tries to transmit to the management server Sv.

Further, in such an aspect, it is possible for the printing setup vendor PSV to print the color chart with the printer 200*psv* in accordance with the printing setup information Ips which the printing setup vendor PSV tries to transmit to the management server Sv prior to the transmission of the printing setup image Ips to the management server Sv. The method of printing is the same as the method in the step S120 shown in FIG. 5.

The printing setup vendor PSV measures the printing result of the color chart with a sensor of the printer 200*psv* to determine the evaluation values with respect to the quality of the printing result based on the output of the sensor. The determination method of the evaluation value is the same as the method when determining the evaluation value of the printing result in the management server Sv. The printing setup vendor PSV includes the evaluation value of the printing result in the printing setup information Ips which the printing setup vendor PSV tries to transmit to the management server Sv.

In the step S120 shown in FIG. 5, the management server Sv determines whether or not the printing setup information Ips fulfills the condition related to the printing result set in advance based on the evaluation value of the printing result included in the printing setup information Ips. In such an aspect, there is no need to dispose an operator for performing printing in the management server Sv. Further, the medium vendor MV and the printing setup vendor PSV are not required to send a sample of the print medium MD used in the printer 200*psv* when preparing the printing setup information Ips to the management server Sv.

(6) In the embodiment described above, the printer provider PP pays the reward Pcr decided based on the result of the printing performed based on the printing setup information Ips in the printing companies PCa, PCb to the printing setup vendor PSV which prepared the printing setup information Ips (see a lower right part of FIG. 10). However, it is also possible for the reward to be decided based on the result of the printing to be paid by the medium vendor MV to the printing setup vendor PSV. Specifically, it is possible for the medium vendor MV to pay the reward Pcr2 decided based on the result of the printing performed based on the printing setup information Ips in the printing companies PCa, PCb to the printing setup vendor PSV which prepared the printing setup information Ips (see an upper right part of FIG. 10). Further, it is also possible for the rewards Pcr, Pcr2 to be decided based on the result of the printing to be paid by both of the printer provider PP and the medium vendor MV to the printing setup vendor PSV.

The calculation of the reward Pcr2 to be paid by the medium vendor MV can be performed by the medium vendor MV, and can also be performed by the printer provider PP or the management server Sv. Further, the calculation of the reward Pcr to be paid by the printer provider PP can be performed by the management server Sv instead of the printer provider PP.

(7) In the embodiment described above, the printer provider PP provides the printing setup vendor PSV with the printer 200*psv* and the profile preparation tool PMT (see a middle right part of FIG. 10). Further, the printing setup vendor PSV prepares profiles corresponding to combinations of the printer 200*psv* and a variety of types of the print media MD manufactured by the medium vendor MV. However, it is also possible to adopt an aspect in which the printer provider PP is provided with the printer 200*pp*, and prepares profiles corresponding to combinations of the printer 200*pp* and the variety of types of print media MD manufactured by the medium vendor MV using the printer 200*pp* and the profile preparation tool PMT.

In this aspect, it is possible for the medium vendor MV to pay the reward Pcr2 to be decided based on the result of the printing performed based on the printing setup information Ips in the printing companies PCa, PCb to the printer provider PP which prepared the printing setup information Ips (see an upper right part of FIG. 10).

I2. Another Configuration 2:

In the embodiment described above, the printing setup vendor PSV provides a profile corresponding to a combination of the model of the printer 200 and the type of the print medium MD (see a middle right part of FIG. 10). However, the subject providing the profile can further manufacture the printer to supply the printer outside as the printer provider PP, can further provide the print medium as the medium vendor MV, or can produce the printed material as the printing company.

I3. Another Configuration 3:

In the embodiment described above, the printer provider PP pays the reward Pcr decided based on the medium summary amount Vmb to the printing setup vendor PSV which prepared the printing setup information Ips (see an upper middle part and an upper right part of FIG. 10). The medium summary amount Vmb is an amount of the print medium MD used in the printing by the client printers 200a, 200b on which the setup based on the printing setup information Ips has been performed. However, the rewards Pcr, Pcr2 to be paid to the printing setup vendor PSV can be decided using another method.

(1) The ink summary amount Vib (see an upper middle part of FIG. 10) tallied for each piece of the printing setup information Ips also represents the result of the printing by the client printers 200a, 200b on which the setup based on each piece of the printing setup information Ips has been performed in the printing companies PCa, PCb. Therefore, it is also possible to adopt such an aspect as described below.

Either one or both of the printer provider PP and the medium vendor MV obtain the ink summary amount Vib periodically, for example, every month from the management server Sv. The printer provider PP decides the rewards Pcr, Pcr2 based on the ink summary amount Vib for each piece of the printing setup information Ips. Further, the printer provider PP pays the rewards Pcr, Pcr2 to the printing setup vendor PSV which has prepared the printing setup information Ips.

For example, the computer 100pp of the printer provider PP receives the ink summary amount Vib for each piece of the printing setup information Ips used in the printing by the client printers 200a, 200b performed using the printing setup information Ips from the management server Sv. The computer 100pp of the printer provider PP transmits the information Pcr representing the reward decided based on the ink summary amount Vib to the computer 100pcv of the printing setup vendor PSV which transmitted the printing setup information Ips used in the printing by the client printers 200a, 200b to the management server Sv. The information Pcr representing the reward is transmitted to the computer 100v of the medium vendor MV via the management server Sv.

Also in this aspect, the rewards Pcr, Pcr2 are apt to be decided reflecting the actual usage result in the printing companies PCa, PCb compared to the aspect in which the rewards Pcr, Pcr2 to be paid to the printing setup vendor PSV are decided based on the number of times Ni of the download from the management server Sv. It should be noted that it is also possible for each of the rewards Pcr, Pcr2 to be decided based on both of the medium summary amount Vmb and the ink summary amount Vib.

(2) The number of times Ni of the download measured for each piece of the printing setup information Ips also represents the result of the printing by the client printers 200a, 200b on which the setup based on each piece of the printing setup information Ips has been performed in the printing companies PCa, PCb. Therefore, it is also possible to adopt such an aspect as described below.

Either one or both of the printer provider PP and the medium vendor MV obtain the number of times of download Ni measured for each piece of the printing setup information Ips periodically, for example, every month from the management server Sv. The printer provider PP decides the rewards Pcr, Pcr2 based on the number of times Ni of the download of the printing setup information Ips. Further, it is possible for the printer provider PP to pay the rewards Pcr, Pcr2 to the printing setup vendor PSV which has prepared the printing setup information Ips.

For example, the computer 100pp of the printer provider PP receives the information Ni of the number of times of the acquisition of the printing setup information Ips from the computer 100s of the management server Sv. Then, the computer 100pp of the printer provider PP transmits the information Pcr representing the reward decided based on the number of times of the acquisition of the printing setup information Ips to the computer 100psv of the printing setup vendor PSV which transmitted the corresponding printing setup information Ips to the management server Sv. The information Pcr representing the reward is transmitted to the computer 100v of the medium vendor MV via the management server Sv.

The number of times Ni of the download of the printing setup information Ips is measured in the management server Sv. Therefore, it can easily be figured out compared to the medium summary amount Vmb and the ink summary amount Vib obtained by tallying the amount Vm of the print medium MD and the amount Vi of the ink used in the printing companies PCa, PCb, and PCas and then received by the management server Sv. Therefore, the process for deciding the compensation Pcr is easy.

I4. Still Another Configuration:

The present disclosure is not limited to the embodiments described above, but can be implemented in a variety of aspects within the scope or the spirit of the disclosure. For example, the present disclosure can also be implemented in the following aspects. The technical features in each of the embodiments described above corresponding to the technical features in each of the aspects described below can arbitrarily be replaced or combined in order to solve a part or the whole of the problem of the present disclosure, or to achieve some or all of the advantages of the present disclosure. Further, the technical feature can arbitrarily be eliminated unless described in the present specification as an essential element.

(1) According to an aspect of the present disclosure, there is provided a printing system including a first provider configured to provide a printer, a second provider configured to provide a print medium, a third provider configured to provide a profile corresponding to a combination of a printer and a print medium, at least one client configured to perform printing on the print medium using the printer and the profile, and a storage section configured to process and store information, wherein the first provider, the second provider, the third provider, the at least one client, and the storage section are connected to each other via a network. The first provider provides the third provider with a provider printer and a profile preparation tool as software. The third provider executes a process of preparing printing setup information including a profile corresponding to a combination of the provider printer and the print medium using the provider printer and the profile preparation tool, and then transmitting the printing setup information to the storage section in order to make the storage section store the printing setup information for one or more print media provided by the second provider. The client downloads the printing setup information corresponding to the combination of a client printer used for printing in the client and a print medium used for the printing from the storage section, then performs setup based on the printing setup information on one of software configured to control the client printer and the client printer, and then performs the printing. Either one or both of the first provider and the second provider pay a reward decided based on a result of the printing performed by the client printer on which setup based on the printing setup information was performed in the client to the third provider which prepared the printing setup information.

By adopting such an aspect, an incentive to prepare the printing setup information which is frequently used by the client, and which has a utility value for the client can be provided to the third provider. As a result, the printing setup information which has a utility value for the client, and is capable of realizing high-quality printing is prepared by the third provider. Further, since the reward is decided based on the result of the printing, it is possible to fairly set the reward.

(2) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

By adopting such an aspect, it is possible for the client to obtain a printed material having a quality assumed when the third provider prepares the profile designating (i) the model of the client printer, (ii) the type of the print medium, (iii) the type of the ink, (iv) the printing mode, and (v) the setup parameter by performing the setup based on the printing setup information on the software for controlling the client printer or the client printer, and then performing printing.

(3) In the printing system according to the above aspect, it is possible to adopt an aspect in which the client measures an amount of the print medium used in the printing by the client printer on which the setup based on the printing setup information was performed, and either one or both of the first provider and the second provider pay the reward decided based on the amount of the print medium used in the printing by the client printer on which the setup based on the printing setup information was performed to the third provider which prepared the printing setup information.

In such an aspect, the reward to be paid to the third provider is decided based on the amount of the print medium used in the printing. Therefore, the reward is apt to be decided reflecting the actual usage result in the client compared to the aspect in which the reward to be paid to the third provider is decided based on the number of times of the download from the storage section.

(4) In the printing system according to the above aspect, it is possible to adopt an aspect in which the client measures an amount of ink used in the printing by the client printer on which the setup based on the printing setup information was performed, and either one or both of the first provider and the second provider pay the reward decided based on the amount of the ink used in the printing by the client printer on which the setup based on the printing setup information was performed to the third provider which prepared the printing setup information.

In such an aspect, the reward to be paid to the third provider is decided based on the amount of the ink used in the printing. Therefore, the reward is apt to be decided reflecting the actual usage result in the client compared to the aspect in which the reward to be paid to the third provider is decided based on the number of times of the download from the storage section.

(5) In the printing system according to the above aspect, it is possible to adopt an aspect in which the storage section measures a number of times of download performed by the client for each piece of the printing setup information, and either one or both of the first provider and the second provider pay the reward decided based on the number of times of the download of the printing setup information to the third provider which prepared the printing setup information.

In such an aspect, the reward is decided based on the number of times of the download of the printing setup information. The number of times of the download of the printing setup information can easily be figured out using the storage section compared to the amount of the print medium used in the client. Therefore, the process of deciding the reward is easy compared to the aspect in which the reward is decided based on the amount of the print medium.

J. Another Embodiment 5

(1) According to an aspect of the present disclosure, there is provided a printing system including a first information terminal provided to a first provider configured to provide a printer, a second information terminal provided to a second provider configured to provide a print medium, a client information terminal which is provided to each of at least one client configured to perform printing on the print medium using the printer, and to which the printer is coupled, and a management section configured to process and store information, wherein the first information terminal, the second information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the second information terminal when an acquisition request of the profile preparation tool is received from the second information terminal, a setup reception section configured to receive printing setup information including a profile prepared in accordance with a combination of a model of a printer and a type of a print medium using the profile preparation tool received by the second information terminal from the second information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal.

(2) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

(3) In the printing system according to the above aspect, it is possible to adopt an aspect in which the second information terminal transmits information representing a compensation to be paid in accordance with a number of pieces of the printing setup information to the first information terminal, the second information terminal making the management section store the printing setup information.

(4) In the printing system according to the above aspect, it is possible to adopt an aspect in which the management section fails to store the printing setup information received from the second information terminal in the setup storage section when the printing setup information received from the second information terminal fails to fulfill a condition related to a printing result set in advance, and stores the printing setup information received from the second information terminal in the setup storage section when the printing setup information received from the second information terminal fulfills a registration condition including the condition related to the printing result.

(5) In the printing system according to the above aspect, it is possible to adopt an aspect in which the management section fails to store the printing setup information received from the second information terminal in the setup storage section when the printing setup information received from the second information terminal fails to fulfill a condition related to a preparation method of the printing setup information set in advance, and stores the printing setup information received from the second information terminal in the setup storage section when the printing setup information received from the second information terminal fulfills a registration condition including the condition related to the preparation method of the printing setup information.

(6) In the printing system according to the above aspect, it is possible to adopt an aspect in which the printing setup information further includes information representing a preparer of the printing setup information.

(7) In the printing system according to the above aspect, it is possible to adopt an aspect in which the second information terminal executes the process of transmitting the printing setup information designating one or more of the clients allowed to receive the printing setup information in the process of transmitting the printing setup information to the management section.

(8) In the printing system according to the above aspect, it is possible to adopt an aspect in which the management section stores a plurality of pieces of the printing setup information in the setup storage section, and allows only the client information terminal of a client which fulfills a condition set in advance out of the one or more clients to receive some pieces of the printing setup information out of the plurality of pieces of the printing setup information.

(9) In the printing system according to the above aspect, it is possible to adopt an aspect in which the management section stores a plurality of pieces of the printing setup information, the plurality of pieces of the printing setup information includes a plurality of types of the printing setup information different in compensation for acquisition from each other, and a plurality of types of the printing setup information different in level representing a quality of a printing result from each other, and the client information terminal transmits information to the first information terminal, the information representing a compensation paid in accordance with: (i) a compensation for acquisition of the printing setup information; (ii) the level representing a quality of the printing result of the printing setup information; (iii) a number of pieces of the printing setup information obtained from the management section; and (iv) a duration of use of the printing setup information obtained from the management section.

(10) In the printing system according to the above aspect, it is possible to adopt an aspect in which the client information terminal transmits information to the first information terminal, the information representing a compensation to be paid in accordance with an amount of printing by the printer coupled to the client information terminal using the printing setup information received.

(11) According to another aspect of the present disclosure, there is provided a printing system including a client information terminal which is provided to a client configured to perform printing on a print medium using a printer, and to which the printer is coupled, and a management section configured to process and store information, wherein the client information terminal and the management section are coupled to each other via a network. The management section includes a setup storage section configured to store one or more pieces of printing setup information each including a profile corresponding to a combination of a model of a printer and a type of a print medium. The client information terminal transmits an acquisition request of the printing setup information specified by a combination of a model of a printer and a type of a print medium to the management section, and receives the printing setup information specified out of the one or more pieces of the printing setup information stored in the setup storage section from the management section. A client printer which is the printer coupled to the client information terminal, and is a printer same in model as the printer used to specify the printing setup information performs the printing on a print medium same in type as the print medium used to specify the printing setup information using the printing setup information received by the client information terminal, and prints a warranty label set in advance in an area which is located on the print medium, and is different from an area of an image as a printing target in the printing when a warranty condition including that the printing setup information fulfills a condition set in advance is fulfilled.

(12) In the printing system according to the above aspect, it is possible to adopt an aspect in which a first information terminal provided to a first provider configured to provide a printer is coupled to the management section via a network, and the management section includes a first setup reception section configured to receive printing setup information including a profile prepared in accordance with a combination of a model of a printer and a type of a print medium using a profile preparation tool as software from the first information terminal.

(13) In the printing system according to the above aspect, it is possible to adopt an aspect in which a second information terminal provided to a second provider configured to provide a print medium is coupled to the management section via a network, and the management section includes a tool reception section configured to receive the profile preparation tool from the first information terminal, a tool storage section configured to store the profile preparation tool, a tool transmission section configured to transmit the profile preparation tool stored in the tool storage section to the second information terminal when an acquisition request of the profile preparation tool is received from the second information terminal, and a second setup reception section configured to receive printing setup information from the second information terminal, the printing setup information including a profile prepared in accordance with a combination of a model of a printer and a type of a print medium using the profile preparation tool received by the second information terminal.

(14) In the printing system according to the above aspect, it is possible to adopt an aspect in which the printing setup information includes a model of an intended printer, a type of an intended print medium, a type of ink to be used in the intended printer, resolution required to be realized in the intended printer, a number of printing passes in printing by the intended printer, a setup parameter of the printer including a feed speed of a medium in the intended printer, and the profile of the intended printer.

(15) In the printing system according to the above aspect, it is possible to adopt an aspect in which the warranty condition includes that the rating of the gradation characteristic included in the printing setup information fulfills the gradation characteristic condition set in advance.

(16) In the printing system according to the above aspect, it is possible to adopt an aspect in which when the warranty condition is fulfilled, the client printer makes a selection of failing to form the warranty label in the area in the printing.

(17) According to still another aspect of the present disclosure, there is provided a printing system including a first information terminal provided to a first provider configured to provide a printer, a second information terminal provided to a second provider configured to provide a print medium, a client information terminal which is provided to each of at least one client configured to perform printing on the print medium using the printer, and to which the printer is coupled, and a management section configured to process and store information, wherein the first information terminal, the second information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the second information terminal when an acquisition request of the profile preparation tool is received from the second information terminal, a setup reception section configured to receive printing setup information including a profile prepared in accordance with a combination of a model of a printer and a type of a print medium using the profile preparation tool received by the second information terminal from the second information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal. The client information terminal transmits information representing a result of the printing by the client printer performed using the printing setup information to the management section. The first information terminal receives information representing the result of the printing from the management section, and transmits information representing a reward to be decided based on the result of the printing to the second information terminal which transmitted the printing setup information to the management section.

(18) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

(19) In the printing system according to the above aspect, it is possible to adopt an aspect in which the client information terminal measures an amount of the print medium used in the printing by the client printer performed using the printing setup information to transmit information representing the amount of the print medium used to the management section, and the first information terminal receives the information representing the amount of the print medium used in the printing by the client printer using the printing setup information from the management section, and transmits information representing the reward to be decided based on the amount of the print medium used in the printing to the second information terminal which transmitted the printing setup information used in the printing by the client printer to the management section.

(20) In the printing system according to the above aspect, it is possible to adopt an aspect in which the client information terminal measures an amount of ink used in the printing by the client printer performed using the printing setup information to transmit information representing the amount of the ink used to the management section, and the first information terminal receives the information representing the amount of the ink used in the printing by the client printer using the printing setup information from the management section, and transmits information representing the reward to be decided based on the amount of the ink used in the printing to the second information terminal which transmitted the printing setup information used in the printing by the client printer to the management section.

(21) In the printing system according to the above aspect, it is possible to adopt an aspect in which the management section includes a number-of-times measurement section configured to measure a number of times of acquisition by the client information terminal for each piece of the printing setup information, and the first information terminal receives information representing the number of times of the acquisition of the printing setup information from the management section, and transmits information representing the reward to be decided based on the number of times of the acquisition of the printing setup information to the second information terminal which transmitted the corresponding printing setup information to the management section.

(22) According to still another aspect of the present disclosure, there is provided a printing system including a first information terminal provided to a first provider configured to provide a printer, a second information terminal provided to a second provider configured to provide a print medium, a third information terminal provided to a third provider configured to provide a profile corresponding to a combination of a model of a printer and a type of a print medium, a client information terminal which is provided to each of at least one client configured to perform printing on the print medium using the printer and the profile, and to which the printer is coupled, and a management section configured to process and store information, wherein the first information terminal, the second information terminal, the third information terminal, the client information terminal, and the management section are coupled to each other via a network. The management section includes a tool reception section configured to receive a profile preparation tool as software from the first information terminal, a tool storage section configured to store the profile preparation tool, a tool transmission section configured to transmit the profile preparation tool stored in the tool storage section to the third information terminal when an acquisition request of the profile preparation tool is received from the third information terminal, a setup reception section configured to receive printing setup information including a profile prepared in accordance with a combination of a model of a printer and a type of a print medium using the profile preparation tool received by the third information terminal from the third information terminal, a setup storage section configured to store at least one piece of the printing setup information, and a setup transmission section configured to select the printing setup information specified by a combination of a model of a printer and a type of a print medium out of the at least one piece of the printing setup information stored in the setup storage section, and then transmit the printing setup information to the client information terminal when an acquisition request of the printing setup information specified is received from the client information terminal. The client printer which is the printer coupled to the client information terminal, and is a printer same in model as the printer used to specify the printing setup information performs the printing on a print medium same in type as the print medium used to specify the printing setup information using the printing setup information received by the client information terminal. The client information terminal transmits information representing a result of the printing by the client printer performed using the printing setup information to the management section. Either one or both of the first information terminal and the second information terminal receives information representing the result of the printing from the management section, and transmits information representing a reward decided based on the result of the printing performed by the client printer using the printing setup information to the third information terminal which transmitted the printing setup information to the management section.

(23) In the printing system according to the above aspect, it is possible to adopt an aspect in which the printing setup information includes a model of an intended printer, a type of an intended print medium, a type of ink to be used in the intended printer, a printing mode to be used in the intended printer, a setup parameter of the printer including a feed speed of a medium in the intended printer, and the profile of the intended printer.

(24) In the printing system according to the above aspect, it is possible to adopt an aspect in which the client information terminal measures an amount of the print medium used in the printing by the client printer performed using the printing setup information to transmit information representing the amount of the print medium used to the management section, and the either one or both of the first information terminal and the second information terminal receives the information representing the amount of the print medium used in the printing by the client printer using the printing setup information from the management section, and transmits information representing the reward to be decided based on the amount of the print medium used in the printing to the third information terminal which transmitted the printing setup information used in the printing by the client printer to the management section.

(25) In the printing system according to the above aspect, it is possible to adopt an aspect in which the client information terminal measures an amount of ink used in the printing by the client printer performed using the printing setup information to transmit information representing the amount of the ink used to the management section, and the either one or both of the first information terminal and the second information terminal receives the information representing the amount of the ink used in the printing by the client printer using the printing setup information from the management section, and transmits information representing the reward to be decided based on the amount of the ink used in the printing to the third information terminal which transmitted the printing setup information used in the printing by the client printer to the management section.

(26) In the printing system according to the above aspect, it is possible to adopt an aspect in which the management section includes a number-of-times measurement section configured to measure a number of times of acquisition by the client information terminal for each piece of the printing setup information, and the either one or both of the first information terminal and the second information terminal receives information representing the number of times of the acquisition of the printing setup information from the management section, and transmits information representing the reward to be decided based on the number of times of the acquisition of the printing setup information to the third information terminal which transmitted the corresponding printing setup information to the management section.

The present disclosure can be implemented in a variety of aspects other than the printing system. The present disclosure can be realized in the aspects of, for example, a printing processing method, a method of providing a print medium, a method of providing a compensation, a method of providing a reward, a computer program for realizing these methods, and a non-temporary recording medium on which the computer program is recorded.

All of the constituents provided to each of the aspects of the present disclosure described above are not necessarily essential, and in order to solve some or all of the problems described above, or in order to achieve some or all of the advantages described in the specification, it is possible to arbitrarily make modification, elimination, replacement with another new constituent, partial deletion of restriction content on some of the constituents. Further, in order to solve some or all of the problems described above, or in order to achieve some or all of the advantages described in the specification, it is also possible to combine some or all of the technical features included in one of the aspects of the present disclosure with some or all of the technical features included in another of the aspects of the present disclosure to thereby form an independent aspect of the present disclosure.

What is claimed is:
1. A printing system comprising:
a first information terminal provided to a first provider configured to provide a printer;

a second information terminal provided to a second provider configured to provide a print medium;
a client information terminal which is provided to each of at least one client configured to perform printing on the print medium using the printer, and to which the printer is coupled; and
a management section configured to process and store information, wherein
the first information terminal, the second information terminal, the client information terminal, and the management section are coupled to each other via a network,
the management section includes
a tool reception section configured to receive a profile preparation tool as software from the first information terminal,
a tool storage section configured to store the profile preparation tool,
a tool transmission section configured to transmit the profile preparation tool stored in the tool storage section to the second information terminal when an acquisition request of the profile preparation tool is received from the second information terminal,
a setup reception section configured to receive printing setup information including a profile prepared in accordance with a combination of a model of a printer and a type of a print medium using the profile preparation tool received by the second information terminal from the second information terminal,
a setup storage section configured to store at least one piece of the printing setup information, and
a setup transmission section configured to select the printing setup information specified by a combination of the model of the printer and the type of the print medium out of the at least one piece of the printing setup information stored in the setup storage section, and then transmit the printing setup information to the client information terminal when an another acquisition request of the printing setup information specified is received from the client information terminal, and
a client printer which is the printer coupled to the client information terminal, and is a printer same in the model as the printer used to specify the printing setup information performs the printing on the print medium same in type as the print medium used to specify the printing setup information using the printing setup information received by the client information terminal.

2. The printing system according to claim 1, wherein the printing setup information includes
a model of an intended printer,
a type of an intended print medium,
a type of ink to be used in the intended printer,
a printing mode to be used in the intended printer,
a setup parameter of the printer including a feed speed of a medium in the intended printer, and
the profile of the intended printer.

3. The printing system according to claim 1, wherein the second information terminal transmits the information representing a compensation to be paid in accordance with a number of pieces of the printing setup information to the first information terminal, the second information terminal making the management section store the printing setup information.

4. The printing system according to claim 1, wherein the management section
fails to store the printing setup information received from the second information terminal in the setup storage section when the printing setup information received from the second information terminal fails to fulfill a condition related to a printing result set in advance, and
stores the printing setup information received from the second information terminal in the setup storage section when the printing setup information received from the second information terminal fulfills a registration condition including the condition related to the printing result.

5. The printing system according to claim 1, wherein the management section
fails to store the printing setup information received from the second information terminal in the setup storage section when the printing setup information received from the second information terminal fails to fulfill a condition related to a preparation method of the printing setup information set in advance, and
stores the printing setup information received from the second information terminal in the setup storage section when the printing setup information received from the second information terminal fulfills a registration condition including the condition related to the preparation method of the printing setup information.

6. The printing system according to claim 1, wherein the printing setup information further includes information representing a preparer of the printing setup information.

7. The printing system according to claim 1, wherein the second information terminal executes the process of transmitting the printing setup information designating one or more of the clients allowed to receive the printing setup information in the process of transmitting the printing setup information to the management section.

8. The printing system according to claim 1, wherein the management section
stores a plurality of pieces of the printing setup information in the setup storage section, and
allows only the client information terminal of a client which fulfills a condition set in advance out of the one or more clients to receive some pieces of the printing setup information out of the plurality of pieces of the printing setup information.

9. The printing system according to claim 1, wherein the management section stores a plurality of pieces of the printing setup information,
the plurality of pieces of the printing setup information includes
a plurality of types of the printing setup information different in compensation for acquisition from each other, and
a plurality of types of the printing setup information different in level representing a quality of a printing result from each other, and
the client information terminal transmits the information to the first information terminal, the information representing a compensation paid in accordance with:
(i) the compensation for acquisition of the printing setup information;
(ii) the level representing a quality of the printing result of the printing setup information;
(iii) a number of pieces of the printing setup information obtained from the management section; and
(iv) a duration of use of the printing setup information obtained from the management section.

10. The printing system according to claim 1, wherein the client information terminal transmits the information to the first information terminal, the information representing a compensation to be paid in accordance with an amount of printing by the printer coupled to the client information terminal using the printing setup information received.

11. A printing system comprising:
a first information terminal provided to a first provider configured to provide a printer;
a second information terminal provided to a second provider configured to provide a print medium;
a client information terminal which is provided to each of at least one client configured to perform printing on the print medium using the printer, and to which the printer is coupled; and
a management section configured to process and store information, wherein
the first information terminal, the second information terminal, the client information terminal, and the management section are coupled to each other via a network,
the management section includes
a tool reception section configured to receive a profile preparation tool as software from the first information terminal,
a tool storage section configured to store the profile preparation tool,
a tool transmission section configured to transmit the profile preparation tool stored in the tool storage section to the second information terminal when an acquisition request of the profile preparation tool is received from the second information terminal, and
a setup reception section configured to receive printing setup information including a profile prepared in accordance with a combination of a model of a printer and a type of a print medium using the profile preparation tool received by the second information terminal from the second information terminal,
a setup storage section configured to store at least one piece of the printing setup information, and
a setup transmission section configured to select the printing setup information specified by the combination of the model of the printer and the type of a print medium out of the at least one piece of the printing setup information stored in the setup storage section, and then transmit the printing setup information to the client information terminal when an another acquisition request of the printing setup information specified is received from the client information terminal,
a client printer which is the printer coupled to the client information terminal, and is the printer same in model as the printer used to specify the printing setup information performs the printing on the print medium same in type as the print medium used to specify the printing setup information using the printing setup information received by the client information terminal,
the client information terminal transmits information representing a result of the printing by the client printer performed using the printing setup information to the management section, and
the first information terminal
receives the information representing the result of the printing from the management section, and transmits the information representing a reward to be decided based on the result of the printing to the second information terminal which transmitted the printing setup information to the management section.

12. The printing system according to claim 11, wherein the printing setup information includes
a model of an intended printer,
a type of an intended print medium,
a type of ink to be used in the intended printer,
a printing mode to be used in the intended printer,
a setup parameter of the printer including a feed speed of a medium in the intended printer, and
the profile of the intended printer.

13. The printing system according to claim 11, wherein the client information terminal measures an amount of the print medium used in the printing by the client printer performed using the printing setup information to transmit the information representing the amount of the print medium used to the management section, and
the first information terminal
receives the information representing the amount of the print medium used in the printing by the client printer using the printing setup information from the management section, and
transmits the information representing the reward to be decided based on the amount of the print medium used in the printing to the second information terminal which transmitted the printing setup information used in the printing by the client printer to the management section.

14. The printing system according to claim 11, wherein the client information terminal measures an amount of ink used in the printing by the client printer performed using the printing setup information to transmit the information representing the amount of the ink used to the management section, and
the first information terminal receives the information representing the amount of the ink used in the printing by the client printer using the printing setup information from the management section, and
transmits the information representing the reward to be decided based on the amount of the ink used in the printing to the second information terminal which transmitted the printing setup information used in the printing by the client printer to the management section.

* * * * *